(12) United States Patent
Akimoto et al.

(10) Patent No.: US 7,186,060 B2
(45) Date of Patent: Mar. 6, 2007

(54) METHOD AND DEVICE FOR LINING CONSTRUCTION IN SEWER FOLLOWED BY SIMULTANEOUS FILLING OF BACK-FILL MATERIAL

(75) Inventors: Eiki Akimoto, Iruma (JP); Hamao Yamashiro, Sayama (JP); Hiroshi Sugahara, Ritto (JP); Yuzo Yokoyama, Ritto (JP); Akira Imagawa, Ritto (JP); Naoki Kitahashi, Osaka (JP); Yasushi Kitayama, Tokyo (JP)

(73) Assignees: Adachi Construction Industry Co. Ltd., Tokyo (JP); Sekisui Chemical Co., Ltd., Osaka (JP)

( * ) Notice: Subject to any disclaimer, the term of this patent is extended or adjusted under 35 U.S.C. 154(b) by 247 days.

(21) Appl. No.: 10/169,081

(22) PCT Filed: Dec. 11, 2001

(86) PCT No.: PCT/JP01/10822

§ 371 (c)(1),
(2), (4) Date: Jul. 8, 2002

(87) PCT Pub. No.: WO02/48594

PCT Pub. Date: Jun. 20, 2002

(65) Prior Publication Data

US 2004/0013472 A1    Jan. 22, 2004

(30) Foreign Application Priority Data

| Dec. 12, 2000 | (JP) | ................ 2000-377464 |
| Dec. 12, 2000 | (JP) | ................ 2000-377828 |
| Jan. 19, 2001 | (JP) | ................ 2001-012176 |
| Jun. 6, 2001 | (JP) | ................ 2001-171306 |

(51) Int. Cl.
*F16L 55/18* (2006.01)

(52) U.S. Cl. .................................. 405/184.2
(58) Field of Classification Search ............ 405/184.1, 405/184.2; 138/97, 98, 144; 156/425
See application file for complete search history.

(56) References Cited

U.S. PATENT DOCUMENTS

| 5,101,863 A |   | 4/1992 | Fujii et al. |
| 6,033,149 A | * | 3/2000 | McAlpine ................ 405/154.1 |
| 6,167,913 B1 | * | 1/2001 | Wood et al. ................ 138/98 |

FOREIGN PATENT DOCUMENTS

DE            40 13 333        10/1991

(Continued)

*Primary Examiner*—Michael Safavi
(74) *Attorney, Agent, or Firm*—Oblon, Spivak, McClelland, Maier & Neustadt, P.C.

(57) ABSTRACT

In lining work in which a lining pipe R formed by spirally winding a strip-like member 500 consisting of an elongated sheet-form body is left in place inside a tubular culvert P, and a new lining pipe is additionally formed in front of this lining pipe that has been left in place, a lining apparatus S which has a flexible forming frame 1 consisting of link bodies is used. The strip-like member 500 is wound around the forming frame 1 by means of a joining mechanism part 7 attached to the forming frame 1, and a lining pipe R is formed while being forcibly folded inward utilizing the flexibility of the forming frame 1; at the same time, a back-filling material is injected into the inward-folded part. The inward-folded part later returns to its original state. Alternatively, the diameter of a small-diameter lining pipe R formed by winding around the forming frame 201 or 401 is expanded, and lining is performed with the back-filling material injected during this diameter expansion process.

As a result of this lining work, a lining pipe R that fills the cross section of the tubular culvert P is formed; at the same time, back-filling work is performed on this long lining pipe.

28 Claims, 50 Drawing Sheets

FOREIGN PATENT DOCUMENTS

| | | |
|---|---|---|
| EP | 0 902 224 A1 * | 3/1999 |
| JP | 2-194928 | 8/1990 |
| JP | 9-207216 | 8/1997 |
| JP | 9-280419 | 10/1997 |
| JP | 11-254531 | 9/1999 |
| WO | 90/05873 | 5/1990 |

* cited by examiner (a)

(b)

(a)

(b)

180° + β

(a)

(b)

(a)

(b)

(a)

(b)

METHOD AND DEVICE FOR LINING CONSTRUCTION IN SEWER FOLLOWED BY SIMULTANEOUS FILLING OF BACK-FILL MATERIAL

TECHNICAL FIELD

The present invention relates to a tubular culvert interior lining method and lining apparatus for applying a lining layer to the interior surfaces of existing tubular culverts such as sewage pipes, water mains, gas pipes and the like, and more particularly relates to a tubular culvert interior lining method and lining apparatus in which a lining is formed by the insertion of a so-called lining pipe, consisting of a tubular body that is formed by the spiral winding of a strip-like member consisting of an elongated sheet-form material, into the interior of the tubular culvert.

In particular, the present invention deals mainly with the application of a lining that is accompanied by a back-filling material injection treatment; however, the technical concept of the present invention is not limited to this.

BACKGROUND ART

In tubular culverts, lining methods in which a pipe manufacturing apparatus that is self-propelled with a revolving motion is used to form a tubular body by spirally winding a continuously supplied elongated strip-like member that has joint parts formed on both side edge parts around the circumference of the forming frame of the pipe manufacturing apparatus, and engaging the joint parts that contact each other, after which this tubular body is left in place, and another tubular body is added by means of a strip-like member that is newly supplied to the front of this tubular body that has already been formed, have already been proposed, and are universally known.

Specifically, in the technique disclosed in Japanese Patent Application Laid-Open No. 8-261363, the forming frame is freely bendable, and can be applied not only to tubular culverts with a circular cross section, but also to tubular culverts with a rectangular cross section; furthermore, a flexible lining pipe can be molded so that the cross-sectional shape of this lining pipe conforms as closely as possible to the cross section of the tubular culvert. Furthermore, the technique disclosed in Japanese Patent Application Laid-Open No. 9-57850 is used on tubular culverts that have a circular cross section; in this technique, a small-diameter lining pipe is formed, and the diameter of this lining pipe is expanded so that a lining pipe is formed in conformity with the full cross section of the abovementioned circular tubular culvert.

However, in the case of the former technique (Japanese Patent Application Laid-Open No. 8-261363), it is difficult to cause the molded lining pipe to adhere tightly to the interior surface of the tubular culvert; as a result, the diameter of the lining pipe is somewhat smaller than the diameter of the tubular culvert, so that a cross-sectional loss cannot be avoided. Furthermore, in the case of the latter technique (Japanese Patent Application Laid-Open No. 9-57850), although it is certainly possible to form a lining pipe that conforms to the full cross section of the tubular culvert, an expansion operation must be performed each time, and it is not easy to feed in the strip-like member in a continuous operation, so that a bottleneck is created in the work.

Furthermore, in both of these prior-art techniques, a back-filling material such as a bonding cement or the like is injected into the space between the abovementioned lining pipe and the tubular culvert from the standpoint of reinforcement after the lining pipe has been inserted over a long distance. However, the gap between the lining pipe and the tubular culvert is small, so that this injection work involves difficulties. Consequently, the reliability in regard to the finishing [of the tubular culvert lining] is poor, and in the case of the abovementioned latter prior-art technique, such a back-filling operation must in fact be abandoned.

The present invention was devised in order to achieve a further development of the abovementioned prior-art techniques in which lining work is performed using a pipe manufacturing apparatus that is self-propelled with a revolving motion, and in order to find means of solving the problems of such techniques. It is a principal object of the present invention first of all to make it possible to cause the molded lining pipe to conform even more closely to the cross section of the tubular culvert, and secondly to facilitate the work of injecting the back-filling material and thus improve the reliability of such back-filling.

DISCLOSURE OF THE INVENTION (First Invention)

The first invention of the present application relates to a tubular culvert interior lining method, wherein a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this method being characterized in that a back-filling material is injected into the space between the exterior surface of the abovementioned tubular body and the interior surface of the tubular culvert in the abovementioned tubular body formation process.

The first invention of the present application is a concept that is common to all of the embodiments that will be described below, and includes the fact that the formation of the tubular body is accomplished by using a pipe manufacturing apparatus, or by a manual operation performed by a worker. Furthermore, in regard to the position at which the back-filling material is injected, a position of engagement with the newly supplied strip-like member that is as far in front of the already-formed tubular body as possible is desirable; however, the injection position is not necessarily limited to this position, and may be a nearby position or the opposite position.

The back-filling material used in the present invention is concretely indicated in the embodiments below; however, a bonding or non-bonding, expanding or non-expanding cement material or non-cement material (including synthetic resin materials) may be used as long as such use causes no particular problems.

In the first invention of the present application, the injection of the back-filling material proceeds together with the formation of the lining layer; accordingly, the back-filling work can be performed smoothly regardless of the length of the lining layer, and even if the lining layer has bent parts.

(Second Invention)

The second invention of the present application relates to a tubular culvert interior lining method, and is a method in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this method being characterized in that [the abovementioned tubular body] is folded radially inward in a recessed shape at the joint parts of the abovementioned strip-like member or in other arbitrary edge parts of the abovementioned tubular body, the back-filling material is injected into these recessed parts, and the recessed parts are then caused to return radially outward [to the original shape].

In this method, the use of a machine or tool is recommended; however, manual work is not excluded.

The second invention of the present application is disclosed in the first embodiment.

In the second invention of the present application, [the tubular body] adheres tightly to the interior walls of the tubular culvert in cases where the external circumferential length of the formed tubular body is set so that this length matches the inner circumferential length of the tubular culvert. However, the present invention is not limited to such a configuration; in short, a space for the injection of the back-filling material is provided in recessed parts that are folded radially inward. Furthermore, the tubular culvert may be round, non-round, rectangular or horseshoe-shaped; however, the present invention is preferably applied to a tubular culvert which has a closed cross section that extends in a substantially convex configuration, and the present invention is especially suited to a round cross section. Furthermore, the strip-like member may be elastic or non-elastic; in cases where the strip-like material possesses elasticity, the recovery of the recessed parts is accomplished by means of this elasticity, while in cases where the strip-like material is non-elastic (i.e., plastic), separate recovery means are used for the recovery of the recessed parts. The back-filling material is the same as in the abovementioned first invention of the present application.

In the second invention of the present application, the injection of the back-filling material proceeds along with the formation of the lining layer; accordingly, the back-filling work can be performed smoothly regardless of the length of the lining layer. Furthermore, since the tubular body that is formed is caused to adhere as tightly as possible to the interior walls of the tubular culvert, the cross-sectional loss caused by the lining layer is minimized; moreover, since the back-filling material is injected into folded recessed parts that are oriented radially inward during the formation process of the tubular body, the injection of the back-filling material is facilitated, so that the working efficiency is improved.

(Third Invention)

The third invention of the present application relates to a circular culvert interior lining method, and is a method in which a tubular body, which is formed by spirally winding a continuously elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this method being characterized in that a forming frame with an internal-circumference regulating system that allows expanding and contracting displacement in the radial direction is used, at least a clamping mechanism part which has an inner face roller and an outer face roller that clamp the abovementioned strip-like member from the inside and outside, and a freely rotating contact roller that contacts the wall surface of the tubular culvert, are disposed on the abovementioned forming frame, the portion of the abovementioned forming frame on which the contact roller is installed is recessed radially inward, the location of the abovementioned installed tubular body that corresponds to the contact roller is folded radially inward and the back-filling material is injected into the recessed part, and the recessed part is then caused to return radially outward [to its original shape].

In this method, [lining] is accomplished using a machine that is equipped with an internal circumference regulating type forming frame. Here, the term "internal circumference regulation" refers to a pipe manufacturing configuration in which the internal diameter of the formed tubular body is regulated as a result of the [forming frame] contacting the inside surface of the wound strip-like member.

The third invention of the present application is disclosed in the first embodiment.

In the third invention of the present application, the forming frame is not limited to a circular or a radial configuration. Further, the clamping mechanism part may double as a bonding mechanism positioned at the joint parts of the strip-like member, but is not limited to this.

In the invention of the present application, the external circumferential length of the formed tubular body, the cross-sectional shape of the tubular culvert that is used, the elasticity or non-elasticity of the strip-like member, and the back-filling material all conform to those of the second invention of the present application.

Furthermore, in the abovementioned configuration, whether:

(1) the contact roller is a feed roller which is disposed so that this roller moves in linkage with the joining mechanism part, with the outside surface of this roller protruding to the outermost point, and with this roller applying a feeding driving force in the direction in which the strip-like member is spirally wound; or (2) the contact roller is a spacer roller which is disposed so that this roller moves in linkage with the joining mechanism part, with the outside surface of this roller protruding to the outermost point, and with this roller rotating freely;

is a matter for personal choice.

In the working of the third invention of the present application, the contact roller is always maintained in contact with the inside surface of the tubular culvert.

In the third invention of the present application, the injection of the back-filling material proceeds along with the formation of the lining layer; accordingly, the back-filling work can be performed smoothly regardless of the length of the lining layer. Furthermore, since the tubular body that is formed is caused to adhere as tightly as possible to the interior walls of the tubular culvert, the cross-sectional loss caused by the lining layer is minimized; moreover, since the back-filling material is injected into folded recessed parts that are oriented radially inward during the formation process of the tubular body, the injection of the back-filling material is facilitated, so that the working efficiency is improved.

Furthermore, as a result of the use of a forming frame, the formation of the tubular body is made more efficient.

(Fourth Invention)

The fourth invention of the present application relates to a tubular culvert interior lining method, and is a method in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, [the apparatus used in this method] comprising:

a closed type forming frame which is devised so that this forming frame is freely bendable by means of a link mechanism comprising a series of connected link bodies;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member;

a freely rotating contact roller which is disposed in the abovementioned joining mechanism part, and whose outside surface protrudes to the outermost point and contacts the wall surface of the tubular culvert; and a back-filling material injection tube which is disposed after the abovementioned joining mechanism part in the direction of advance adjacent to the outer face roller of the abovementioned joining mechanism part, and which has at least a discharge port for the back-filling material located to the inside of the abovementioned outer face roller;

this method being characterized in that the abovementioned forming frame is caused to rotate, the link bodies of the abovementioned joining mechanism part are placed in a folded state via the abovementioned contact roller that is caused to contact the wall surface of the tubular culvert, a lining pipe is formed by spirally winding the strip-like member around the abovementioned forming frame, and the back-filling material is injected from the abovementioned injection tube in synchronization with the formation of the abovementioned lining pipe.

The fourth invention of the present application is disclosed in the first embodiment.

In this invention, an elastic body is used as the strip-like member. Furthermore, there are no restrictions on the shape of the outside surface of this strip-like member; however, in cases where there are recessed grooves in this outside surface, it is desirable that a configuration in which the outer face roller of the joining mechanism parts has hook parts that fit into the recessed grooves of the abovementioned strip-like member be employed. Otherwise, the external circumferential length of the formed tubular body, the cross-sectional shape of the tubular culvert that is used, and the back-filling material, all conform to the previously described second and third inventions of the present application.

Furthermore, in the abovementioned construction, the following are optional items:

(1) The contact roller may be a feed roller which is disposed so that this roller moves in linkage with the joining mechanism part, with the outside surface of this roller protruding to the outermost point, and with this roller applying a feeding driving force in the direction in which the strip-like member is spirally wound.

(2) The contact roller may be a spacer roller which is disposed so that this roller moves in linkage with the joining mechanism part, with the outside surface of this roller protruding to the outermost point, and with this roller rotating freely.

(3) A circumferential length adjustment mechanism which allows the free alteration of the circumferential length of the abovementioned forming frame may be installed on the forming frame.

In the working of the fourth invention of the present application, the contact roller is always maintained in contact with the inside surface of the tubular culvert.

In the fourth invention of the present application, the injection of the back-filling material proceeds along with the formation of the lining layer; accordingly, the back-filling work can be performed smoothly regardless of the length of the lining layer. Furthermore, since the tubular body that is formed is caused to adhere as tightly as possible to the interior walls of the tubular culvert, the cross-sectional loss caused by the lining layer is minimized; moreover, since the back-filling material is injected into folded recessed parts that are oriented radially inward during the formation process of the tubular body, quick working is possible.

Furthermore, as a result of the use of a strip-like material that possesses elasticity, the forming frame conforms to the elastic shape of the strip-like member in areas other than the location where the contact roller is disposed, so that there is an immediate recovery from the folding deformation caused by the contact roller; accordingly, the desired lining layer can be automatically formed.

Furthermore, the back-filling material enters the recessed grooves in the strip-like member, so that the lining pipe is reinforced, and so that the lining pipe adheres even more tightly to the inside surface of the tubular culvert.

(Fifth Invention)

The fifth invention of the present application relates to a tubular culvert interior lining method, and is a method in which a tubular body, which is formed by spirally winding a continuously supplied elongated strip-like member that has recessed grooves formed in the direction of length in its outside surface and joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, [the apparatus used in this method] comprising:

a closed type forming frame which is devised so that this forming frame is freely bendable by means of a link mechanism comprising a series of connected link bodies, and in which the inward folding of the respective links is restricted;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member, wherein the abovementioned outer face roller has hook parts that are inserted into the recessed grooves of the abovementioned strip-like member;

a freely rotating contact roller which is disposed in the abovementioned joining mechanism part, and whose outside surface protrudes to the outermost point and contacts the wall surface of the tubular culvert; and a back-filling material injection tube which is disposed after the abovementioned joining mechanism part in the direction of advance adjacent to the outer face roller of the abovementioned joining mechanism part, and which has at least a discharge port for the back-filling material located to the inside of the abovementioned outer face roller;

this method being characterized in that the restriction of inward folding of the link bodies of the forming frame to which the abovementioned joining mechanism part is attached is released, the abovementioned forming frame is caused to rotate, the link bodies of the abovementioned joining mechanism part are placed in an inwardly folded state via the abovementioned contact roller that is caused to contact the wall surface of the tubular culvert, a lining pipe is formed by spirally winding the strip-like member around the abovementioned forming frame, and a back-filling material is injected from the abovementioned injection tube in synchronization with the formation of the abovementioned lining pipe.

The fifth invention of the present invention is disclosed in the first embodiment.

In the fifth invention of the present invention, the strip-like member has recessed grooves in its outside surface, and an elastic body is used as this strip-like member. Otherwise, the external circumferential length of the formed tubular body, the cross-sectional shape of the tubular culvert that is used, and the back-filling material, all conform to the previously described second, third and fourth inventions of the present application. Furthermore, the contact roller and circumferential length adjustment mechanism of the forming frame also conform to the fourth invention.

In the working of this invention, the contact roller is always maintained in contact with the inside surface of the tubular culvert.

In this invention, the injection of the back-filling material proceeds along with the formation of the lining layer; accordingly, the back-filling work can be performed smoothly regardless of the length of the lining layer. Furthermore, since the tubular body that is formed is caused to adhere as tightly as possible to the interior walls of the tubular culvert, the cross-sectional loss caused by the lining layer is minimized; moreover, since the back-filling material is injected into folded recessed parts that are oriented radially inward during the formation process of the tubular body, quick working is possible.

Furthermore, as a result of the use of a strip-like material that possesses elasticity, the forming frame conforms to the elastic shape of the strip-like member in areas other than the location where the contact roller is disposed, so that there is an immediate recovery from the folding deformation caused by the contact roller; accordingly, the desired lining layer can be automatically formed.

Furthermore, the back-filling material enters the recessed grooves in the strip-like member, so that the lining pipe is reinforced, and so that the lining pipe adheres even more tightly to the inside surface of the tubular culvert. Since inward folding of the forming frame is possible only at the location where the joining mechanism part is disposed, a secure tubular body can be formed.

(Sixth Invention)

The sixth invention of the present application relates to a tubular culvert interior lining apparatus, and is used mainly in the working of the method of the fourth invention. This apparatus is a lining apparatus in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this apparatus comprising:

a closed type forming frame which is devised so that this forming frame is freely bendable by means of a link mechanism comprising a series of connected link bodies;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member;

a freely rotating contact roller which is disposed in the abovementioned joining mechanism part, and whose outside surface protrudes to the outermost point and contacts the wall surface of the tubular culvert; and a back-filling material injection tube which is disposed after the abovementioned joining mechanism part in the direction of advance adjacent to the outer face roller of the abovementioned joining mechanism part, and which has at least a discharge port for the back-filling material located to the inside of the abovementioned outer face roller.

This invention is disclosed in the first embodiment.

In the abovementioned construction, the following are optional items:

(1) The contact roller may be a feed roller which is disposed so that this roller moves in linkage with the joining mechanism part, with the outside surface of this roller protruding to the outermost point, and with this roller applying a feeding driving force in the direction in which the strip-like member is spirally wound.

(2) The contact roller may be a spacer roller which is disposed so that this roller moves in linkage with the joining mechanism part, with the outside surface of this roller protruding to the outermost point, and with this roller rotating freely.

(3) A circumferential length adjustment mechanism which allows the free alteration of the circumferential length of the abovementioned forming frame may be installed on the forming frame.

(Seventh Invention)

The seventh invention of the present application relates to a tubular culvert interior lining apparatus, and is used mainly in the working of the method of the fifth invention. This apparatus is a lining apparatus in which a tubular body, which is formed by spirally winding a continuously supplied elongated strip-like member that has recessed grooves formed in the direction of length in its outside surface and joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this apparatus comprising:

a closed type forming frame which is devised so that this forming frame is freely bendable by means of a link mechanism comprising a series of connected link bodies, and in which the inward folding of the respective links is restricted;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member, wherein the abovementioned outer face roller has hook parts that are inserted into the recessed grooves of the abovementioned strip-like member;

a freely rotating contact roller which is disposed in the abovementioned joining mechanism part, and whose outside surface protrudes to the outermost point and contacts the wall surface of the tubular culvert; and a back-filling material injection tube which is disposed after the abovementioned joining mechanism part in the direction of advance adjacent to the outer face roller of the abovementioned joining mechanism part, and which has at least a discharge port for the back-filling material located to the inside of the abovementioned outer face roller;

this method being characterized in that the restriction of inward folding of the link bodies of the forming frame to which the abovementioned joining mechanism part is attached is released.

This invention is disclosed in the first embodiment.

In the abovementioned construction, the contact roller and the circumferential length adjustment mechanism of the forming frame conform to the sixth invention.

(Eighth Invention)

The eighth invention of the present application relates to a tubular culvert interior lining apparatus, and is characterized in that in the abovementioned sixth invention and seventh invention, the outer face roller and/or inner face roller of the joining mechanism part are rotationally driven by receiving a driving force from an operating motor that is driven by the pressure of an operating-pressure fluid, an injection coupling tube which communicates with the back-filling material injection tube is disposed in the axial center of an operating fluid rotary coupling in the operating-pressure fluid path that leads to the abovementioned joining mechanism part so that this injection coupling tube can be freely inserted and removed, and a back-filling material rotary coupling is interposed between the abovementioned back-filling material injection tube and the abovementioned injection coupling tube.

The eighth invention of the present application is disclosed in the first embodiment.

In this invention, the operating-pressure fluid may be either a hydraulic oil or pressurized air.

In this rotary coupling device, the operating-pressure fluid system (hydraulic system or air pressure system) and the back-filling material system use a coaxial structure; accordingly, the size of the rotary coupling device can be reduced so that the space required for installation can be reduced, and a flow path cross section with a maximum diameter can be ensured by causing the injection coupling tube of the back-filling material system to pass through the axial center of the pressure fluid rotary coupling part, so that a large amount of filling material can be supplied.

Furthermore, since the back-filling material rotary coupling part can be removed from the rotary coupling device by a simple operation, a quick cleaning operation can be performed with respect to the bonding back-filling material following the completion of the lining work or during an interruption of the work at an intermediate point. As a result, smooth lining work can be realized.

(Ninth Invention)

The ninth invention of the present application relates to a rotary coupling device that is used in the tubular culvert interior lining apparatus of the abovementioned sixth invention and seventh invention, and is characterized in that the outer face roller and/or inner face roller of the joining mechanism part are rotationally driven by receiving a driving force from an operating motor that is driven by the pressure of an operating-pressure fluid, an injection coupling tube which communicates with the back-filling material injection tube is disposed in the axial center of an operating fluid rotary coupling in the operating-pressure fluid path that leads to the abovementioned joining mechanism part so that this injection coupling tube can be freely inserted and removed, and a back-filling material rotary coupling is interposed between the abovementioned back-filling material injection tube and the abovementioned injection coupling tube.

The ninth invention of the present application is disclosed in the first embodiment.

In this rotary coupling device, the operating-pressure fluid system (hydraulic system or air pressure system) and the back-filling material system use a coaxial structure; accordingly, the size of the rotary coupling device can be reduced so that the space required for installation can be reduced, and a flow path cross section with a maximum diameter can be ensured by causing the injection coupling tube of the back-filling material system to pass through the axial center of the pressure fluid rotary coupling part, so that a large amount of filling material can be supplied.

Furthermore, since the back-filling material rotary coupling part can be removed from the rotary coupling device by a simple operation, a quick cleaning operation can be performed with respect to the bonding back-filling material following the completion of the lining work or during an interruption of the work at an intermediate point.

(Tenth Invention)

The tenth invention of the present application relates to still another tubular culvert interior lining method, and is a method in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this method being characterized in that an annular forming frame is used, a lining apparatus is used in which at least a clamping mechanism part that has an outer face roller and an inner face roller that clamp and join the abovementioned strip-like member from the inside and outside, and a plurality of guide rollers that are free to rotate and that contact the inside surface or outside surface of the strip-like member, are installed on the abovementioned forming frame, and a feed mechanism part is provided which is attached so that this feed mechanism part moves in linkage with the abovementioned forming frame, and which applies a feeding force to the abovementioned forming frame by contacting the wall surfaces of the tubular culvert, the abovementioned strip-like member is formed into a tubular body with a diameter that is smaller than the internal diameter of the tubular culvert by the annular regulation of the abovementioned forming frame, a lining is continuously formed while expanding the diameter of the abovementioned tubular body and causing this tubular body to approach the inside surface of the tubular culvert by causing [the spans of] the abovementioned strip-like member to slide relative to each other during the formation process of this tubular body, and a back-filling material is simultaneously injected into the space between the outside surface of the tubular body and the inside surface of the tubular culvert during the abovementioned expansion of the diameter from a back-filling material injection tube that is attached to the abovementioned lining apparatus.

The tenth invention of the present application is disclosed in the second and third embodiments.

This invention is used for internal-circumference regulation and external-circumference regulation. Here, the term "external-circumference regulation" refers to a pipe-making configuration in which the external diameter of the tubular body that is formed is regulated by contacting the outside surface of the strip-like member that is wound.

In this invention, the back-filling material conforms to the first invention, and the strip-like member may be either elastic or non-elastic.

Furthermore, in this invention, the expansion of the diameter of the tubular body is accomplished by applying a shear force between the joints of the strip-like member.

Factors that expand the diameter include the braking force of the lining apparatus (including the forming frame), the driving speed of the lining apparatus, the feeding speed of the strip-like member, the feeding force of this strip-like member and the like; the conditions of the expansion of the diameter of the tubular body are determined by appropriately controlling these diameter expanding factors.

As one configuration of the abovementioned expansion of the diameter, the following are optional matters that may be appropriately selected:

(1) The lining apparatus may be caused to rotate and advance by the feeding force of the strip-like member that accompanies the formation of the tubular body, and a braking force may be caused to act on this rotation and advance of the lining apparatus.

(2) The lining apparatus may be driven so that the apparatus rotates and advances at a slower speed that the speed that balances the rate at which the tubular body is formed.

Furthermore, the detection of the conditions of this expansion of the diameter, and the stabilization of these diameter expansion conditions by controlling the diameter expanding factors on the basis of the detected value, are also included in the present invention.

In the tenth invention of the present application, the injection of the back-filling material proceeds along with the formation of the lining layer; accordingly, the back-filling work can be performed smoothly regardless of the length of the lining layer. Furthermore, since the tubular body that is formed is caused to adhere as tightly as possible to the interior walls of the tubular culvert, the cross-sectional loss caused by the lining layer is minimized.

(Eleventh Invention)

The eleventh invention of the present application relates to a tubular culvert interior lining method, and is characterized in that in the abovementioned lining method of the tenth invention, a forming frame with internal-circumference regulation is used, the apparatus used is equipped with an external-circumference regulating frame body which is disposed on the outside of the abovementioned forming frame with a specified gap left between this external-circumference regulating frame body and the forming frame, and which is arranged so that this external-circumference regulating frame body moves in linkage with the abovementioned forming frame, and is caused to surround the external circumference of the lining pipe that is wound around the abovementioned forming frame, and the expansion of the diameter of the tubular body is regulated by the abovementioned external circumference regulating frame body.

The eleventh invention is disclosed in the second embodiment.

In this invention, the back-filling material, strip-like member and expansion of the diameter of the tubular body conform to the tenth invention described above.

In the eleventh invention of the present application, the injection of the back-filling material proceeds along with the formation of the lining layer; accordingly, the back-filling work can be performed smoothly regardless of the length of the lining layer. Furthermore, since the tubular body that is formed is caused to adhere as tightly as possible to the interior walls of the tubular culvert, the cross-sectional loss caused by the lining layer is minimized. Furthermore, as a result of the action of the external-circumference regulating frame body, the diameter expanding operation of the lining pipe can be performed smoothly.

(Twelfth Invention)

The twelfth invention of the present application relates to a tubular culvert interior lining apparatus (including an internal and external-circumference regulating system), and is used mainly in the working of the method of the tenth invention. This apparatus is a lining apparatus in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this apparatus being characterized in that the apparatus has an annular forming frame, a clamping mechanism part that has an outer face roller and an inner face roller that clamp and join the abovementioned strip-like member from the inside and outside, and a plurality of guide rollers that are free to rotate and that contact the inside surface or outside surface of the strip-like member, are installed on the abovementioned forming frame, a feed mechanism part is provided which is attached so that this feed mechanism part moves in linkage with the abovementioned forming frame, and which applies a feeding force to the abovementioned forming frame by contacting the wall surfaces of the tubular culvert, and a back-filling material injection tube is installed via the abovementioned forming frame.

The eleventh invention of the present application is disclosed in the second and third embodiments.

This invention is used for internal-circumference regulation and external-circumference regulation.

In this invention, the back-filling material conforms to the first invention; furthermore, the strip-like member may be either elastic or non-elastic.

(Thirteenth Invention)

The thirteenth invention of the present application relates to a tubular culvert interior lining apparatus (with an internal circumference regulating system), and is used in the method of the eleventh invention. This apparatus is a lining apparatus in which a tubular body, which is formed by spirally winding a continuously supplied elongated strip-like member that has recessed grooves formed in the direction of length in its outside surface and joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this apparatus being characterized in that the apparatus comprises at least:

a forming frame which has a specified width and which maintains an annular shape;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, wherein the abovementioned outer face roller has hook parts that are inserted into the recessed grooves of the abovementioned strip-like member;

a feed mechanism part which is attached so that this feed mechanism part moves in linkage with the abovementioned forming frame, this feed mechanism part having freely rotating rollers that contact the wall surfaces of the tubular culvert, and this feed mechanism part maintaining the abovementioned forming frame in the center of the tubular culvert by causing the abovementioned rollers to contact the wall surfaces of the tubular culvert;

an external-circumference regulating frame body which is disposed on the outside of the abovementioned forming frame with a specified gap left between this external-circumference regulating frame body and the forming frame, and which is arranged so that this external-circumference regulating frame body moves in linkage with the abovementioned forming frame, and is caused to surround the external circumference of the lining pipe that is wound around the abovementioned forming frame; and a back-filling material injection tube which is attached via the abovementioned forming frame.

The thirteenth invention of the present application is disclosed in the second embodiment.

(Fourteenth Invention)

The fourteenth invention of the present application relates to still another tubular culvert interior lining method, and is a method in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this method being characterized in that a forming frame with an internal-circumference regulating system that allows expanding and contracting displacement in the radial direction is used, at least a clamping mechanism part which has an inner face roller and an outer face roller that clamp the abovementioned strip-like member from the inside and outside, and a freely rotating contact roller that contacts the wall surface of the tubular culvert, are disposed on the abovementioned forming frame, the portions of the abovementioned forming frame on which the contact roller is installed are recessed radially inward, and a lining pipe is formed by spirally winding a strip-like member around the abovementioned forming frame.

The fourteenth invention of the present application is disclosed in the fourth embodiment.

In this invention, the clamping mechanism part can also be used as a joining mechanism that is disposed in the joint area of the strip-like member; however, the present invention is not limited to this.

In this invention, the external circumferential length of the tubular body that is formed, the cross-sectional shape of the tubular culvert that is used, and the elasticity or non-elasticity of the strip-like member, conform to the previously described second invention.

Furthermore, in the abovementioned construction, the following are optional items:

(1) The contact roller may be a feed roller which is disposed so that this roller moves in linkage with the joining mechanism part, with the outside surface of this roller protruding to the outermost point, and with this roller applying a feeding driving force in the direction in which the strip-like member is spirally wound.

(2) The contact roller may be a spacer roller which is disposed so that this roller moves in linkage with the joining mechanism part, with the outside surface of this roller protruding to the outermost point, and with this roller rotating freely.

In the working of this invention, the contact roller is always maintained in contact with the inside surface of the tubular culvert.

In this invention, the tubular body that is formed is caused to adhere as tightly as possible to the interior walls of the tubular culvert; accordingly, the cross-sectional loss caused by the lining layer is minimized.

In cases where the strip-like member possesses elasticity, the forming frame conforms to the elastic shape of the strip-like member in areas other than the location where the contact roller is disposed, so that there is an immediate recovery from the folding deformation caused by the contact roller; accordingly, the desired lining layer can be automatically formed. Furthermore, in the case of a non-elastic strip-like member, separate recovery means are used.

(Fifteenth Invention)

The fifteenth invention of the present application relates to still another tubular culvert interior lining method, and is a method in which a tubular body, which is formed by spirally winding a continuously supplied elongated strip-like member that possesses elasticity and that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, [the apparatus used in this method] comprising:

a closed type forming frame which is devised so that this forming frame is freely bendable by means of a link mechanism comprising a series of connected link bodies;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member; and a freely rotating contact roller which is disposed in the abovementioned joining mechanism part, and whose outside surface protrudes to the outermost point and contacts the wall surface of the tubular culvert;

this method being characterized in that the abovementioned forming frame is caused to rotate, the link bodies of the abovementioned joining mechanism part are placed in a folded state via the abovementioned contact roller that is caused to contact the wall surface of the tubular culvert, and a lining pipe is formed by spirally winding the strip-like member around the abovementioned forming frame.

The fifteenth invention of the present application is disclosed in the fourth embodiment.

In this invention, an elastic body is used as the strip-like member. Otherwise, the external circumferential length of the tubular body that is formed and the cross-sectional shape of the tubular culvert that is used conform to the previously described second and fourteenth inventions.

Furthermore, in the abovementioned construction, the following are optional items:

(1) The contact roller may be a feed roller which is disposed so that this roller moves in linkage with the joining mechanism part, with the outside surface of this roller protruding to the outermost point, and with this roller applying a feeding driving force in the direction in which the strip-like member is spirally wound.

(2) The contact roller may be a spacer roller which is disposed so that this roller moves in linkage with the joining mechanism part, with the outside surface of this roller protruding to the outermost point, and with this roller rotating freely.

(3) A circumferential length adjustment mechanism which allows the free alteration of the circumferential length of the abovementioned forming frame may be installed on the forming frame.

In the working of this invention, the contact roller is always maintained in contact with the inside surface of the tubular culvert.

In this invention, the tubular body that is formed is caused to adhere as tightly as possible to the interior walls of the tubular culvert; accordingly, the cross-sectional loss caused by the lining layer is minimized.

Furthermore, as a result of the use of a strip-like material that possesses elasticity, the forming frame conforms to the elastic shape of the strip-like member in areas other than the location where the contact roller is disposed, so that there is an immediate recovery from the folding deformation caused by the contact roller; accordingly, the desired lining layer can be automatically formed.

(Sixteenth Invention)

The sixteenth invention of the present application relates to still another tubular culvert interior lining method, and is a method in which a tubular body, which is formed by spirally winding a continuously supplied elongated strip-like member possessing elasticity that has recessed grooves formed in the direction of length in its outside surface and joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, [the apparatus used in this method] comprising:

a closed type forming frame which is devised so that this forming frame is freely bendable by means of a link mechanism comprising a series of connected link bodies, and in which the inward folding of the respective links is restricted;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member, wherein the abovementioned outer face roller has hook parts that are inserted into the recessed grooves of the abovementioned strip-like member; and a freely rotating contact roller which is disposed in the abovementioned joining mechanism part, and whose outside surface protrudes to the outermost point and contacts the wall surface of the tubular culvert;

this method being characterized in that the restriction of inward folding of the link bodies of the forming frame to which the abovementioned joining mechanism part is attached is released, the abovementioned forming frame is caused to rotate, the link bodies of the abovementioned joining mechanism part are placed in an inwardly folded state via the abovementioned contact roller that is caused to contact the wall surface of the tubular culvert, and a lining pipe is formed by spirally winding the strip-like member around the abovementioned forming frame.

The sixteenth invention of the present application is disclosed in the fourth embodiment.

In the sixteenth invention of the present application, the strip-like member has recessed grooves in its outside surface, and an elastic body is used as this strip-like member. Otherwise, the external circumferential length of the formed tubular body and the cross-sectional shape of the tubular culvert that is used conform to the previously described second, fourteenth and fifteenth inventions. Furthermore, the contact roller and circumferential length adjustment mechanism of the forming frame also conform to the fifteenth invention.

In the working of this invention, the contact roller is always maintained in contact with the inside surface of the tubular culvert.

In this invention, the tubular body that is formed is caused to adhere as tightly as possible to the interior walls of the tubular culvert; accordingly, the cross-sectional loss caused by the lining layer is minimized.

Furthermore, as a result of the use of a strip-like material that possesses elasticity, the forming frame conforms to the elastic shape of the strip-like member in areas other than the location where the contact roller is disposed, so that there is an immediate recovery from the folding deformation caused by the contact roller; accordingly, the desired lining layer can be automatically formed. Furthermore, since inward folding of the forming frame is possible only at the location where the joining mechanism part is disposed, a secure tubular body can be formed.

(Seventeenth Invention)

The seventeenth invention of the present application relates to a tubular culvert interior lining apparatus, and is used mainly in the working of the fifteenth invention. This apparatus is [an apparatus used in] a method in which a tubular body, which is formed by spirally winding a continuously supplied elongated strip-like member that possesses elasticity and that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this apparatus comprising:

a closed type forming frame which is devised so that this forming frame is freely bendable by means of a link mechanism comprising a series of connected link bodies;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member; and a freely rotating contact roller which is disposed in the abovementioned joining mechanism part, and whose outside surface protrudes to the outermost point and contacts the wall surface of the tubular culvert.

The seventeenth invention of the present application is disclosed in the fourth embodiment.

In the abovementioned construction, the following are optional items:

(1) The contact roller may be a feed roller which is disposed so that this roller moves in linkage with the joining mechanism part, with the outside surface of this roller protruding to the outermost point, and with this roller applying a feeding driving force in the direction in which the strip-like member is spirally wound.

(2) The contact roller may be a spacer roller which is disposed so that this roller moves in linkage with the joining mechanism part, with the outside surface of this roller protruding to the outermost point, and with this roller rotating freely.

(3) A circumferential length adjustment mechanism which allows the free alteration of the circumferential length of the abovementioned forming frame may be installed on the forming frame.

(Eighteenth Invention)

The eighteenth invention of the present application relates to a tubular culvert interior lining apparatus, and is used mainly in the working of the method of the sixteenth invention. This apparatus is a lining apparatus in which a tubular body, which is formed by spirally winding a continuously supplied elongated strip-like member possessing elasticity that has recessed grooves formed in the direction of length in its outside surface and joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, the apparatus comprising:

a closed type forming frame which is devised so that this forming frame is freely bendable by means of a link mechanism comprising a series of connected link bodies, and in which the inward folding of the respective links is restricted;

a plurality of guide rollers which are mounted around the abovementioned forming frame so that these guide rollers are free to rotate, and which contact the inside surface of the lining pipe that is formed by spirally winding a strip-like member;

a joining mechanism part which is attached to the abovementioned forming frame, and which consists of an outer face roller and inner face roller that are disposed in the joint area between the abovementioned already-formed lining pipe and newly supplied strip-like member, and that clamp and join the strip-like member, wherein the abovementioned outer face roller has hook parts that are inserted into the recessed grooves of the abovementioned strip-like member; and a freely rotating contact roller which is disposed in the abovementioned joining mechanism part, and whose outside surface protrudes to the outermost point and contacts the wall surface of the tubular culvert;

this apparatus being characterized in that that the restriction of inward folding of the link bodies of the forming frame to which the abovementioned joining mechanism part is attached is released.

This invention is disclosed in the fourth embodiment.

In the abovementioned construction, the contact roller and the circumferential length adjustment mechanism of the forming frame conform to the sixth invention.

(Nineteenth Invention)

The nineteenth invention of the present application relates to still another tubular culvert interior lining method, and is a method in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this method being characterized in that an annular forming frame is used, a lining apparatus is used in which at least a clamping mechanism part that has an outer face roller and an inner face roller that clamp and join the abovementioned strip-like member from the inside and outside, and a plurality of guide rollers that are free to rotate and that contact the inside surface or outside surface of the strip-like member, are installed on the abovementioned forming frame, and a feed mechanism part is provided which is attached so that this feed mechanism part moves in linkage with the abovementioned forming frame, and which applies a feeding force to the abovementioned forming frame by contacting the wall surfaces of the tubular culvert, the abovementioned strip-like member is formed into a tubular body with a diameter that is smaller than the internal diameter of the tubular culvert by the annular regulation (internal-circumference regulation, external-circumference regulation) of the abovementioned forming frame, a lining is continuously formed while expanding the diameter of the abovementioned tubular body and causing this tubular body to approach the inside surface of the tubular culvert by causing [the spans of] the abovementioned strip-like member to slide relative to each other during the formation process of this tubular body, and the feed-in speed of the strip-like member is controlled on the basis of the angle of the expansion in the diameter of the tubular body, while the abovementioned lining apparatus is caused to propel itself at a constant rotating and advancing speed.

The nineteenth invention of the present application is disclosed in the second, third and fifth embodiments.

This invention is used for internal-circumference regulation and external-circumference regulation. It is desirable that an external-circumference regulating frame body be used in combination in the internal-circumference regulation.

In this invention, the strip-like member may be either elastic or non-elastic.

In this invention, the expansion of the diameter of the tubular body is accomplished by applying a shear force between the joints of the strip-like member.

The angle of the expansion in the diameter of the tubular body is [detected] using an appropriate detector.

In the nineteenth invention of the present application, the tubular body that is formed is caused to adhere as tightly as possible to the interior walls of the tubular culvert; accordingly, the cross-sectional loss caused by the lining layer is minimized. Furthermore, since the conditions of the expansion of the diameter are detected, and the diameter expansion operation is performed on the basis of this detected value, stabilized diameter expansion conditions can be obtained.

(Twentieth Invention)

The twentieth invention of the present application relates to a tubular culvert interior lining apparatus, and is used mainly in the working of the method of the nineteenth invention. This apparatus is a lining apparatus in which a tubular body, which is formed by spirally winding a continuously supplied elongated strip-like member that has joint parts formed on both side edge parts, and engaging the joint parts that are in contact with each other, is left in place in the interior of the tubular culvert, and another tubular body is added by means of a strip-like member that is newly supplied in front of the abovementioned tubular body that has already been formed, this apparatus being characterized in that an annular forming frame is used, at least a clamping mechanism part that has an outer face roller and an inner face roller that clamp and join the abovementioned strip-like member from the inside and outside, and a plurality of guide rollers that are free to rotate and that contact the inside surface or outside surface of the strip-like member, are installed on the abovementioned forming frame, a feed mechanism part is provided which is attached so that this feed mechanism part moves in linkage with the abovementioned forming frame, and which applies a feeding force to the abovementioned forming frame by contacting the wall surfaces of the tubular culvert, and means are provided that control the feed-in speed of the abovementioned strip-like member in order to obtain a specified diameter expansion angle of the tubular body, this control being accomplished by using the driving of the abovementioned feed mechanism part to cause rotation [of the lining apparatus] at a constant speed that is slower than the feed-in speed of the abovementioned strip-like member that is determined by the abovementioned clamping mechanism part.

The twentieth invention of the present application is disclosed in the second, third and fifth embodiments.

This invention is used for internal-circumference regulation and external-circumference regulation. In this invention, the strip-like member may be either elastic or non-elastic.

In the twentieth invention of the present application, the lining apparatus is caused to rotate at a constant speed by the driving of the feed mechanism part; accordingly, no excessive stress acts on the feed-in force of the strip-like member, so that stabilized diameter expansion conditions can be obtained.

BRIEF DESCRIPTION OF THE DRAWINGS (First Embodiment)

(Second Embodiment)

Figure 28:
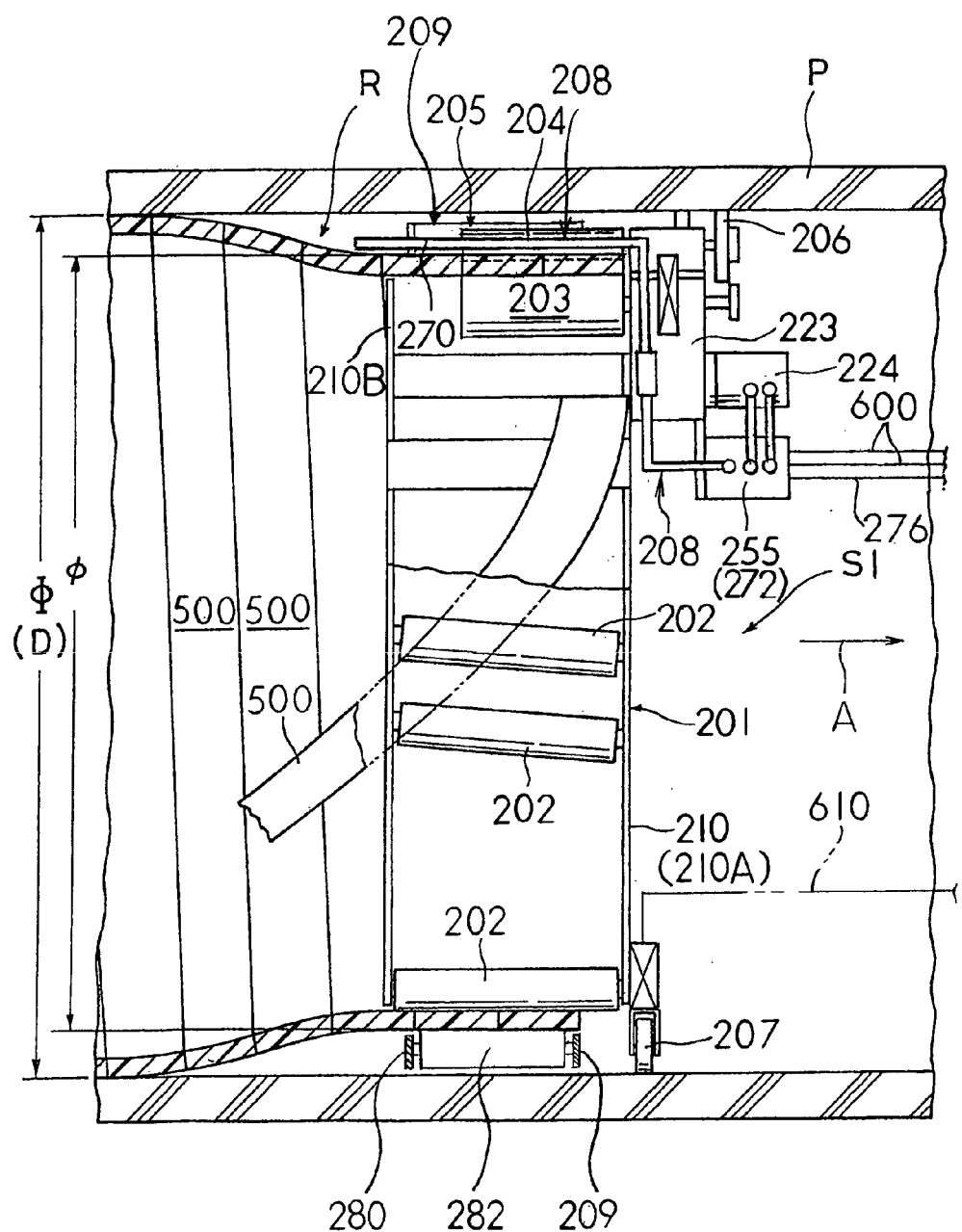
Figure 29:
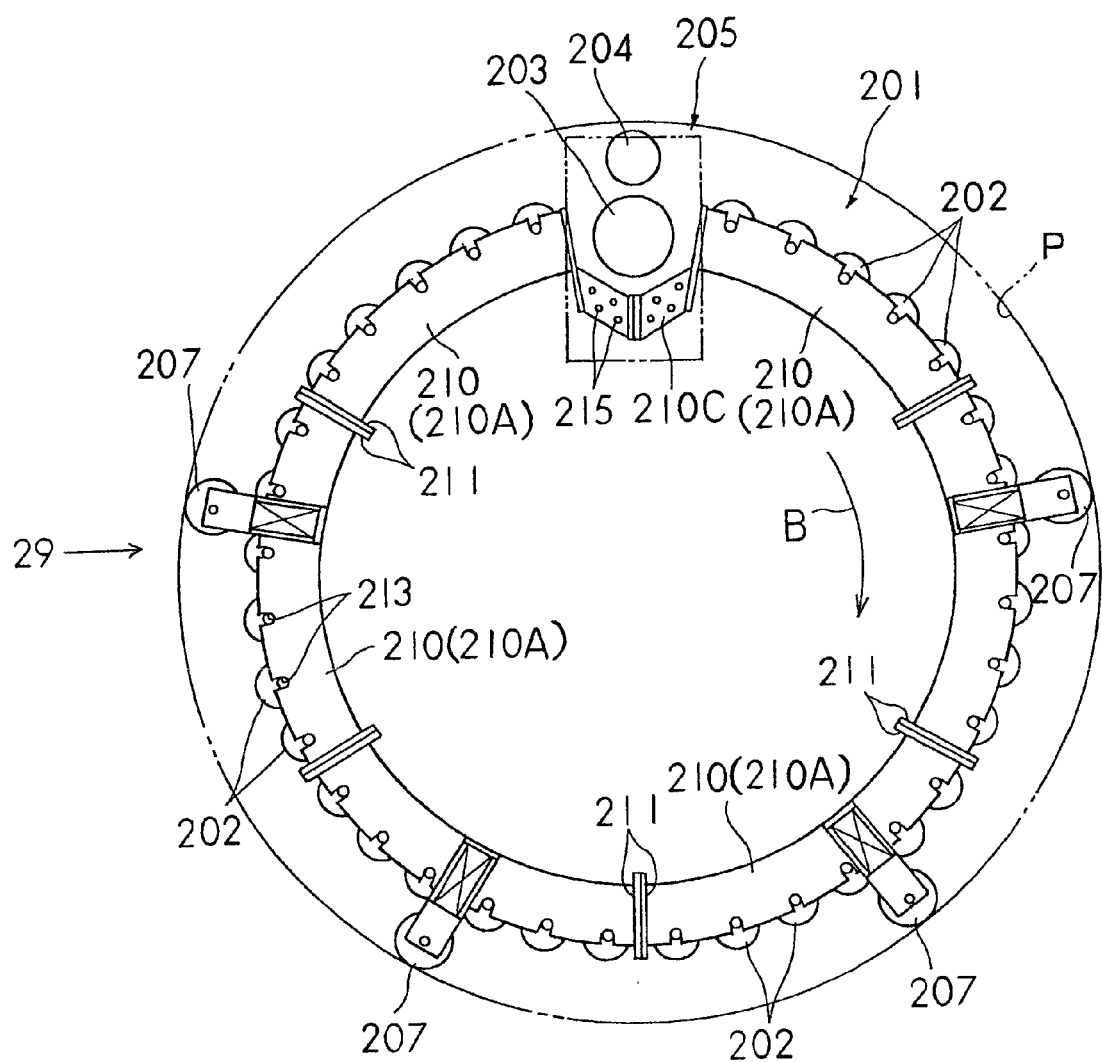
Figure 30:
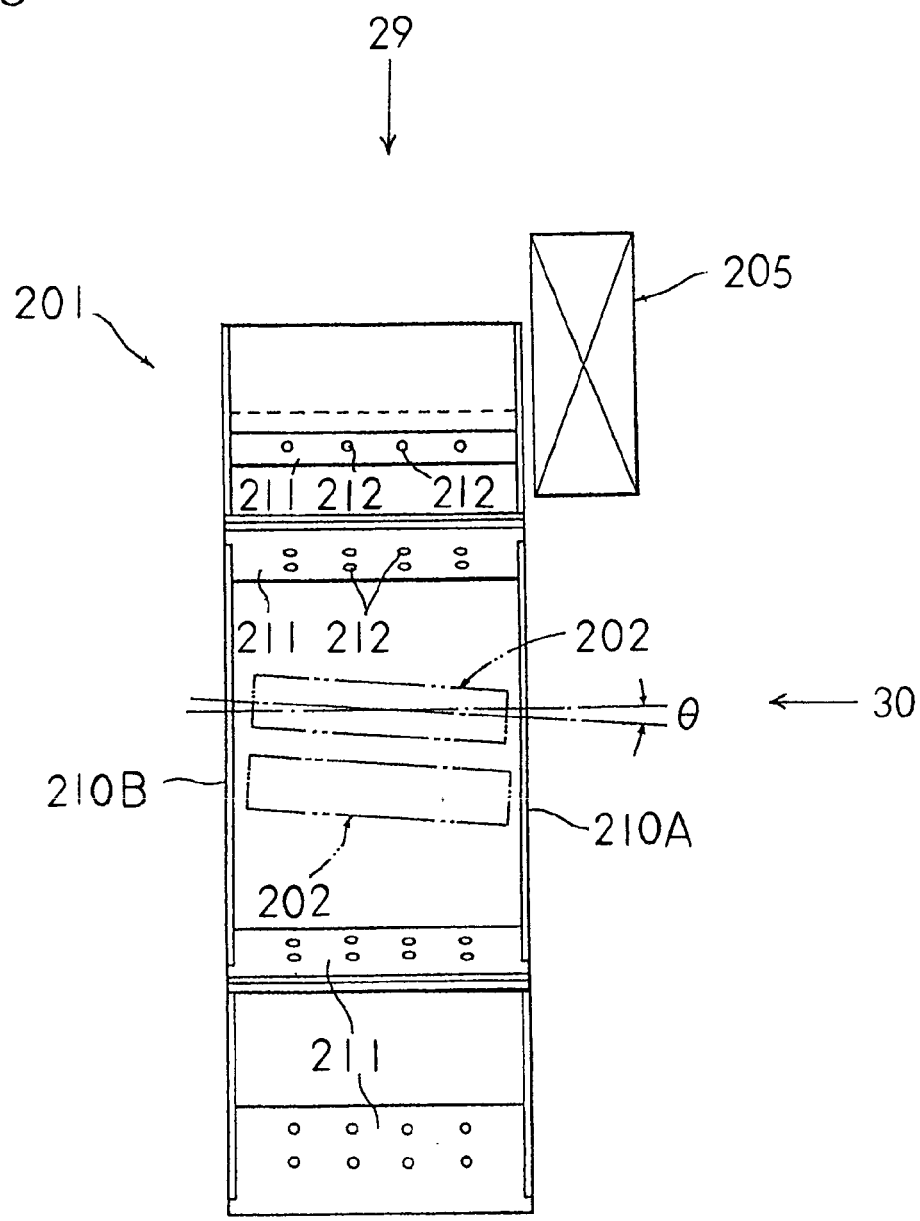
Figure 31:
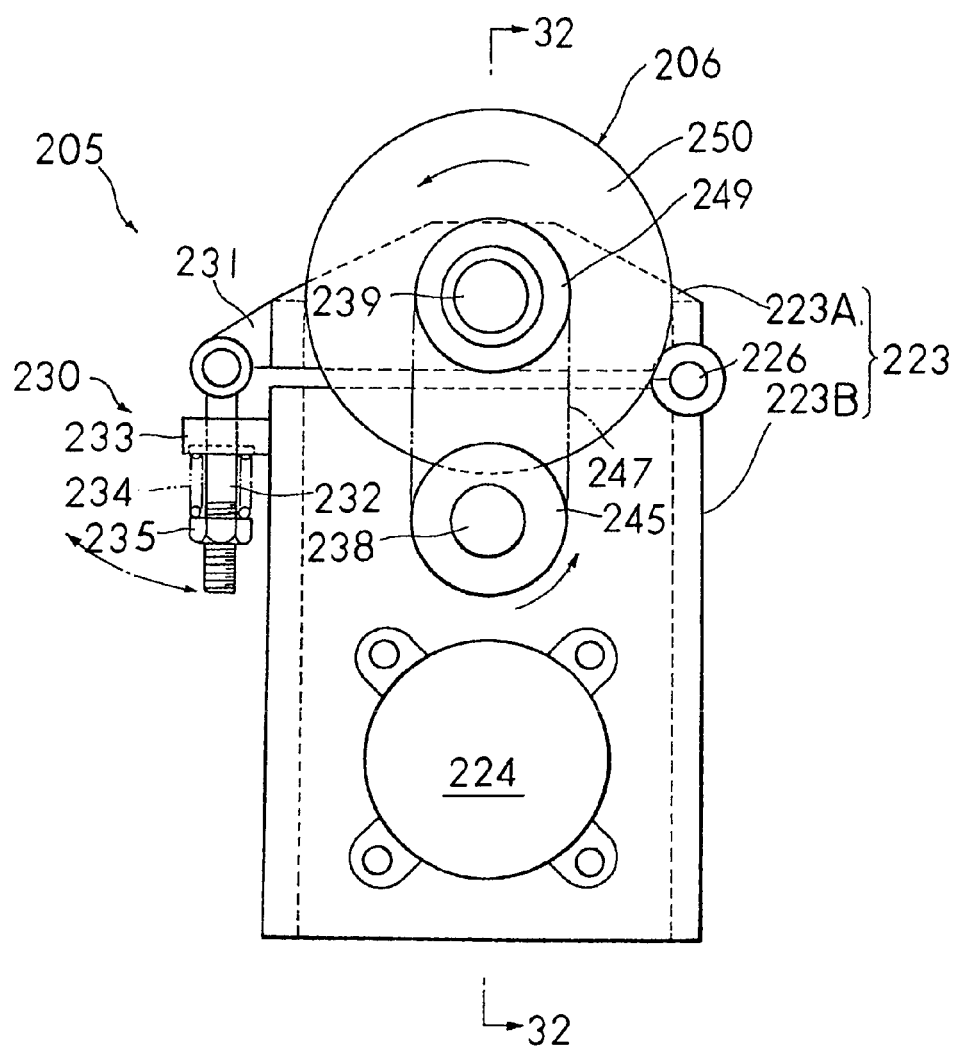
Figure 32:
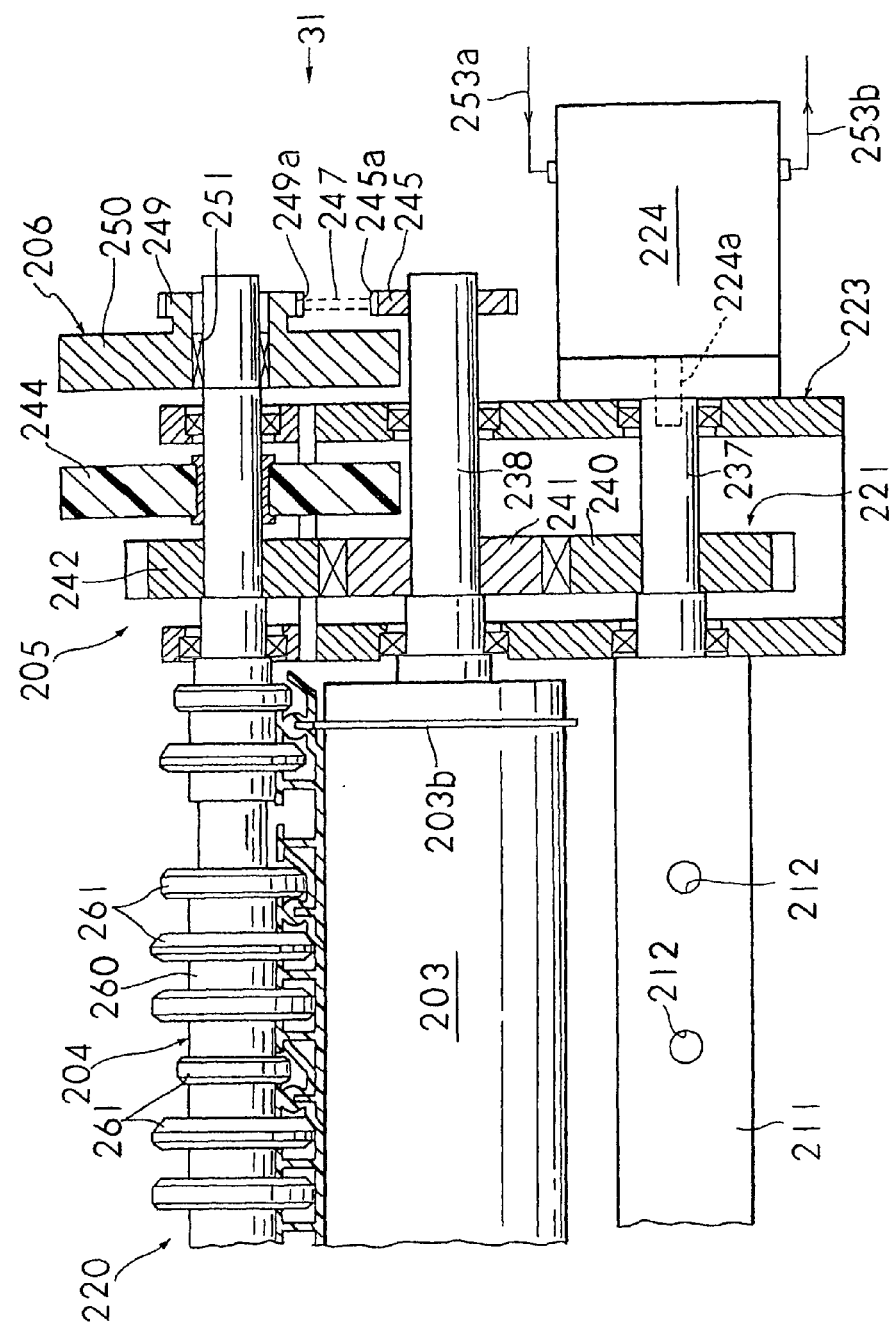
Figure 33:
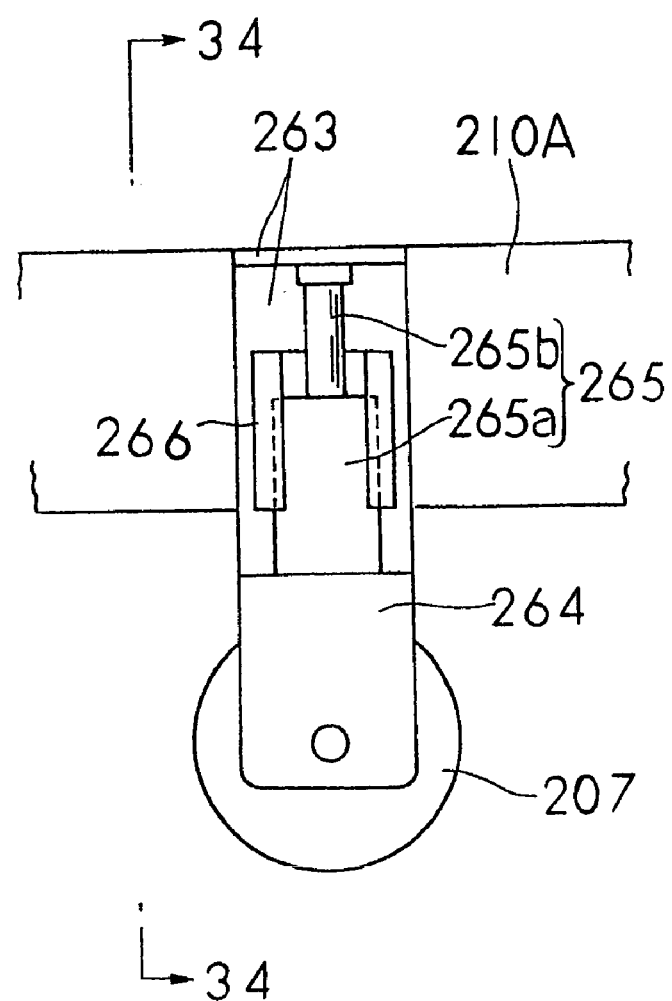
Figure 34:
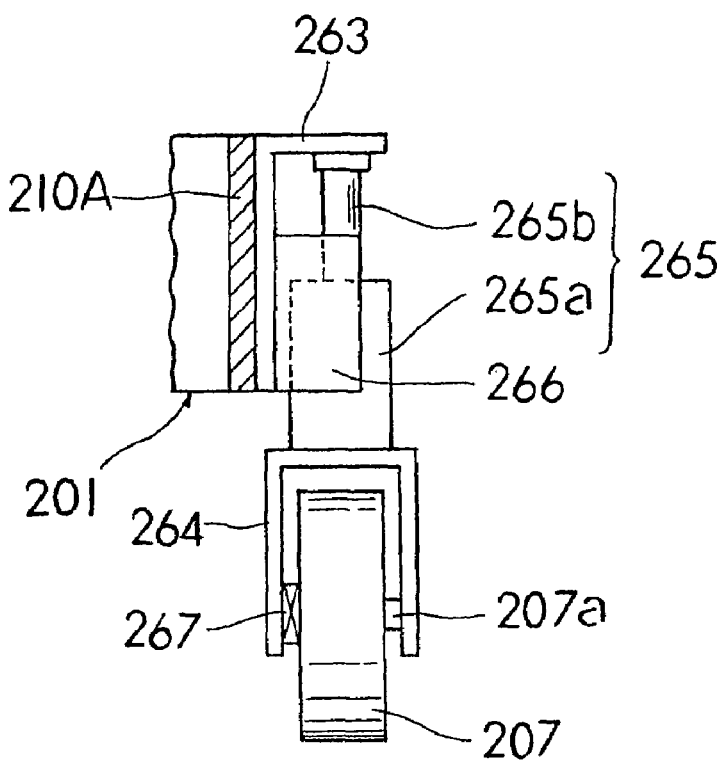
Figure 35:
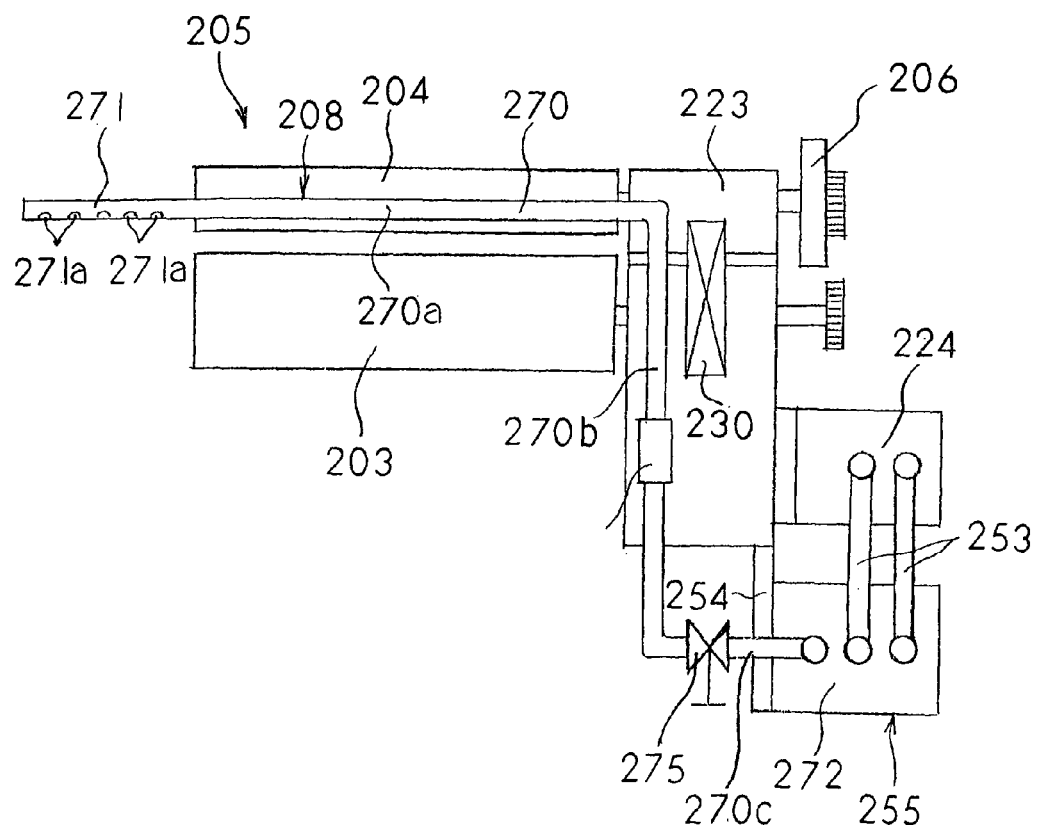
Figure 36:
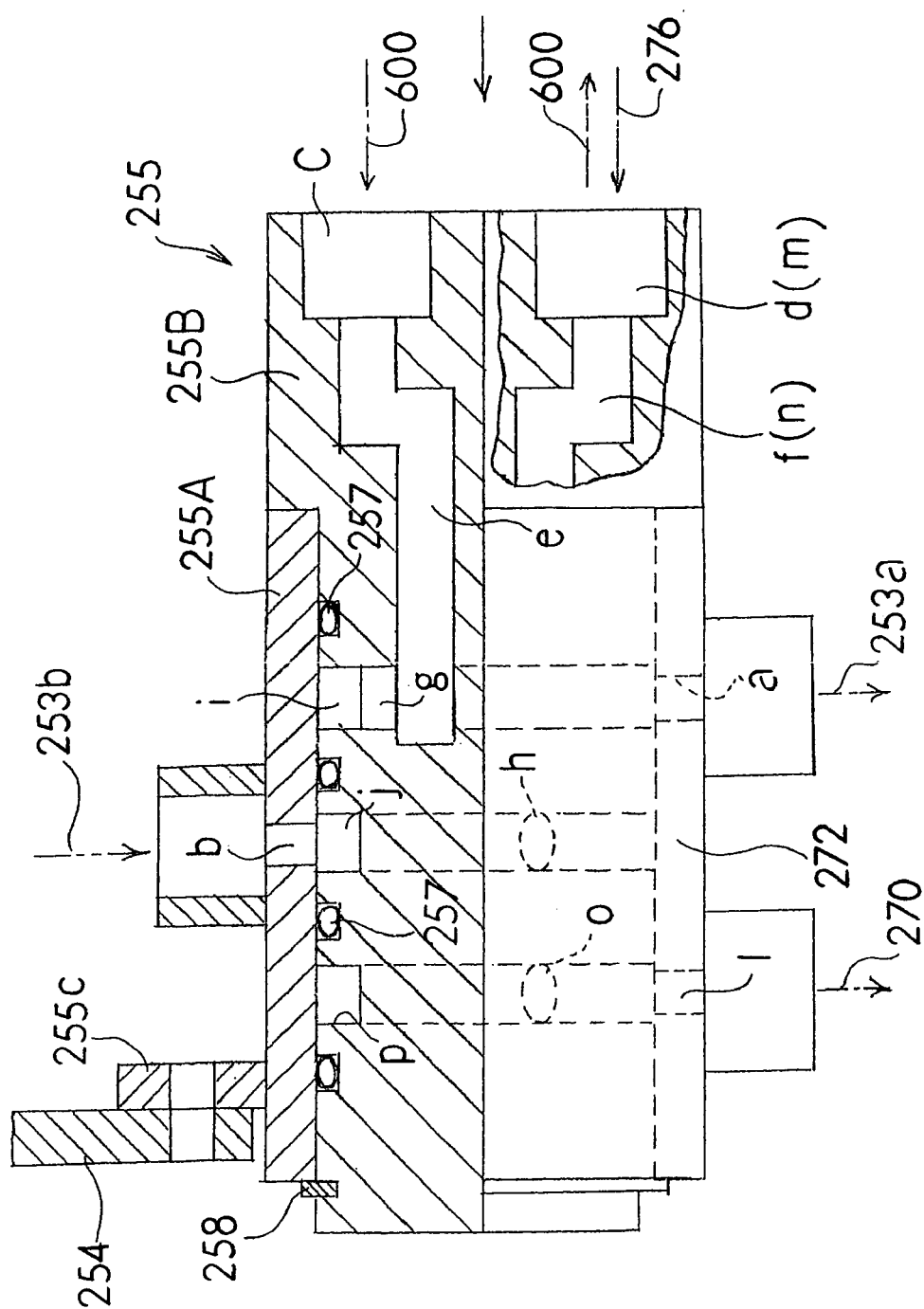
Figure 37:
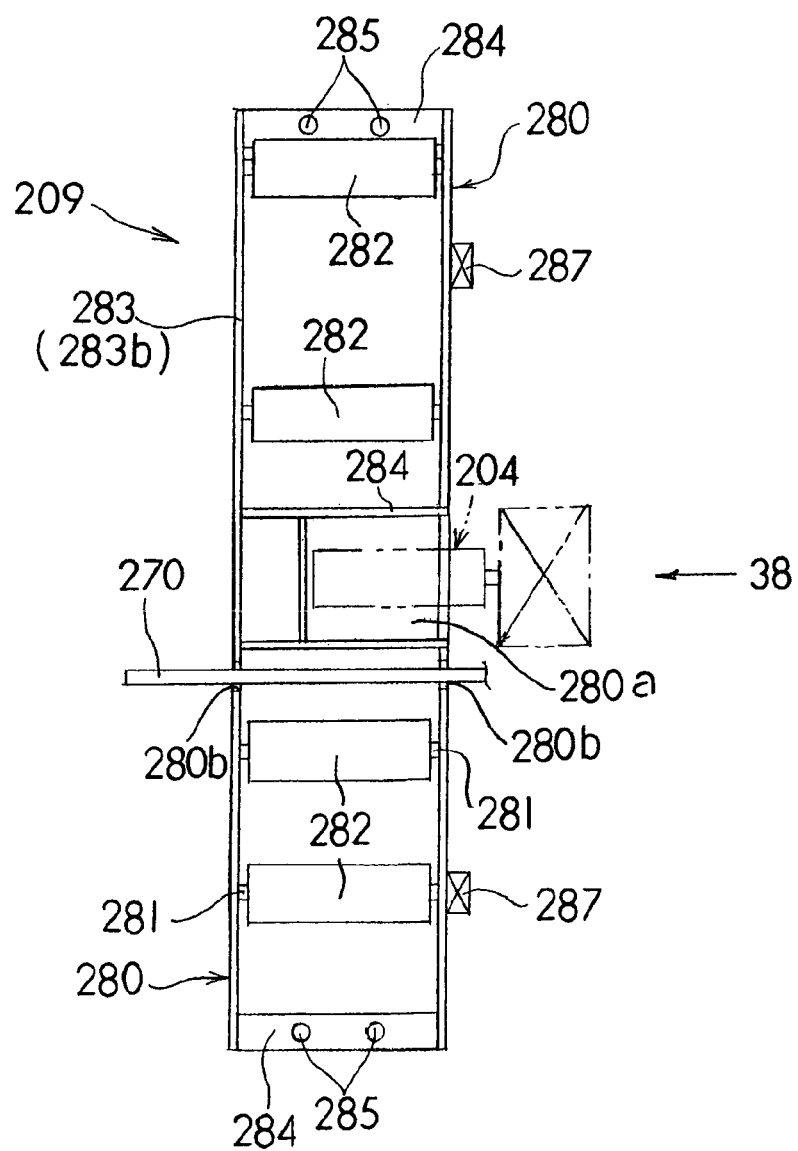
Figure 38:
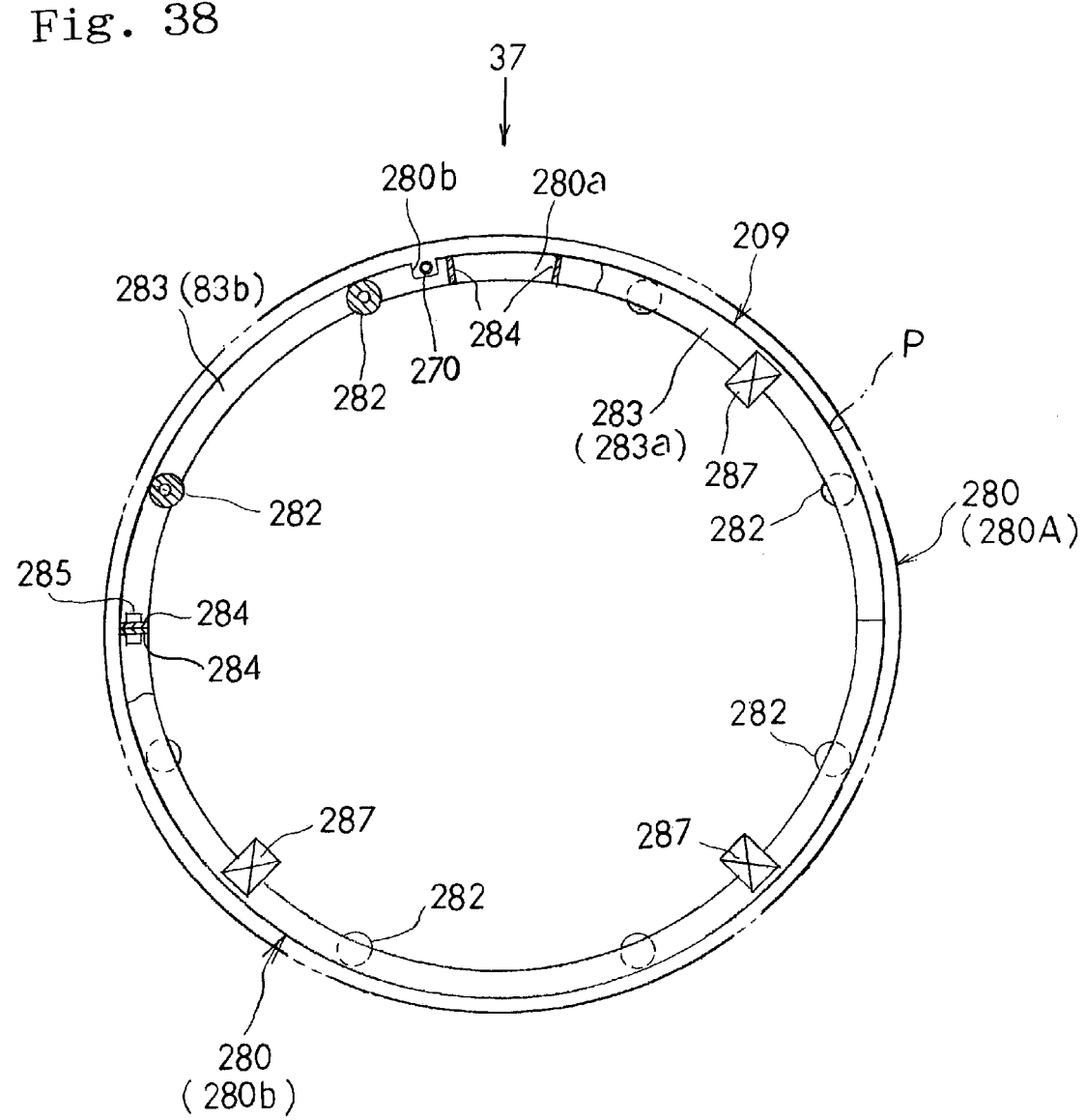
Figure 39:
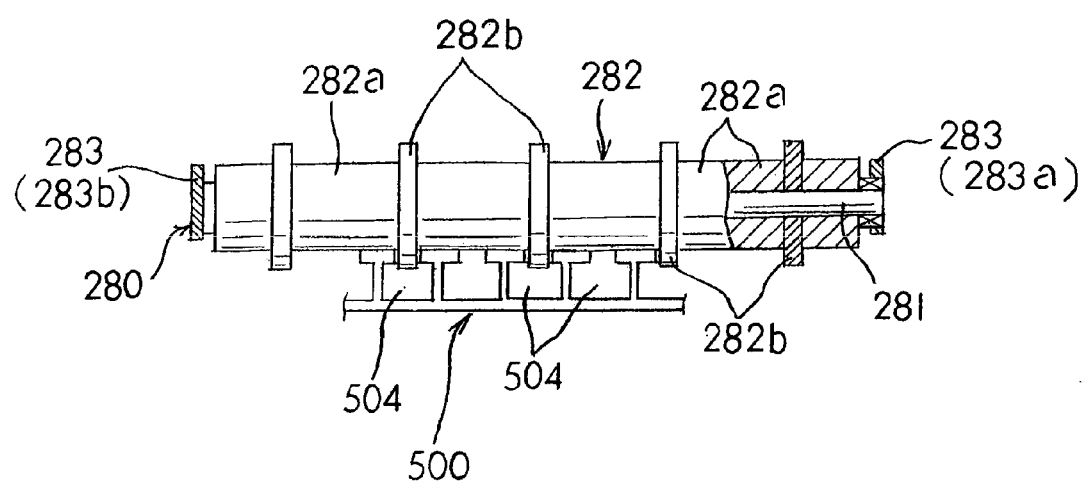
Figure 40:
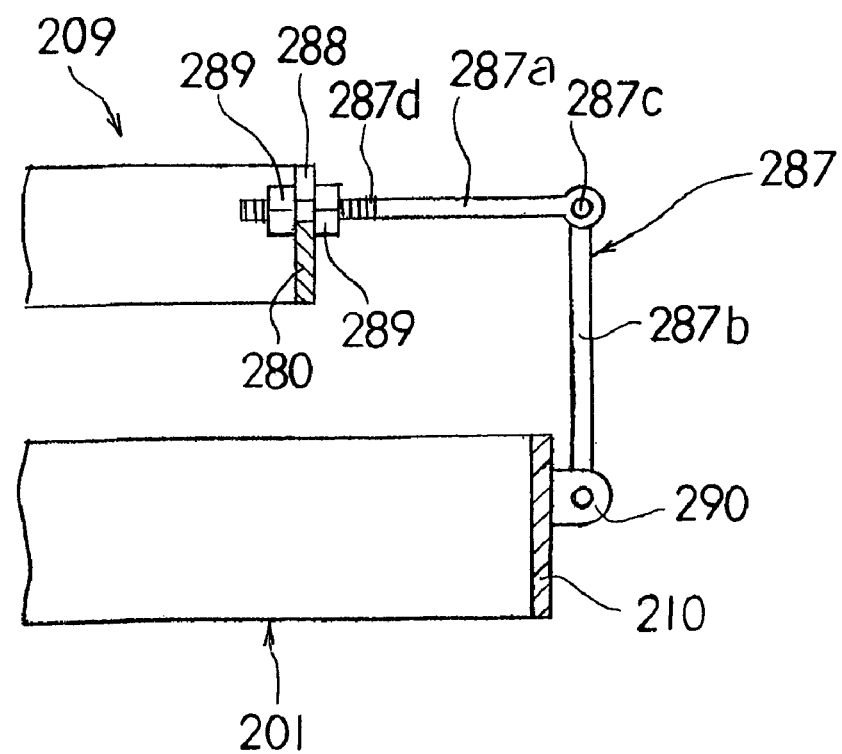
Figure 41:
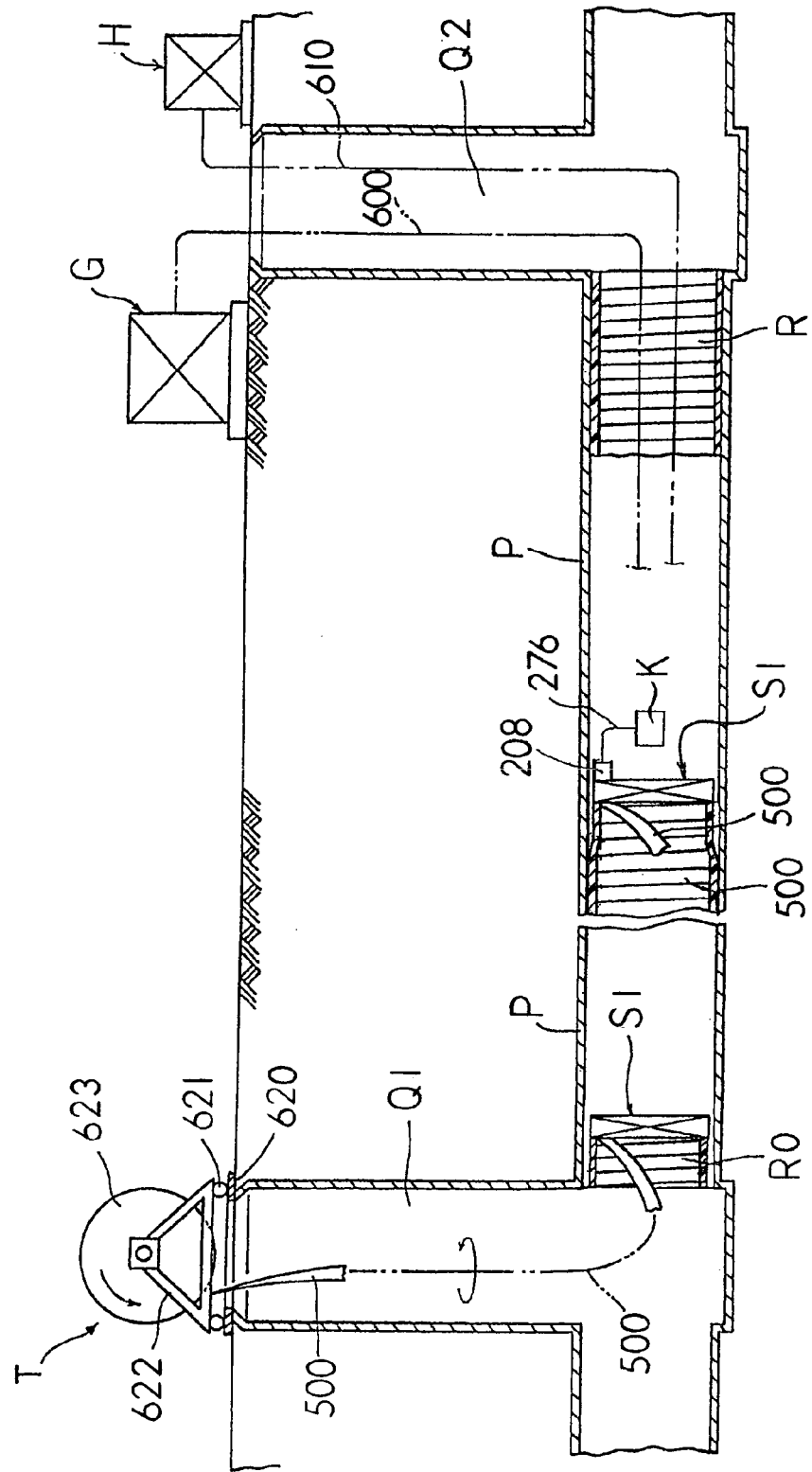
Figure 42:
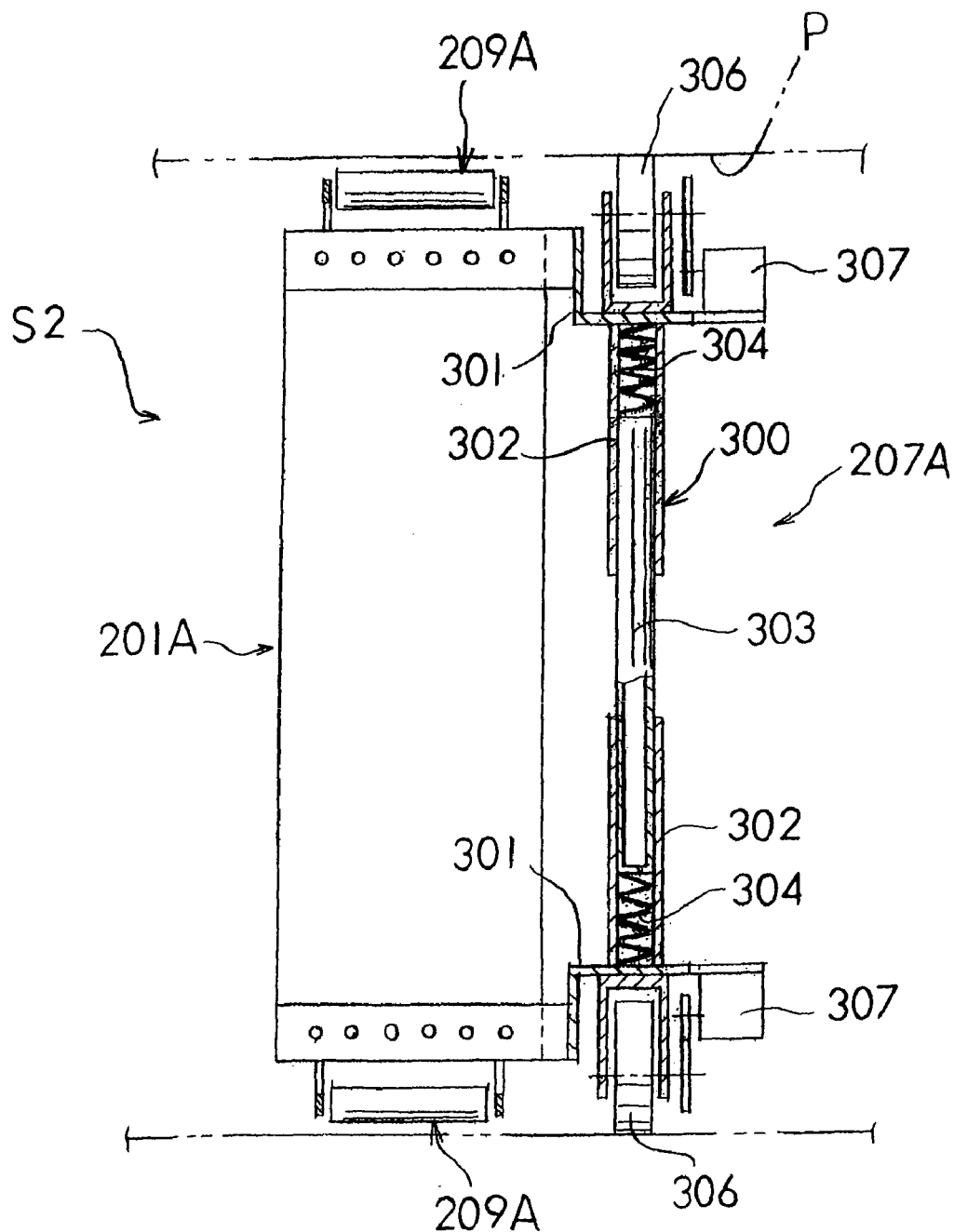
Figure 43:
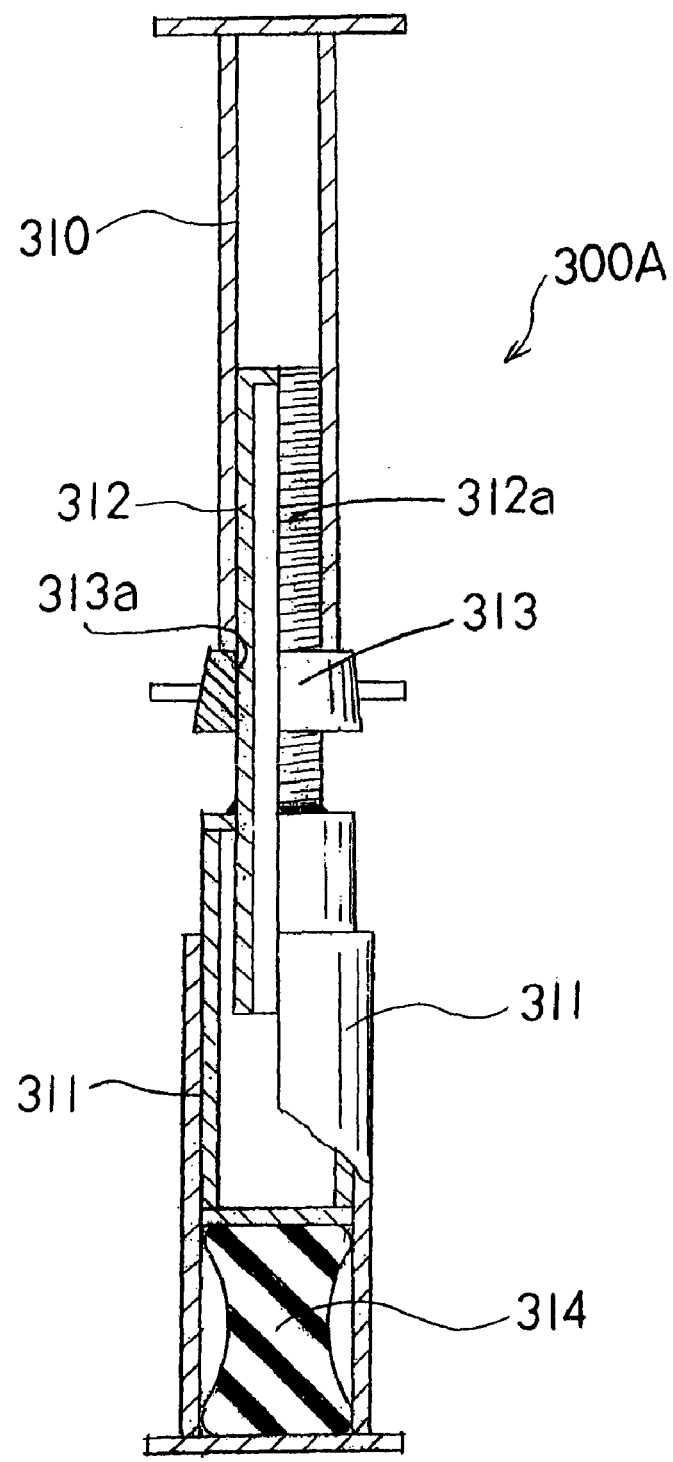
Figure 44:
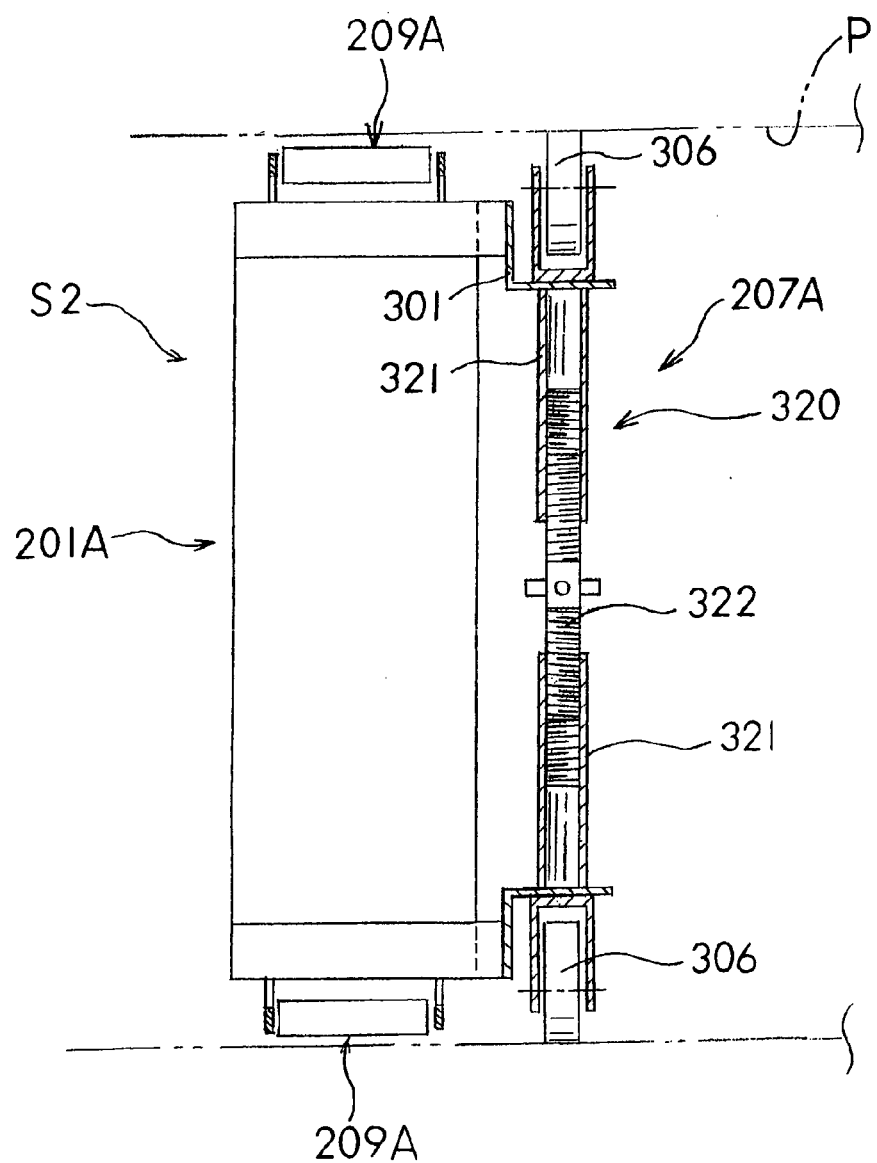

FIG. 28 is a partially longitudinal-sectional partial side view illustrating another embodiment of the tubular culvert interior lining method and lining apparatus of the present invention;

FIG. 29 is a front view of the forming frame of the tubular culvert interior lining apparatus;

FIG. 30 is a side view of the same (in the direction of the arrow 30 in FIG. 29);

FIG. 31 is an enlarged front view of the joining mechanism part;

FIG. 32 is an internal structural diagram (sectional view along line 32—32 in FIG. 31) of the joining mechanism part;

FIG. 33 is a structural side view of the driven feed mechanism part;

FIG. 34 is a structural front view (sectional view along line 34—34 in FIG. 33) of the driven feed mechanism part;

FIG. 35 is a side view which shows the construction of the back-filling material injection mechanism part;

FIG. 36 is a partially sectional partial side view which illustrates the construction of the rotary coupling part;

FIG. 37 is a plan view (in the direction of the arrow 37 in FIG. 38) of one aspect of the external-circumference regulating frame body;

FIG. 38 is a front view (in the direction of the arrow 38 in FIG. 37) of one aspect of the external-circumference regulating frame body;

FIG. 39 is a partially sectional partial side view of the constraining roller;

FIG. 40 is a diagram which shows one example of the connecting mechanism;

FIG. 41 is a diagram showing an outline of the lining application work performed using this lining apparatus;

FIG. 42 is a detailed view of the feed mechanism part;

FIG. 43 is a diagram which shows another aspect of the rod body in the feed mechanism part; and FIG. 44 is a diagram which shows still another aspect of the feed mechanism part.

(Third Embodiment)

Figure 45:
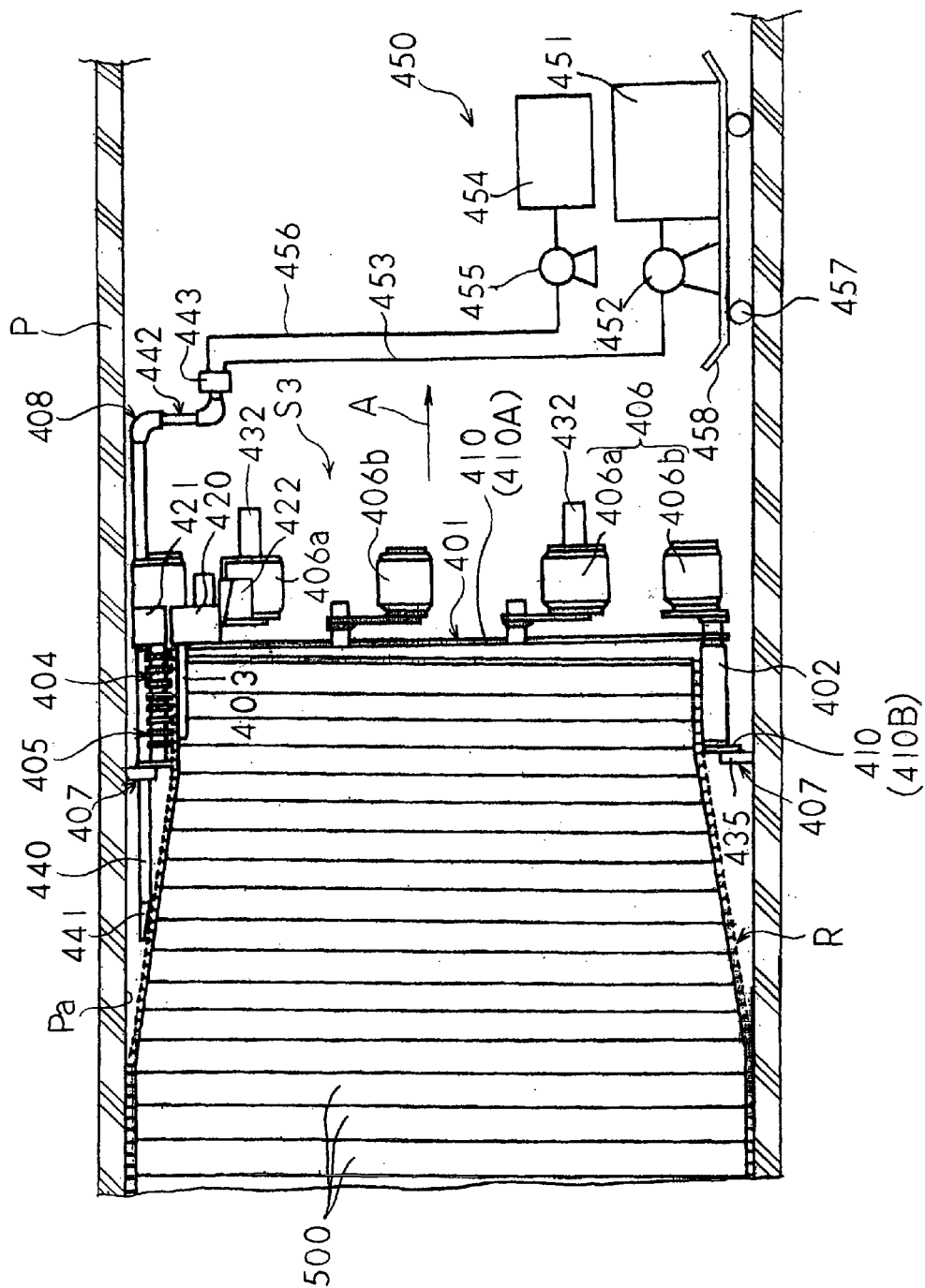
Figure 46:
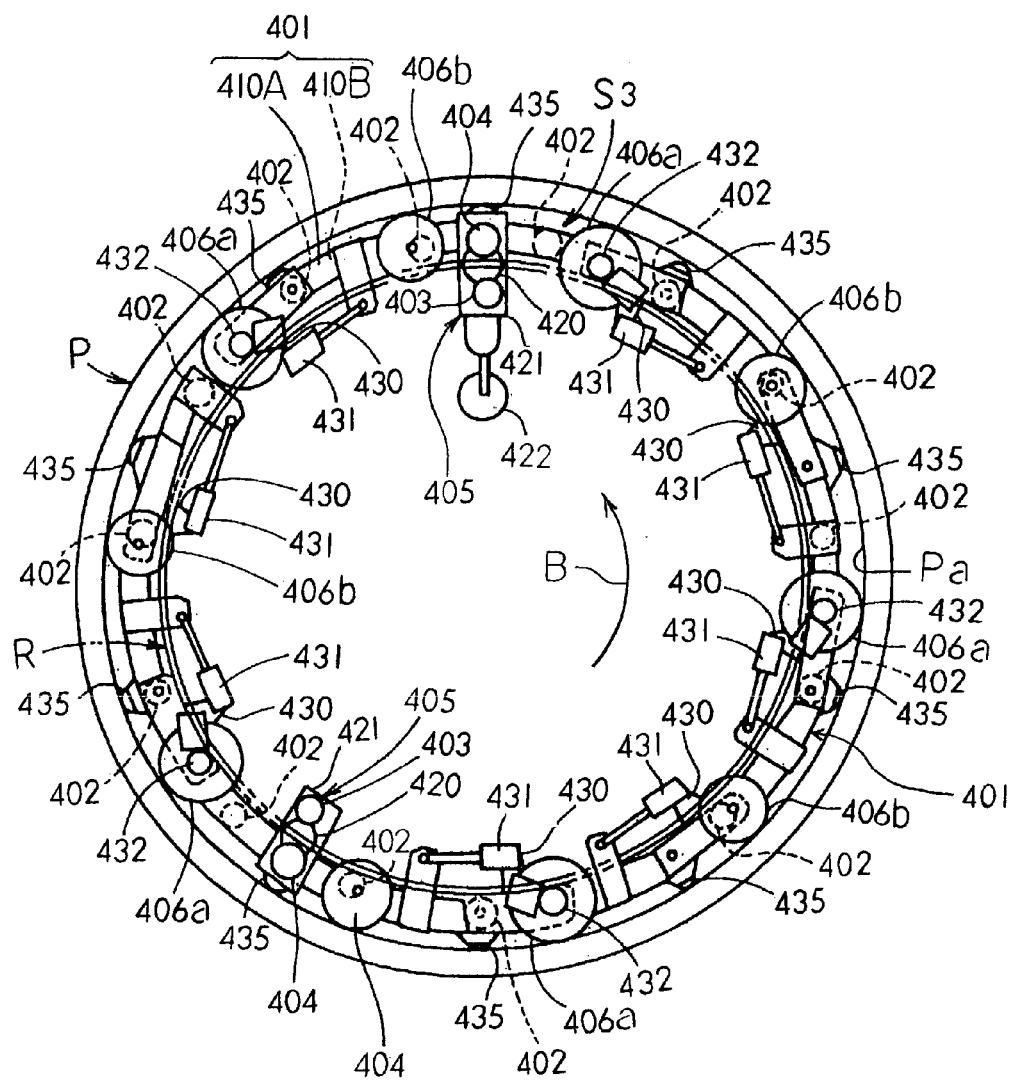
Figure 47:
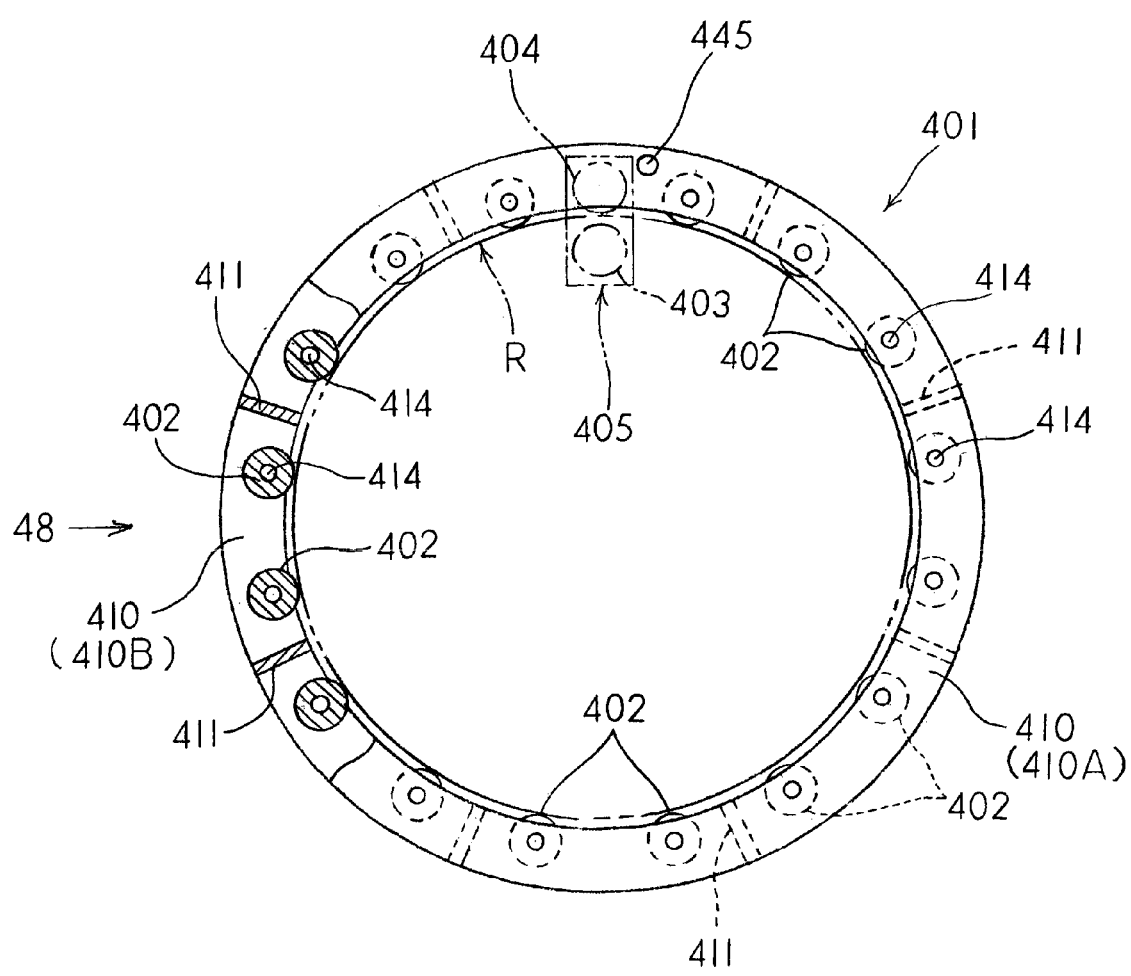
Figure 48:
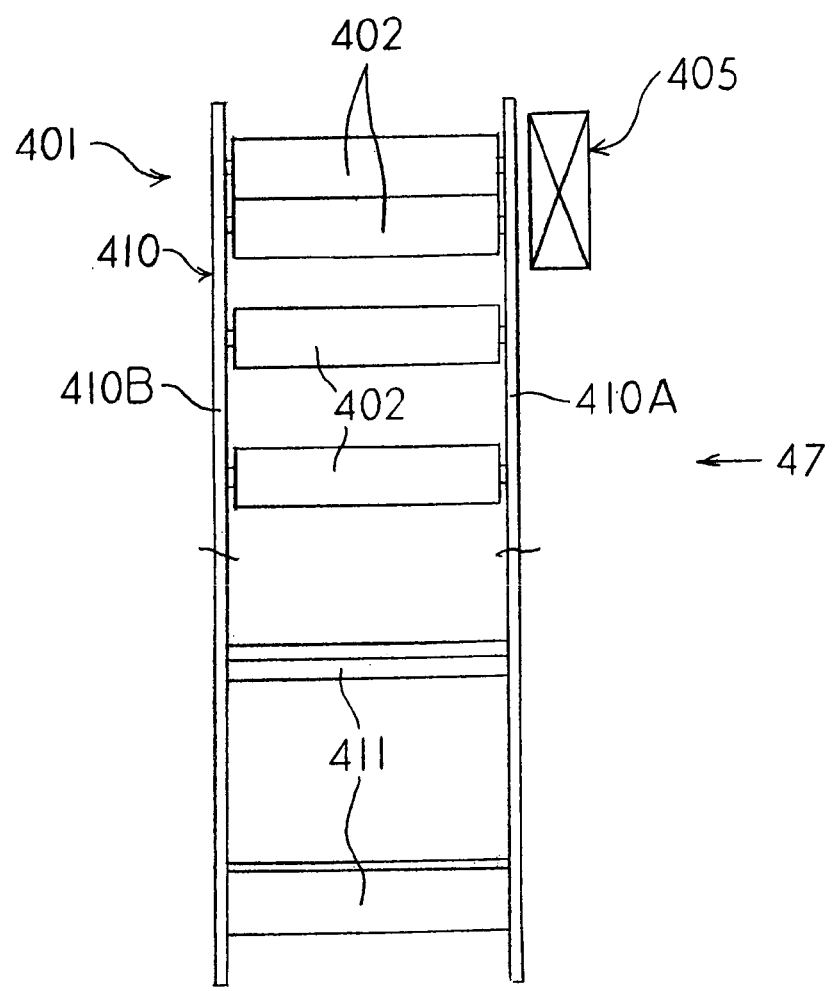

FIG. 45 is a longitudinal sectional view which illustrates still another embodiment of the tubular culvert interior lining method and lining apparatus of the present invention;

FIG. 46 is a front view (in the direction of the arrow 46 in FIG. 45) of this lining apparatus;

FIG. 47 is a partially sectional front view of the forming frame of this lining apparatus; and FIG. 48 is a side view (in the direction of the arrow 48 in FIG. 47) of the same.

(Fourth Embodiment)

Figure 49:
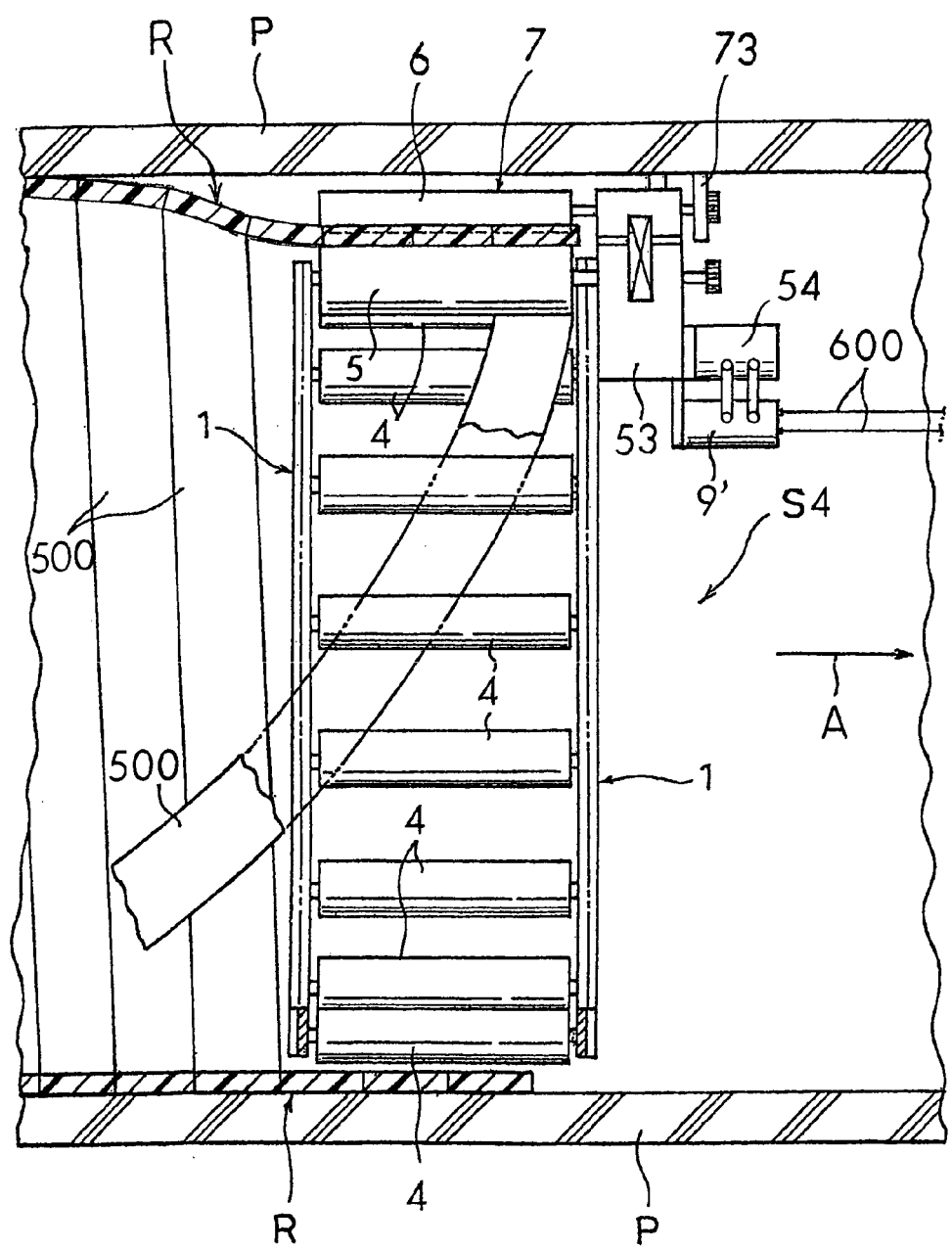

FIG. 49 is a longitudinal sectional view of the overall construction of still another embodiment of the tubular culvert interior lining apparatus of the present invention.

(Strip-Like Member)

FIG. 50(a) is a sectional view which shows one aspect of the strip-like member used in the present invention;

FIG. 50(b) is a sectional view which shows the joining relationship [of the spans] of this strip-like member;

FIG. 51(a) is a sectional view which shows another aspect of the strip-like member used in the present invention; and FIG. 51(b) is a sectional view which shows the joining relationship [of the spans] of this strip-like member.

EXPLANATION OF SYMBOLS

P: tubular culvert, R: lining pipe, 500, 520: strip-like member, 504: recessed grooves, 600: hydraulic pressure piping, 610: air piping.

(First Embodiment and Fourth Embodiment)

S, S4: lining apparatus (with internal-circumference regulating system), 1: forming frame, 2: circumferential length adjustment mechanism, 3: spacing maintaining mechanism, 4: guide rollers, 5: inner face roller, 6: outer face roller, 7: joining mechanism part, 8: back-filling material injection mechanism part, 9, 9', 9C: rotary coupling device, 9A: rotary coupling part used for operating pressure fluid, 9B: rotary coupling part used for filling material, 10: link body, 73: feed roller, 83: injection coupling pipe, 84: rotary coupling, 9: back-filling material injection tube, 96: injection part.

(Second Embodiment)

S1, S2: lining apparatus (with internal-circumference regulating system), 201: forming frame, 202: guide rollers, 203: inner face roller, 204: outer face roller, 205: joining mechanism part, 206, 207: feed rollers, 208: back-filling material injection mechanism part, 209: external-circumference regulating frame body.

(Third Embodiment and Fifth Embodiment)

S3, S5: lining apparatus (with external circumference regulating system), 401: forming frame, 402: guide rollers, 403: inner face roller, 404: outer face rollers, 405: joining mechanism part (hydraulic motor 420), 406: main feed mechanism part, 406a: driving ring (hydraulic motor 432), 406b: driven ring, 407: driven feed mechanism part, 408: back-filling material injection mechanism part.

BEST MODE FOR CARRYING OUT THE INVENTION

First Embodiment

FIGS. 1 through 22 illustrate one embodiment of the lining apparatus that is used to perform the tubular culvert interior lining method of the present invention.

Figure 1:
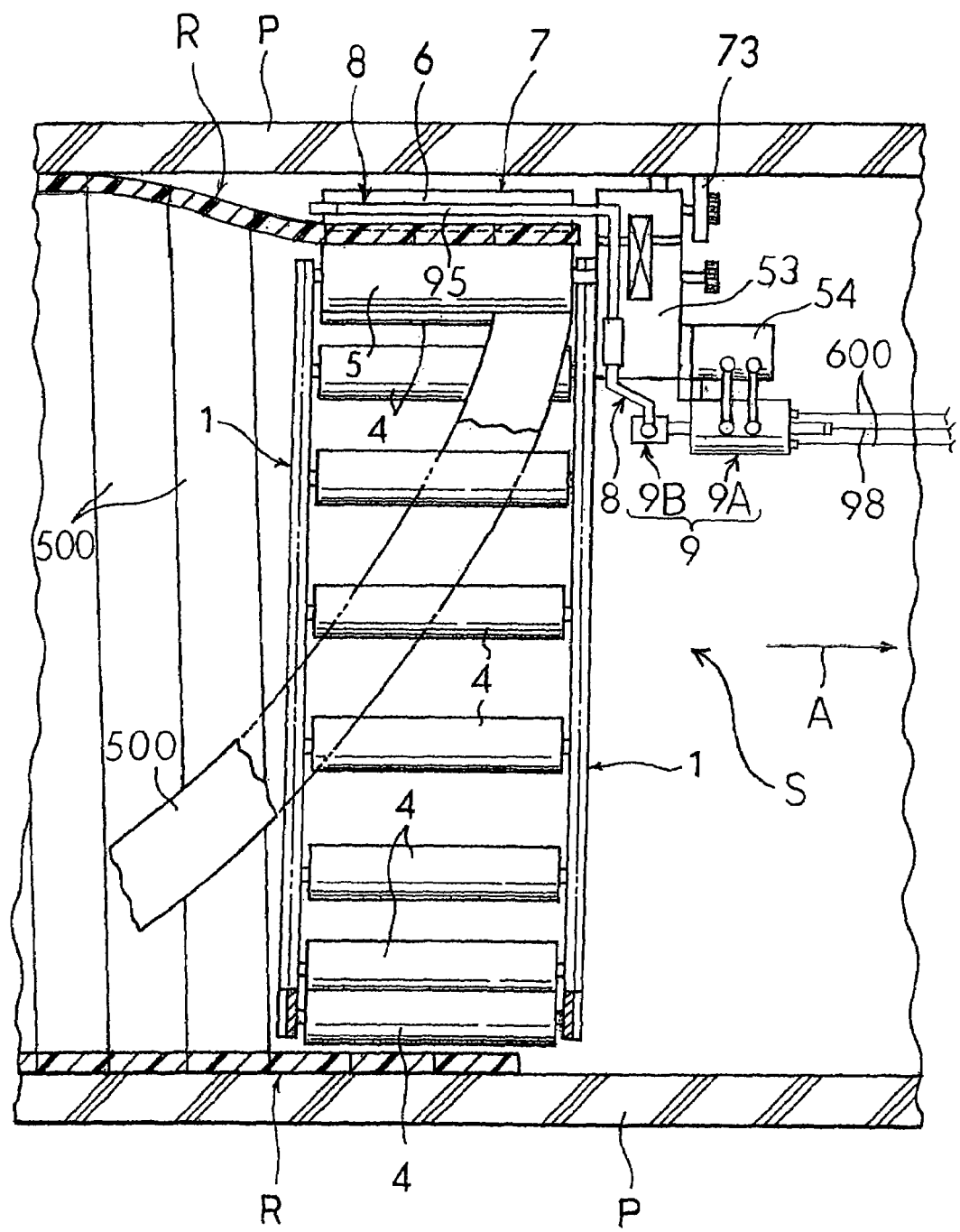
FIG. 1 is a longitudinal sectional view which illustrates the overall construction of one embodiment of the tubular culvert interior lining apparatus of the present invention.
Figure 2:
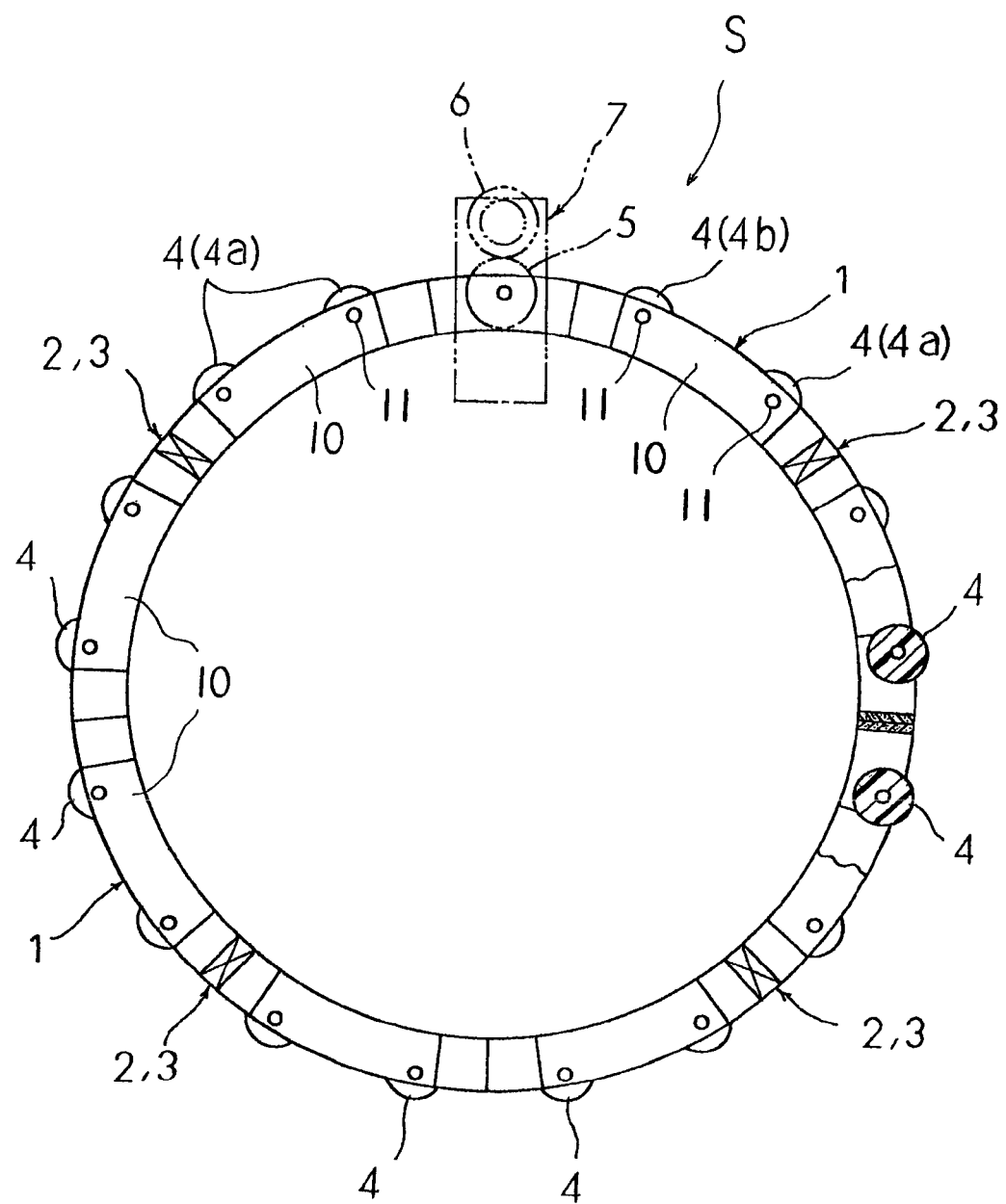
FIG. 2 is a front view of this lining apparatus with a portion omitted.

Specifically, FIGS. 1 and 2 show the overall construction of the lining apparatus S, and FIGS. 3 through 22 show the constructions of the respective parts of this apparatus. Furthermore, FIGS. 50 and 51 each show one aspect of the strip-like member.

In these figures, P indicates a tubular culvert that has a circular cross section, and R indicates a lining pipe. Furthermore, the front part and rear part of the apparatus are designated with respect to the direction of advance (indicated by the arrow A) of the apparatus S.

Figure 50:
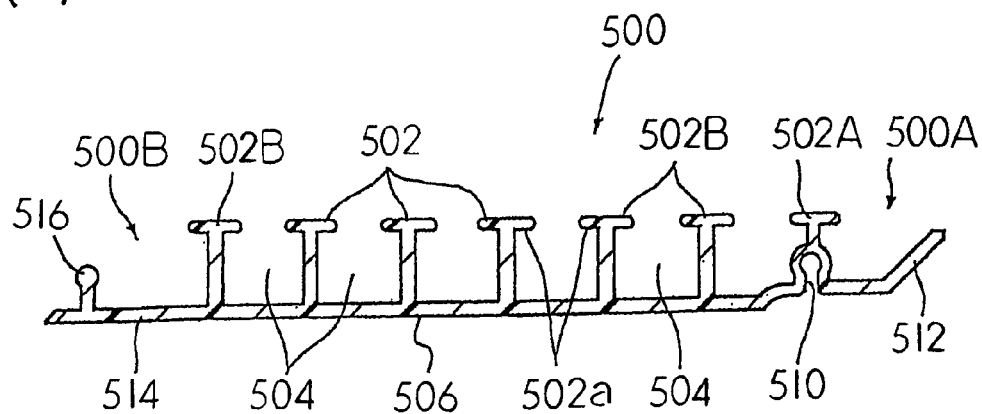
Figure 50:
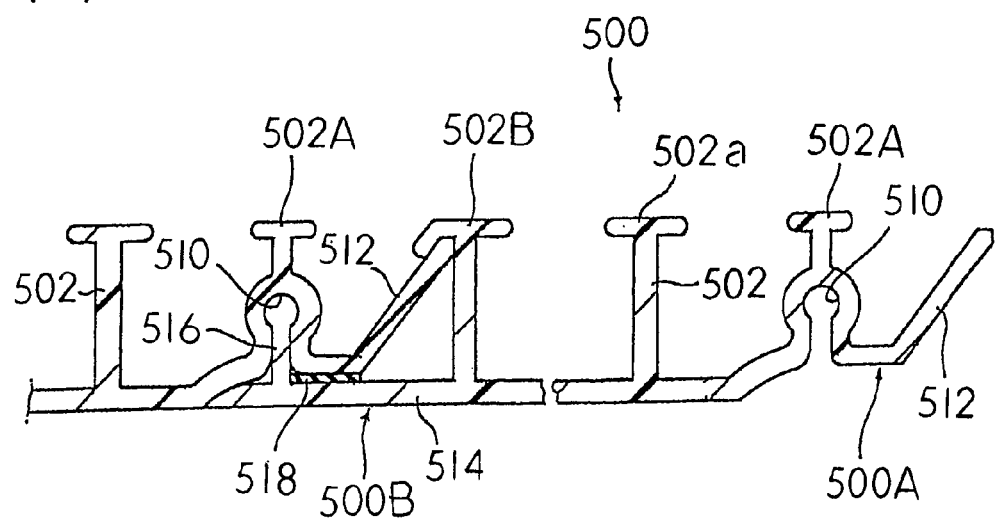
Figure 51:
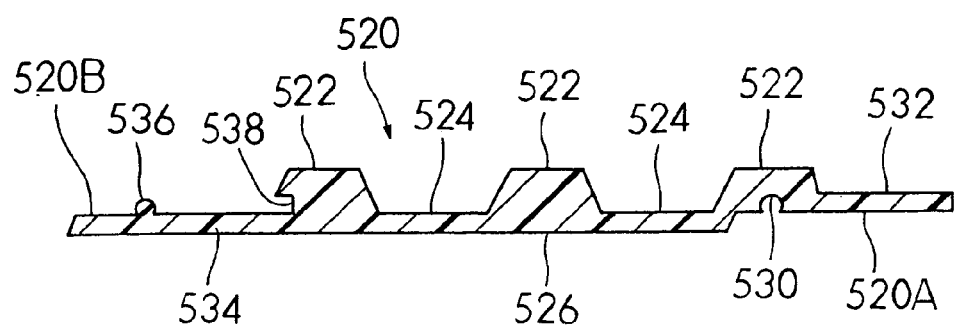
Figure 51:
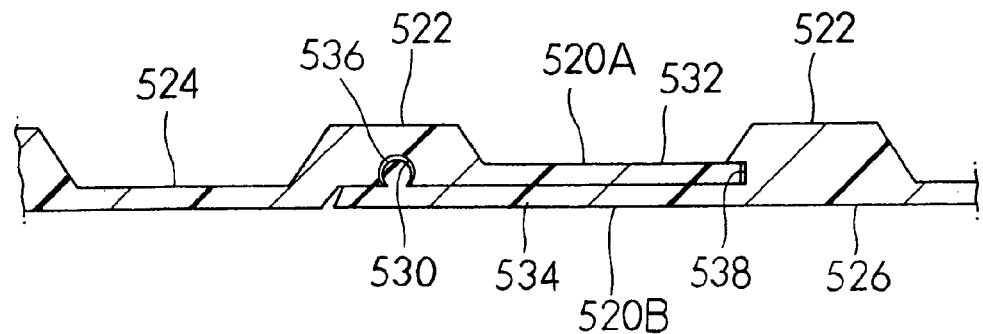

Strip-Like Member 500, 520 (See FIGS. 50 and 51)

FIG. 50 shows one example of the strip-like member that is used in the lining method of the present embodiment.

The main body of the strip-like member 500 has the form of a flat sheet-form material with a fixed thickness; an appropriate number of protruding ribs (seven in the example shown in the figures) 502 are formed vertically and continuously in a longitudinal direction on the outside surface of the strip-like member 500. Flanges 502a are formed on the tip end portions of the protruding ribs 502. Grooves 504 or groove spaces are formed between the protruding ribs 502. The inside surface 506 is formed as a substantially flat surface.

Joint parts 500A and 500B that overlap and engage with each other inside and outside are formed on both sides of the strip-like member 500. Specifically, in the joint part 500A on the front edge side, the base portion of the protruding rib 502A on the front end portion of the strip-like member 500 is expanded in diameter, and a recessed groove 510 is formed vertically from the side of the inside surface; furthermore, a protruding part 512 is connected to this protruding rib 502A. In the joint part 500B on the rear edge side, a protruding part 514 is caused to protrude from the protruding rib 502B on the rear end portion of the strip-like member 500, and a protruding rib 516 which engages with the recessed groove 510 of the abovementioned front-end-side joint part 500A is formed in a vertical attitude near the end portion of the abovementioned protruding part 514.

When the joint parts are joined, the front edge portion and rear edge portion of the adjacent [spans of the] strip-like member 500 are overlapped, and the rear-edge-side joint part 500B is joined to the front-edge-side joint part 500A as a result of the joint parts being subjected to the clamping action of the outer face roller and inner face roller of the joining roller part (described later), so that the protruding rib 516 is inserted into the recessed groove 510, and so that the end portion of the protruding part 512 is inserted into the inside of the flange 502a of the protruding rib 502B. In this case, the main engagement is accomplished by the recessed groove 510 and protruding rib 516, and a secondary engagement is accomplished by the protruding part 512 and protruding rib 502B; in some cases, therefore, the secondary engagement may be omitted.

Furthermore, in the present embodiment, the joining characteristics are enhanced by interposing a sealing material 518 in the area of contact between the protruding parts 512 and 514. If the engagement accomplished by the insertion of the joint parts 500A and 500B is sufficient, this sealing material 518 may be omitted.

The strip-like member is formed from a synthetic resin material; in particular, a polyvinyl chloride (PVC) resin which allows continuous formation by extrusion molding is especially desirable from the standpoint of moldability. However, the strip-like member may also be formed from a metal material.

FIG. 51 illustrates another aspect of the strip-like member.

In this strip-like member 520, an appropriate number of trapezoidal protruding ribs 522 are formed vertically in a continuous longitudinal direction on the outside surface of the strip-like member 520, and valley parts 524 are formed between these protruding ribs 522. The protruding ribs 522 and valley parts 524 have an equal pitch in the direction of width. The strip-like member can be made rigid and light-weight by forming appropriate hollow parts inside the protruding ribs 522. The inside surface 526 is formed as a substantially flat surface.

Joint parts 520A and 520B that overlap and engage with each other on the inside and outside are formed on both sides of the strip-like member 520. Specifically, the protruding rib of the outside joint part 520A is formed with the same shape as the protruding ribs 522, and a rounded recessed groove 530 is vertically formed in the inside surface of this outside joint part 520A; furthermore, a protruding part 532 is formed so that this protruding part 532 is slightly longer than the width of the valley parts 524. The length of the protruding part 534 of the inside joint part 520B is set so that this length is slightly longer than the width of the valley parts 524, and a rounded protruding rib 536 which engages with the rounded recessed groove 530 of the abovementioned outside joint part 520A is vertically formed in the end portion of the protruding part 534. Furthermore, a cut-in recessed groove 538 is vertically formed in the root portion of the protruding rib 522.

When the joint parts are joined, the inside joint part 520B is pressed into the outside joint part 520A by the outer face roller and inner face roller of the joining roller part, so that the rounded protruding rib 536 is inserted into the rounded recessed groove 530, and the end portion of the protruding part 532 is inserted into the cut-in recessed groove 538, thus causing the joint parts to be joined.

Lining Apparatus S (See FIGS. 1 through 22)

The construction of the lining apparatus S of the present embodiment will be described with reference to FIGS. 1 through 22.

As is shown in FIGS. 1 and 2, this lining apparatus S comprises the following main parts: a forming frame 1 with an annular shape that is freely bendable by means of a link mechanism that is constructed from a plurality of link bodies having a specified width, a circumferential length adjustment mechanism 2 which is interposed in this forming frame 1, a spacing maintaining mechanism 3 which is installed in combination with this circumferential length adjustment mechanism 2, a plurality of guide rollers 4 which are disposed on the respective shaft parts of the link mechanism of the forming frame 1, a joining mechanism part 7 which is attached to the forming frame 1, and which comprises an inner face roller 5 and an outer face roller 6, and a back-filling material injection mechanism part 8 which is disposed adjacent to the joining mechanism part 7. Furthermore, the spacing maintaining mechanism 3 may be omitted, and in some cases, the circumferential length adjustment mechanism 2 may also be omitted.

The present embodiment is also characterized by an operating pressure fluid (hydraulic) system which acts as a driving source for the joining mechanism part 7, and a rotary coupling device 9 which is installed in common with the back-filling material system of the back-filling material injection mechanism part 8.

The detailed structures of the respective parts will be described below.

Forming Frame 1 (See FIGS. 1 through 13)

The forming frame 1 has an annular body with a specified width. As a whole, this forming frame 1 is freely bendable in the outward radial direction by means of a link mechanism; this forming frame 1 possesses lateral rigidity, and a portion of this forming frame 1 acts as an attachment part for the joining mechanism part 7.

Specifically, the flexibility of this annular body is obtained from a link chain in which a plurality of link bodies 10 are connected via shaft parts 11.

Figure 3:
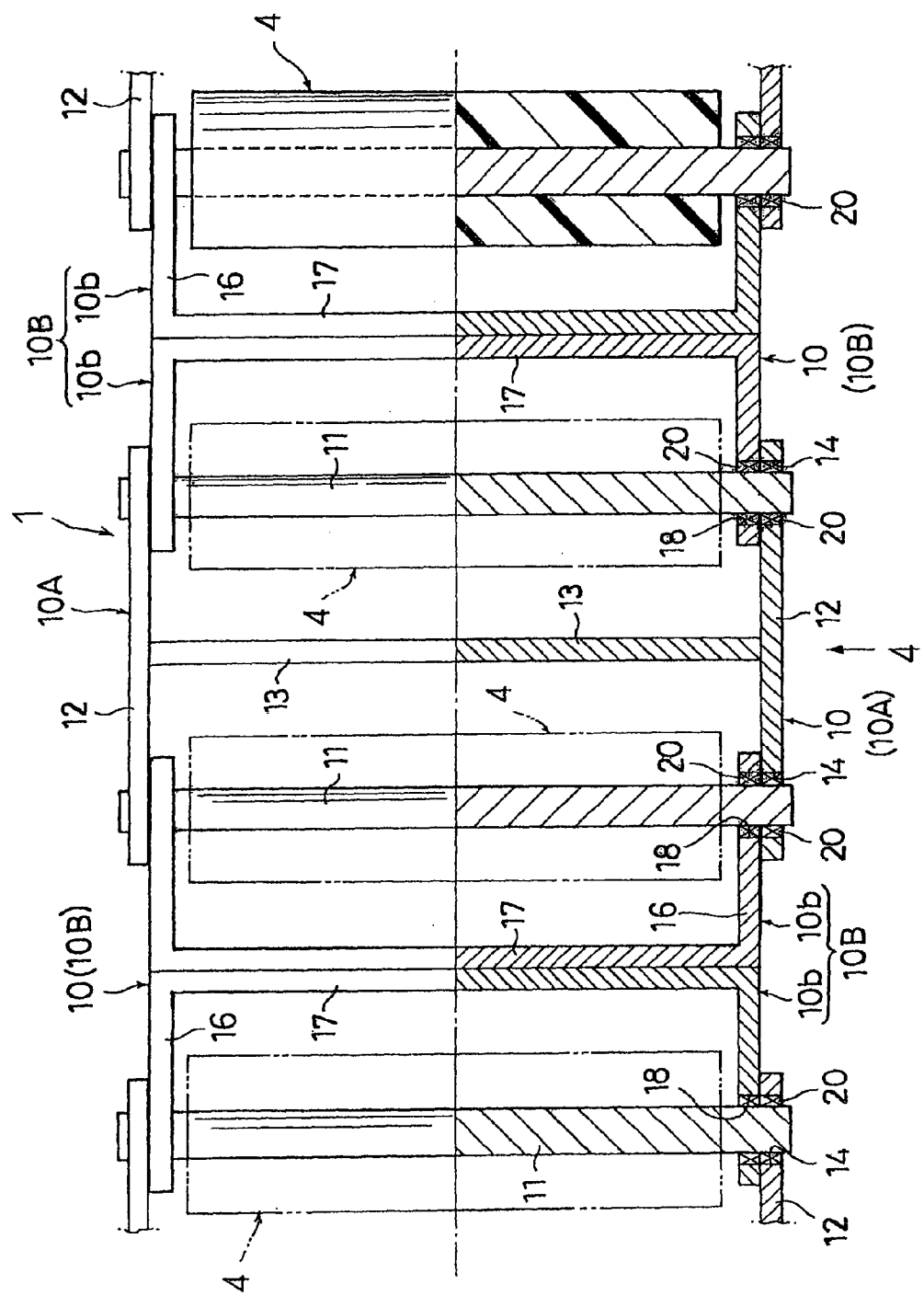
FIG. 3 is a partially sectional plan view (in the direction of the arrow 3 shown in FIG. 4) of the forming frame that constitutes a part of the lining apparatus.
Figure 4:
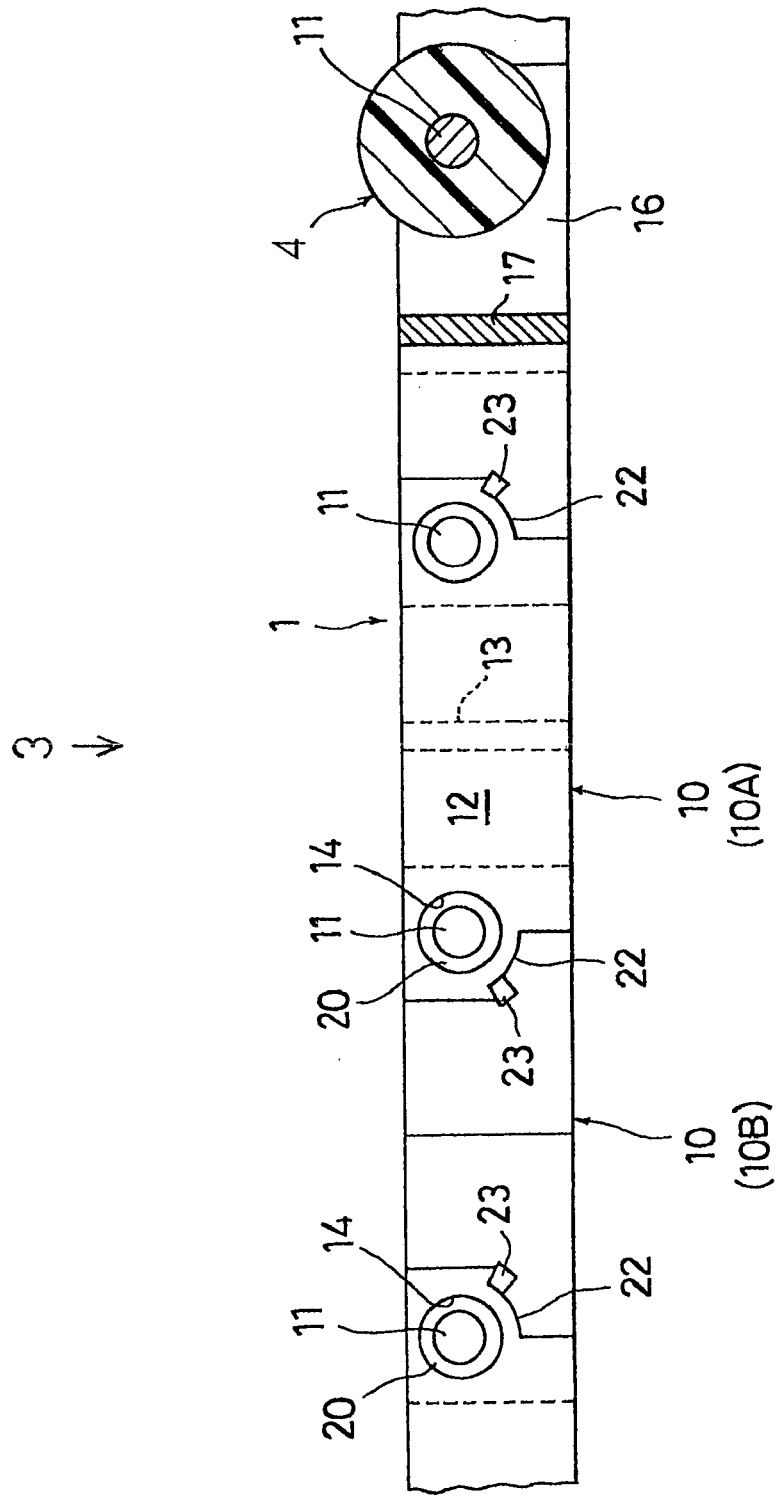
FIG. 4 is a partially sectional side view (in the direction of the arrow 4 shown in FIG. 3) of the forming frame.

(Link Mechanism) (See FIGS. 3 and 4)

In the present embodiment, as is shown in FIGS. 3 and 4, the link bodies 10 adopt two aspects, i.e., outside link bodies 10A and inside link bodies 10B, which alternate with each other.

The outside link bodies 10A have an overall H shape, and each consist of parallel side plates 12 and a connecting plate 13 that rigidly connects these side plates 12 in the central area. Circular shaft holes 14 are formed in both sides of each side plate 12.

The inside link bodies 10B are assembled from two split bodies 10b that have a C shape, so that these inside link bodies 10B have an overall H shape similar to that of the outside link bodies 10A. Specifically, each of these split bodies 10b has a C shape consisting of short side plates 16 and a back plate 17, and the back plates 17 are rigidly connected to each other by bolts and nuts (not shown in the figures), so that the inside link bodies 10 are rigidly assembled as H-shaped bodies. Round shaft holes 18 are formed in the short side plates 16 in positions corresponding to the shaft holes 14 in the side plates 12 of the outside link bodies 10A.

Furthermore, the link mechanism is constructed from the outside link bodies 10A and inside link bodies 10B by overlapping the side plates 16 of the inside link bodies 10B with the insides of the side plates 12 of the outside link bodies 10A, aligning the axial centers of the shaft holes 14 and 18, and passing the shaft parts 11 through these shaft holes 14 and 18 with bearings 20 that are fastened and held in the shaft holes 14 and 18.

Figure 5:
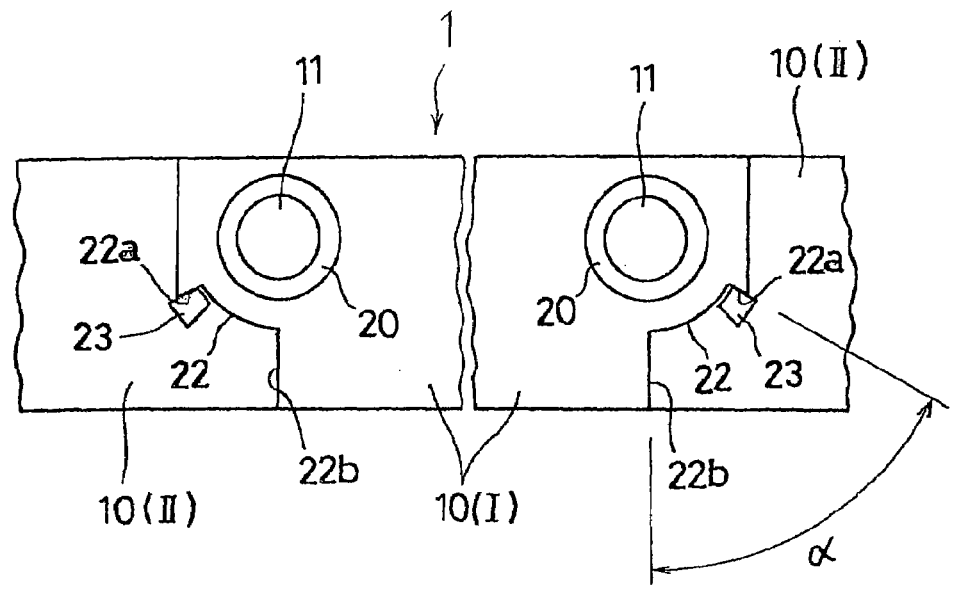
FIG. 5 is a diagram which shows the inward-folding preventive mechanism of the forming frame.
Figure 5:
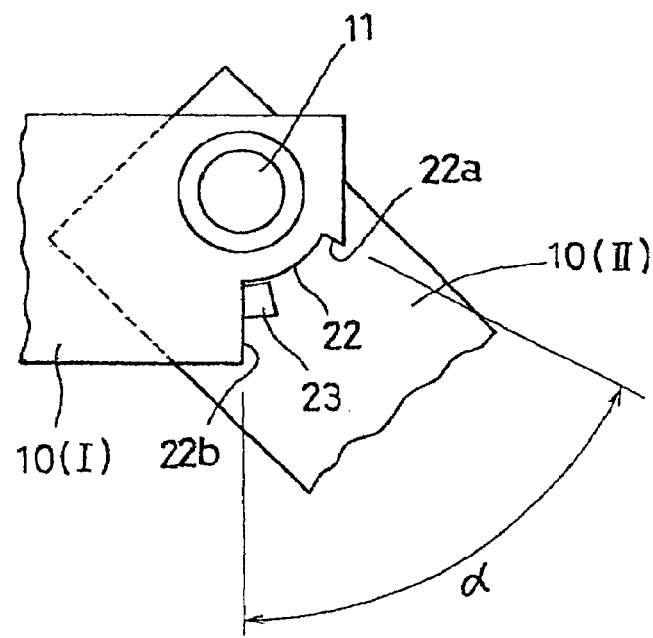

(Inward-Folding Preventive Mechanism) (See FIG. 5)

The link bodies 10 can be folded outward by a standard 180° relative to each other, but inward folding is prevented. However, as will be described later, this does not apply to the attachment part.

Accordingly, an inward-folding preventive mechanism is provided; one example of this mechanism is shown in FIG. 5. Specifically, a recessed part 22 for stopper use is formed recessed in the end portion of the side plate of one link body 10 (I), and a stopper 23 which protrudes toward the above-mentioned link body 10 (I) is disposed on the side plate of another link body 10 (II). This stopper 23 contacts one end surface 22a of the stopper recessed part 22, so that inward folding is prevented. Furthermore, outward folding is possible up to the point where the stopper 23 contacts the other end surface 22b of the stopper recessed part 22. The opening angle of the recessed part 22 (α, e.g., 30°) constitutes the swinging width. Specifically, as one aspect, outward folding up to 150°, with 180° as the limit, is possible.

Figure 6:
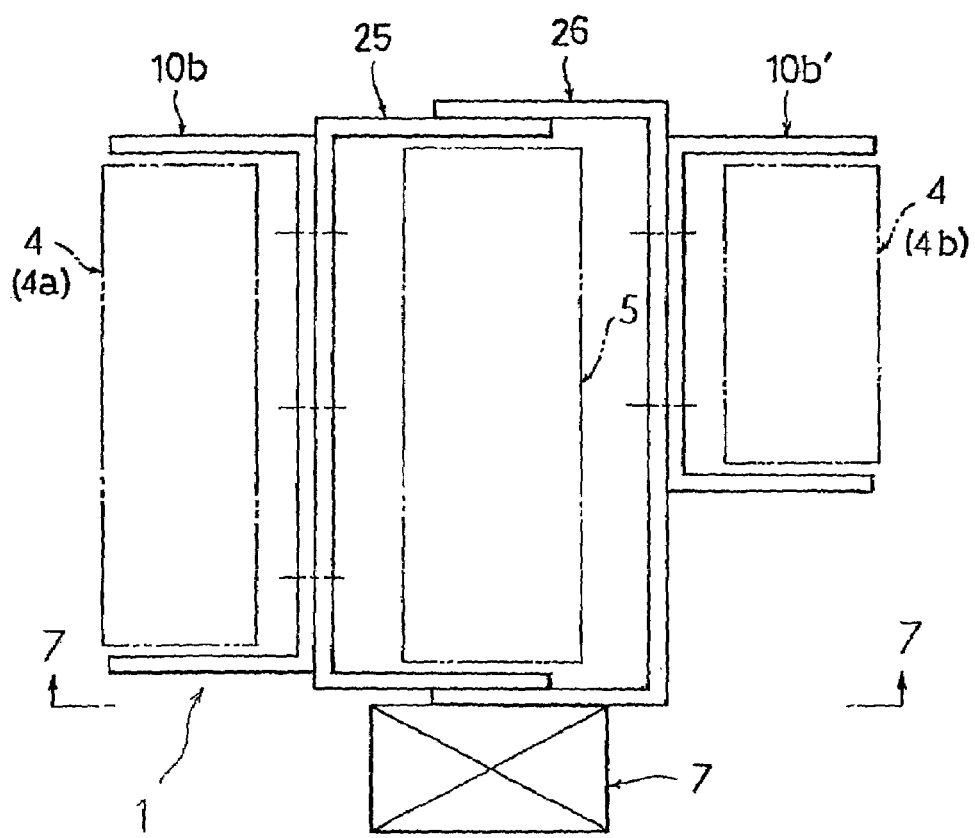
FIG. 6 is a side view of the attachment part of the forming frame.
Figure 7:
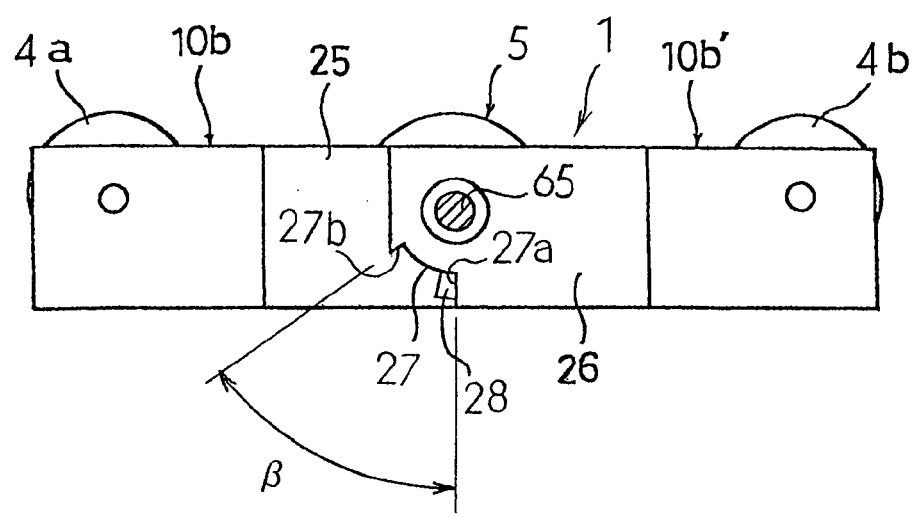
FIG. 7 is a plan view (in the direction of the arrow 7 shown in FIG. 6) of the attachment part of the forming frame.
Figure 7:
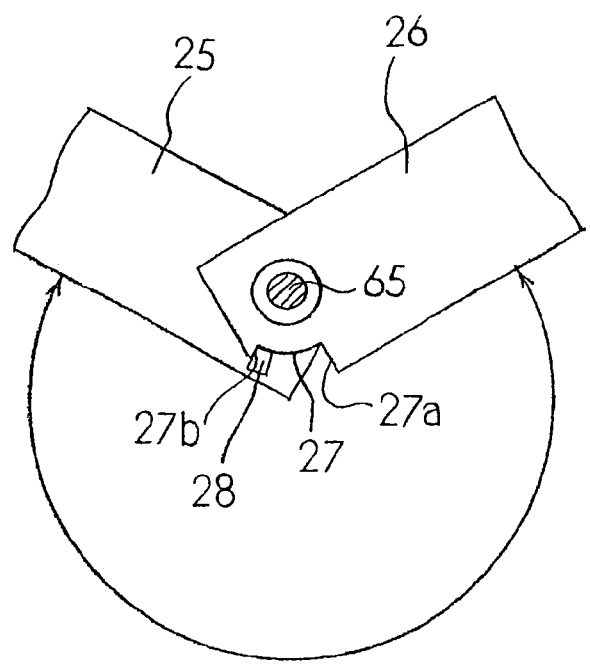

(Attachment Part) (See FIGS. 6 and 7)

The forming frame 1 has an attachment part, and the joining mechanism part 7 is attached [to the forming frame 1] via this attachment part.

The attachment part also forms a portion of the forming frame, and constitutes a link body. Specifically, as is shown in FIGS. 6 and 7, the attachment part comprises two split bodies 25 and 26 that envelop and hold the inner face roller 5, and that swing about the shaft part of this inner face roller 5. The outside split part 26 is used for the attachment of the joining mechanism part 7. In the link body 10b' located in the direction of rotation of the attachment part, the front side plate is retracted to the rear, so that the link body has a narrow width. The width by which this front side plate is retracted is set at a width that is sufficient to allow accommodation of the strip-like member 100.

Furthermore, an inward-folding mechanism which has a configuration that is the opposite of that of the inward-folding preventive mechanism, and which prevents outward folding but allows inward folding through a fixed angle, is disposed in the abovementioned attachment part.

Specifically, as is shown in FIG. 7, a recessed part 27 is formed about the axis of rotation in the side plate of the split part 26, and a stopper 28 which is inserted into this recessed part 27 is disposed on the side plate of the split part 25. This stopper 28 contacts the end surfaces 27a and 27b of the recessed part 27, so that inward folding is allowed in the range of the spread angle β (e.g., 60°) of the recessed part 27. In the example shown in the figures, the stopper 28 contacts the end surface 27a of the recessed part 27 and holds an angle of 180°, and inward folding to an angle of 240° is possible from this position. Of course, this inward folding angle is appropriately determined in accordance with the circumferential length of the forming frame 1. The inward folding angle adopts a circular-arc angle that is symmetrical with the circular arc shape of the inside wall surface of the tubular culvert P, with a 180° linear state as the axis of symmetry (y) (see FIG. 24).

In the forming frame 1 of this embodiment, the forming frame is constructed from 17 link bodies; however, this number may be freely decreased or increased. In short, this number is increased or decreased in accordance with the diameter of the tubular culvert that is the object of working.

Circumferential Length Adjustment Mechanism 2 (See FIG. 2 and FIGS. 8 through 10)

The circumferential length adjustment mechanism 2 is disposed in an appropriate location on the link mechanism of the forming frame 1, and adjusts the circumferential length of this forming frame 1.

Figure 8:
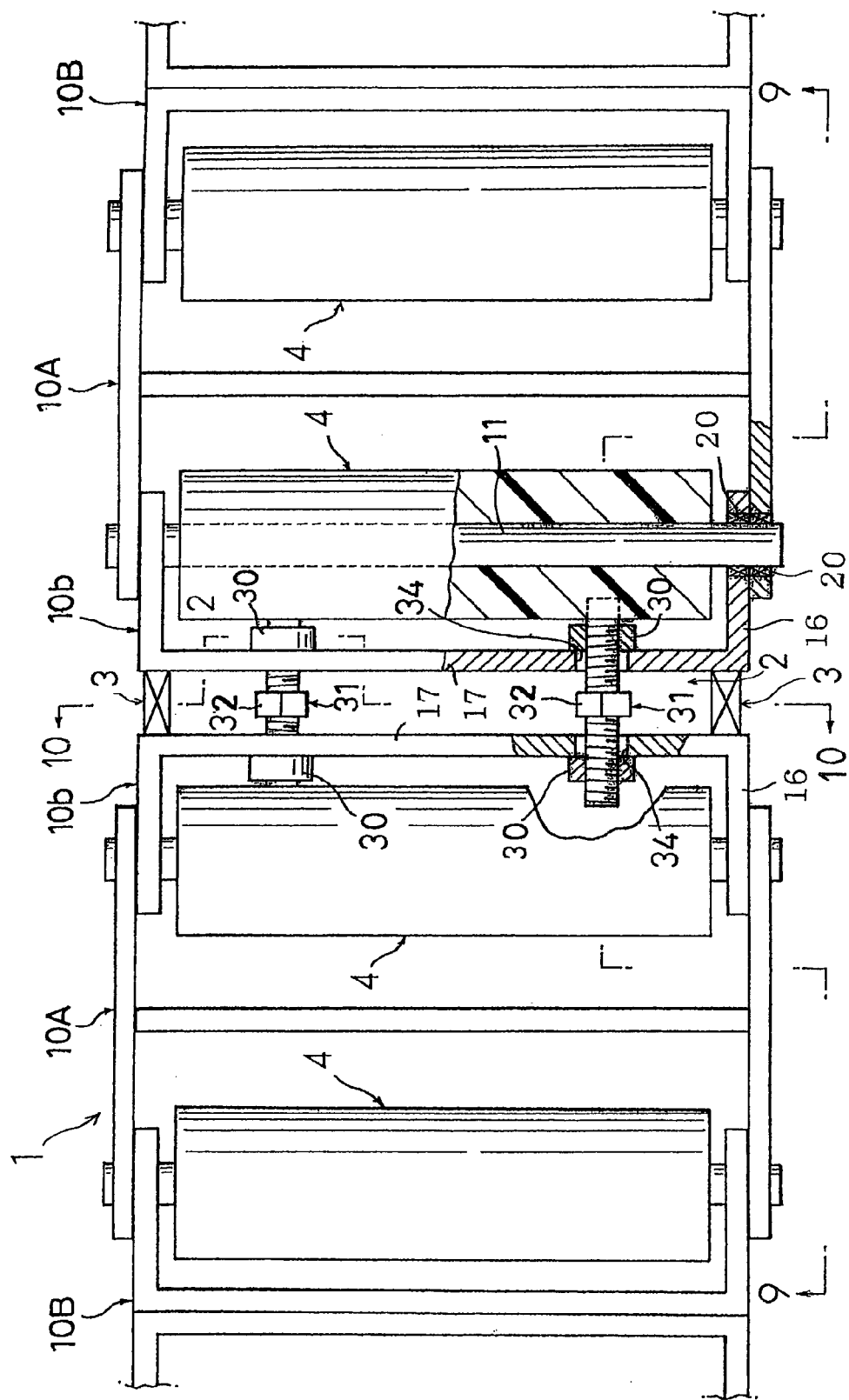
FIG. 8 is a partially sectional plan view of the circumferential length adjustment mechanism and spacing maintaining mechanism disposed on the forming frame.
Figure 9:
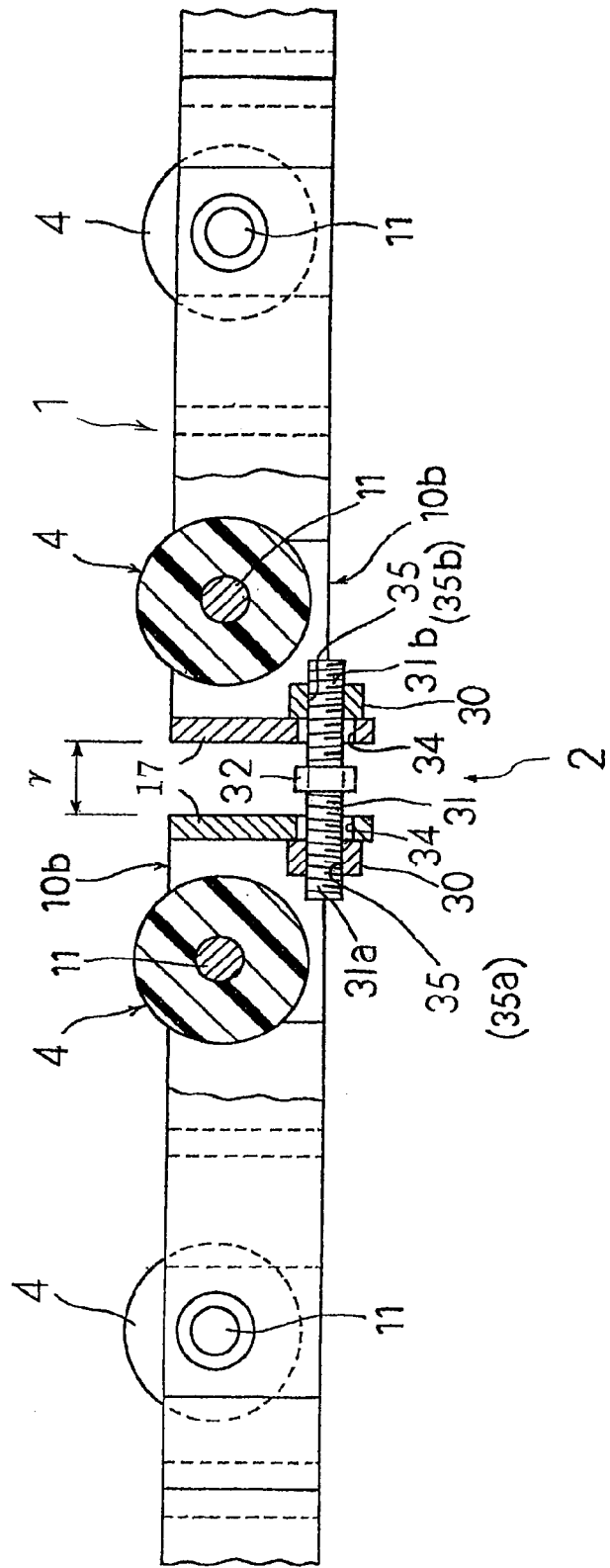
FIG. 9 is a sectional view along line 9—9 in FIG. 8.
Figure 10:
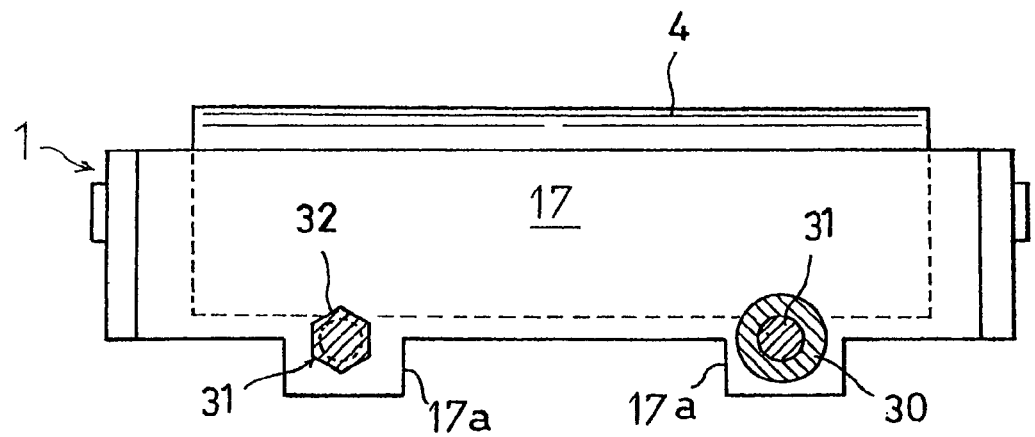
FIG. 10 is a sectional view along line 10—10 in FIG. 8.

The detailed construction of this circumferential length adjustment mechanism 2 is shown in FIGS. 8 through 10.

In the figures, 30 indicates nut bodies. 31 indicates adjustment bolts that have turning parts 32; these adjustment bolts 32 have screw parts 31a and 31b in which threads are cut in opposite directions. 34 indicates bolt through-holes that are formed in protruding parts 17a of the back plates 17 of the split bodies 10b; the adjustment bolts 31 are passed loosely through these bolt through-holes 34. 35 indicates screw holes in the nut bodies 30; here, paired screw holes 35a and 35b are cut in opposite directions. When the adjustment bolts 31 are turned, the mutually opposite nut bodies 30 that a screwed into the screw parts 31a and 31b move in a direction that causes the nut bodies 30 to be drawn together or in a direction that causes the nut bodies 30 to be separated from each other; as a result, the distance γ between the back plates 17 of the paired split bodies 10b can be freely adjusted.

Figure 11:
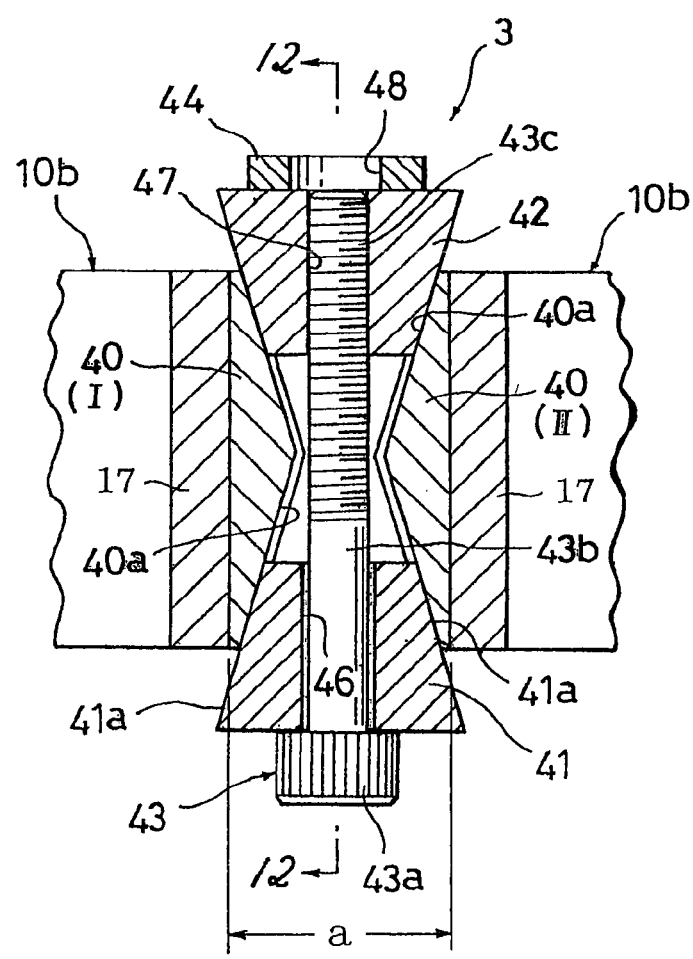
FIG. 11 is an enlarged sectional view of the spacing maintaining mechanism.
Figure 12:
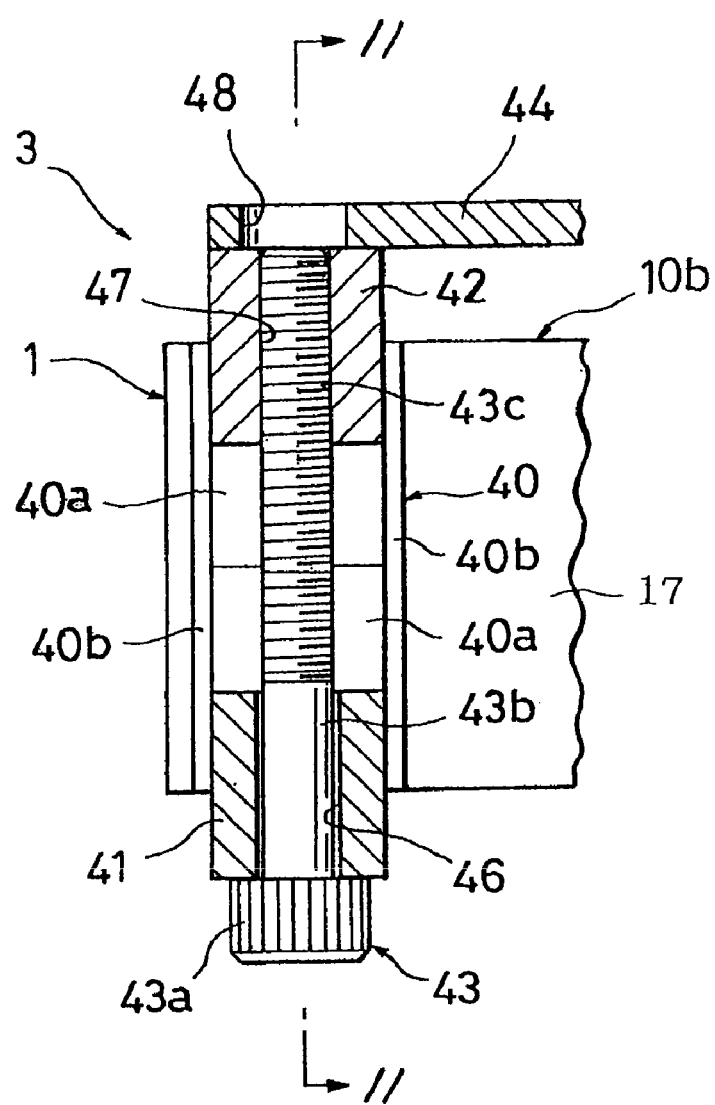
FIG. 12 is a sectional view along line 12—12 in FIG. 11.
Figure 13:
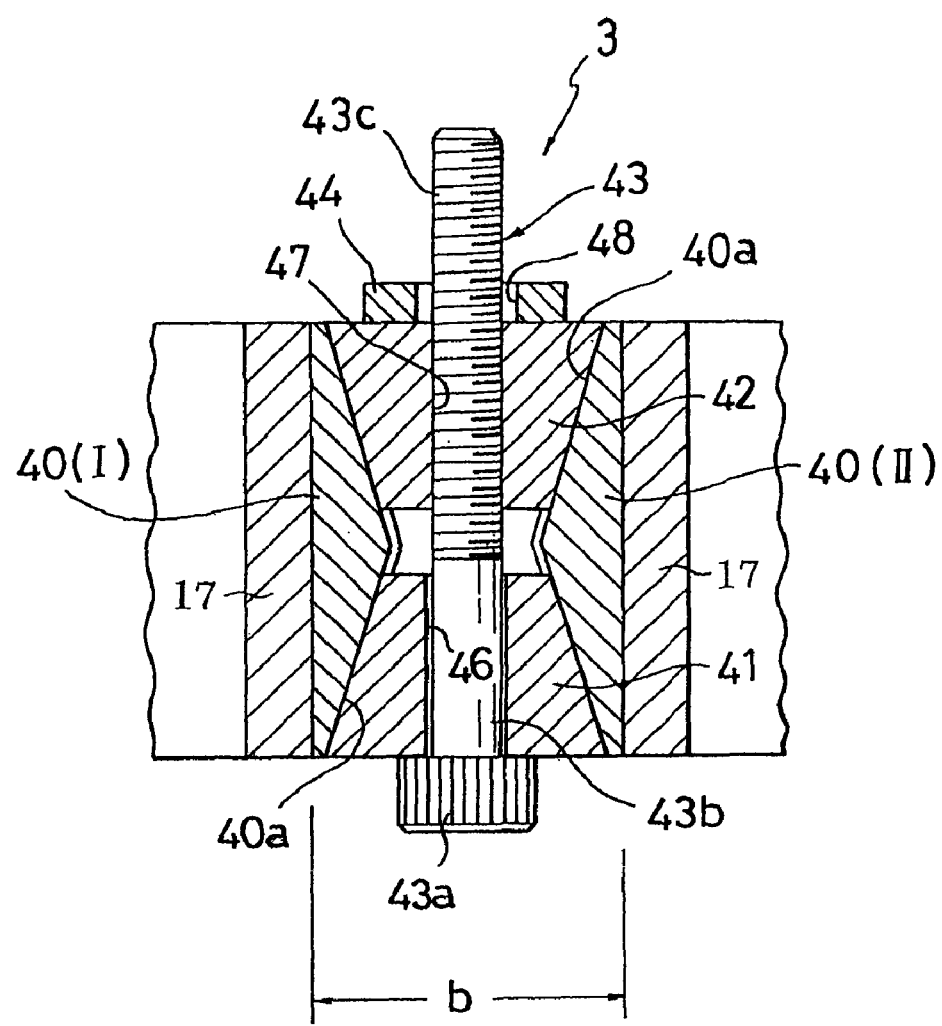
FIG. 13 is an operating diagram of the spacing maintaining mechanism.

Spacing Maintaining Mechanism (See FIGS. 11 Through 13)

The spacing maintaining mechanism 3 is disposed in combination with the circumferential length adjustment mechanism 2; in the present embodiment, this mechanism is disposed with the same construction on both end portions of the inside link bodies 10B.

Specifically, as is shown in FIGS. 11 through 13, this spacing maintaining mechanism 3 comprises tapered plates 40 that are installed on the back plates 15 of mutually facing split bodies 10b, inner and outer spacing maintaining bodies 41 and 42 that are clamped by both of these tapered plates, and bolts 43 which are mounted between these spacing maintaining bodies 41 and 42. Furthermore, this mechanism also comprises a connecting plate 44 that is mounted between the outer spacing maintaining bodies 42.

In the figures, 40*a* indicates the tapered surfaces of the tapered plates 40, 40*b* indicates the guide walls of these tapered plates 40, 41*a* indicates the tapered surfaces of the inner spacing maintaining bodies 41, 46 indicates bolt through-holes that are formed in the centers of the inner spacing maintaining bodies 41, and 47 indicates screw holes that are formed in the centers of the outer spacing maintaining bodies 42. 43*a* indicates the bolt head parts of the bolts 43, 43*b* indicates the bolt shaft parts, and 43*c* indicates the threaded parts. 48 indicates bolt through-holes that are formed in the connecting plate 44; these bolt through-holes 48 allow the insertion and withdrawal of the bolts accompanying the advancing and retracting motion of the outer spacing maintaining bodies 42.

Among FIGS. 11 through 13, FIGS. 11 and 12 show the conditions of the spacing maintaining mechanism 3 in a state in which the circumferential length adjustment mechanism 2 is contracted, so that the gap between the inside link bodies 10B is narrowed (gap a). FIG. 13 shows the conditions of the spacing maintaining mechanism in a state in which the circumferential length adjustment mechanism 2 is expanded, so that the gap between the inside link bodies 10B is widened (gap b).

Guide Rollers 4 (See FIGS. 1 T*hrough* 4 and FIGS. 6 T*hrough* 9)

The guide rollers 4 are mounted on the respective shaft parts 11 of the forming frame 1 so that these guide rollers 4 are free to rotate. The roller main bodies consists of a hard synthetic resin material or metal material, and contact the inside surface of the strip-like member 500. The standard guide rollers 4 (4*a*) have a length that fills the inside width of the link bodies 10; however, a specified number (ordinarily 1) of the guide rollers 4 (4*b*) on the front part of the joining mechanism part 7 (described later) are shorter [than the standard guide rollers 4*a*] by an amount equal to the width of the strip-like member 500 (see FIGS. 6 and 7).

Joining Mechanism Part 7 (See FIGS. 1, 2, 6 and 14 Through 16)

The joining mechanism part 7 is mounted on the attachment part of the forming frame 1.

The main body of this joining mechanism part 7 comprises a joining roller part in which an inner face roller 5 and outer face roller 6 are combined as a set. Furthermore, this joining mechanism part 7 also accommodates a gear mechanism 51 which effects synchronized rotation of the rollers 5 and 6, and further comprises a housing body 53 which holds a feed mechanism 52 that moves in linkage with the gear mechanism 51, and a hydraulic motor 54 which is attached to the housing body 53, and which is used as a rotational driving source for the rollers 5 and 6.

Furthermore, this joining mechanism part 7 is disposed in a position corresponding to the joining area of the spirally wound strip-like member 500, i.e., the position where [the respective spans of] the strip-like member 500 are initially joined.

(Housing Body 53)

Figure 14:
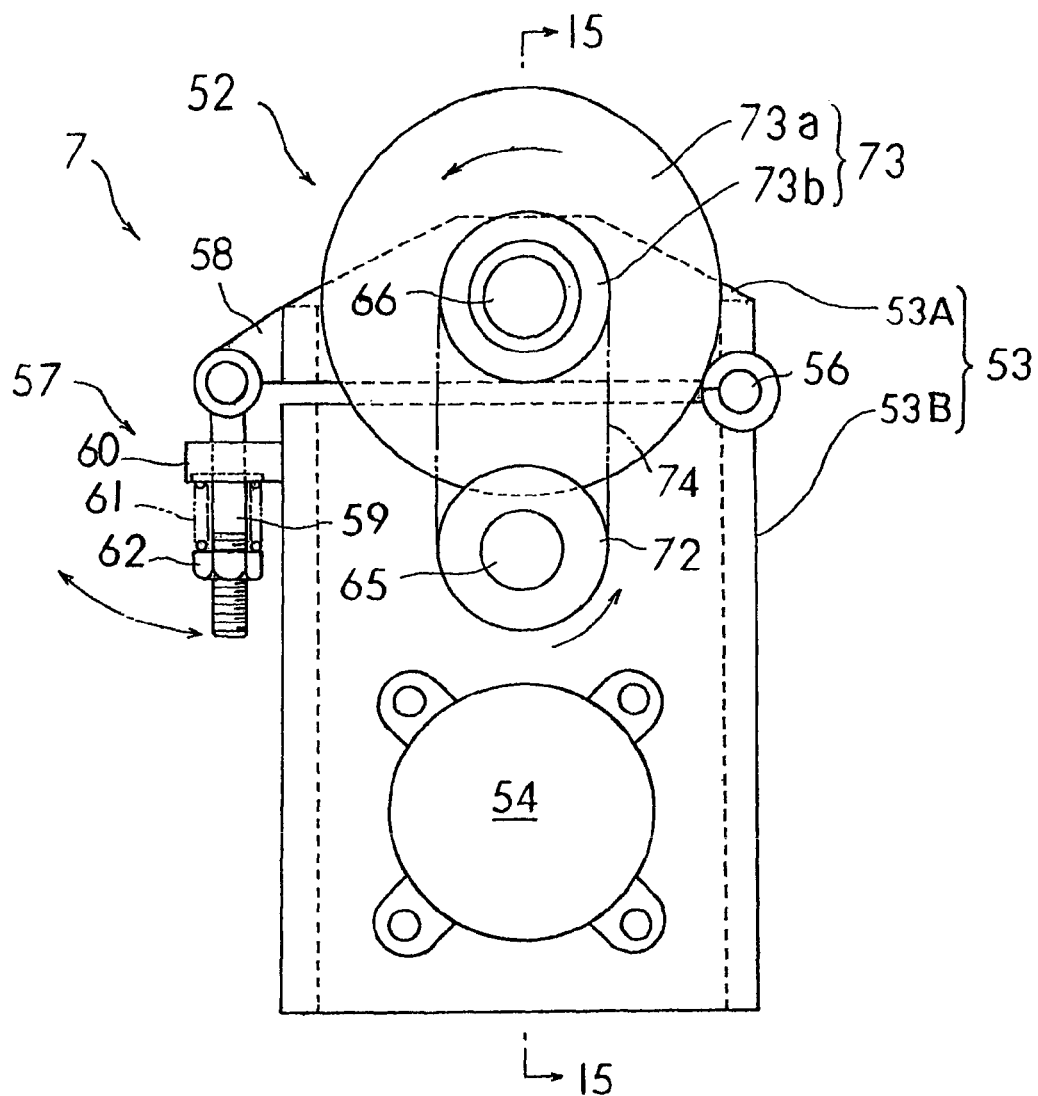
FIG. 14 is a front view of the joining mechanism part.
Figure 15:
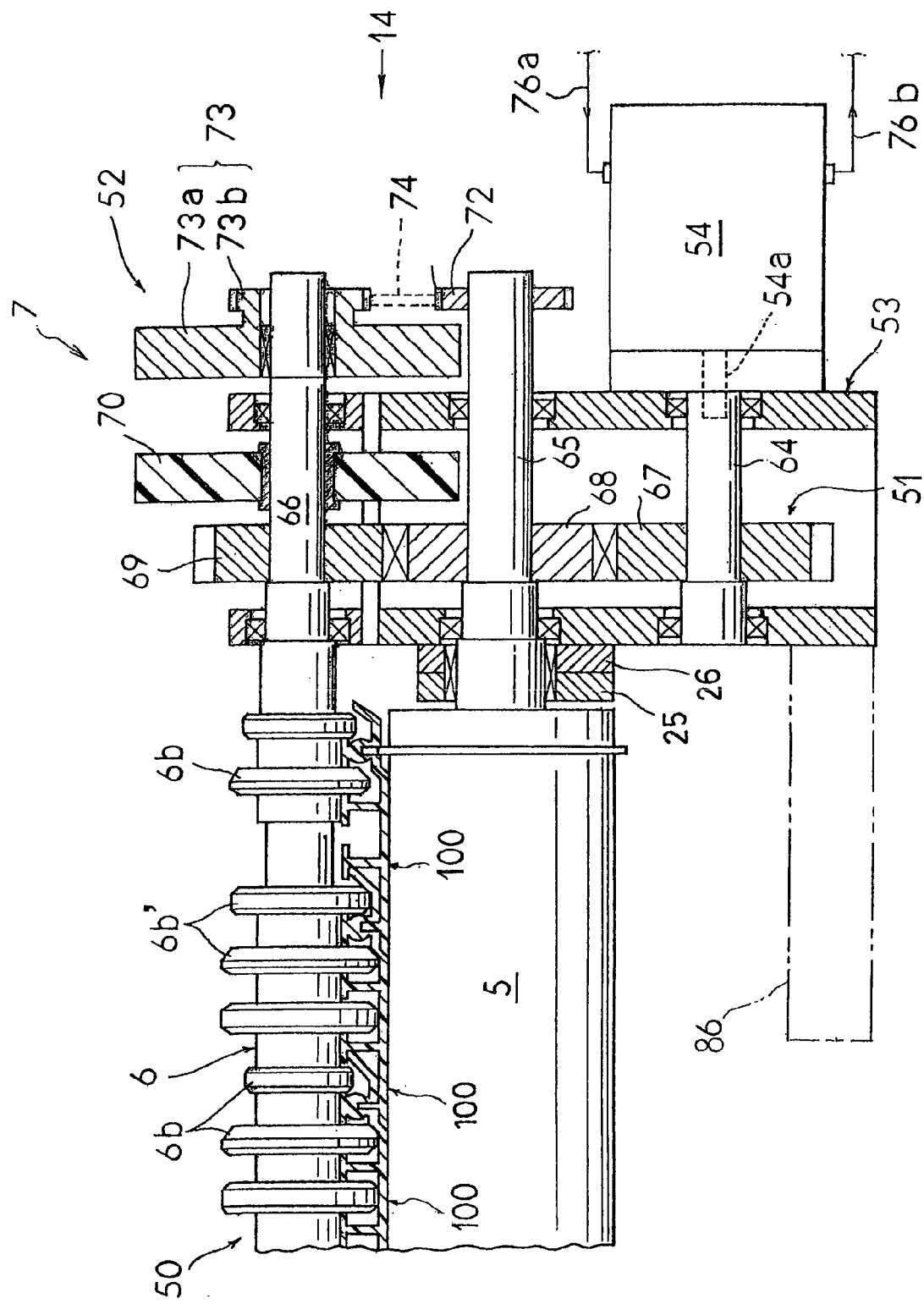
FIG. 15 is a longitudinal sectional view of the joining mechanism part.

As is shown in FIGS. 14 and 15, the housing body 53 is divided into an upper part 53A and a lower part 53B, and is arranged so that the upper part 53A can be opened about a pin shaft 56, and so that the upper part 53A can be closed and joined with the lower part 53B by a joining device 57.

In the figures, 58 indicates a rib, 59 indicates a connecting rod which is pivot-mounted on the rib 58, 60 indicates a receiving shelf that accommodates the connecting rod 59, 61 indicates a coil spring, and 62 indicates a nut; these parts constitute the joining device 57.

(Gear Mechanism 51)

As is shown in FIG. 15, the gear mechanism 51 has three shaft parts 64, 65 and 66 which are mounted between the front and rear walls of the housing body 53 in that order so that these shaft parts are free to rotate, and gears 67, 68 and 69 are fastened to the respective shaft parts 59, 60 and 61. Furthermore, an inner face roller 5 is connected to the second shaft part 65, and an outer face roller 6 is connected to the third shaft part 66. The second shaft part 65 rotates in the reverse direction, and the third shaft part 66 rotates in the forward direction, with respect to the rotation of the first shaft part 64; accordingly, the inner face roller 5 and outer face roller 6 rotate in opposite directions from each other.

Furthermore, a spacer roller 70 which is used to maintain the spacing is attached to the third shaft part 66 so that this spacer roller 70 is free to rotate. This spacer roller 70 is formed with substantially the same diameter (including a smaller diameter) as a feed roller 73 that will be described later, and the external circumference of this spacer roller 70 contacts the inside wall surface of the tubular culvert P. Furthermore, this spacer roller 70 may also be appropriately omitted.

(Feed Mechanism 52)

The feed mechanism 52 comprises a driving sprocket 72 which is fastened to the second shaft part 60 outside the housing body 53, a sprocket-equipped feed roller 73 (73*a* indicates the feed roller part, and 73*b* indicates the sprocket part) which is mounted on the third shaft part 61 so that this feed roller 73 is free to rotate, and a chain 74. To describe this in greater detail, the driving sprocket 72 has gear teeth 72*a* on its external circumference, and is fastened to the second shaft part 65 via a key or spline engagement, so that this driving sprocket 72 rotates as a unit with the shaft part 65.

The sprocket-equipped feed roller 73 comprises a small-diameter sprocket part 73*b* and a large-diameter feed roller part 73*a*, and is mounted on the third shaft part 66 via a bearing so that this feed roller 73 is free to rotate. The sprocket part 73*b* has gear teeth on its external circumference.

The chain 74 is mounted on the driving sprocket 72 and the sprocket part 73*b* of the sprocket-equipped feed roller 73, and transmits the driving force of the driving sprocket 72 to the sprocket-equipped feed roller 73.

Furthermore, the rotation of the feed roller 73 contacts the tubular wall of the tubular culvert P, so that the rotation speed of the apparatus S is determined by this rotation; this speed is synchronized with the formation speed of the lining pipe R that is manufactured by the joining roller part 50 (described later).

In this apparatus S, the cross dimension of the apparatus (including the feed roller 73 of this feed mechanism 52) shows a maximum diameter in the natural state, i.e., unconstrained state.

In regard to the relationship between the feed mechanism 52 and the spacer roller 70, both parts are installed in combination in the present embodiment; however, one or the other of these parts may be omitted. Furthermore, the driving system of the feed roller 73 may be omitted, and this feed roller 73 may be endowed with the function of a spacer roller.

(Hydraulic Motor 54)

As is shown in FIG. 15, the hydraulic motor 54 is attached to the front surface of the housing body 53, with the driving shaft 54a of this hydraulic motor 54 connected to the first shaft part 64.

"In" side piping 76a which feeds oil into the hydraulic motor 54, and "out" side piping 76b which discharges this oil from the hydraulic motor 54, are connected to the hydraulic motor 54. Furthermore, these sets of piping 76 are connected to a rotary coupling device 9 which is attached to the housing body 53 or forming frame 1 in an appropriate position, and hydraulic piping (external piping) 77 (see FIG. 1) which communicates with an external pressure source is connected via this rotary coupling device 9.

Figure 17:
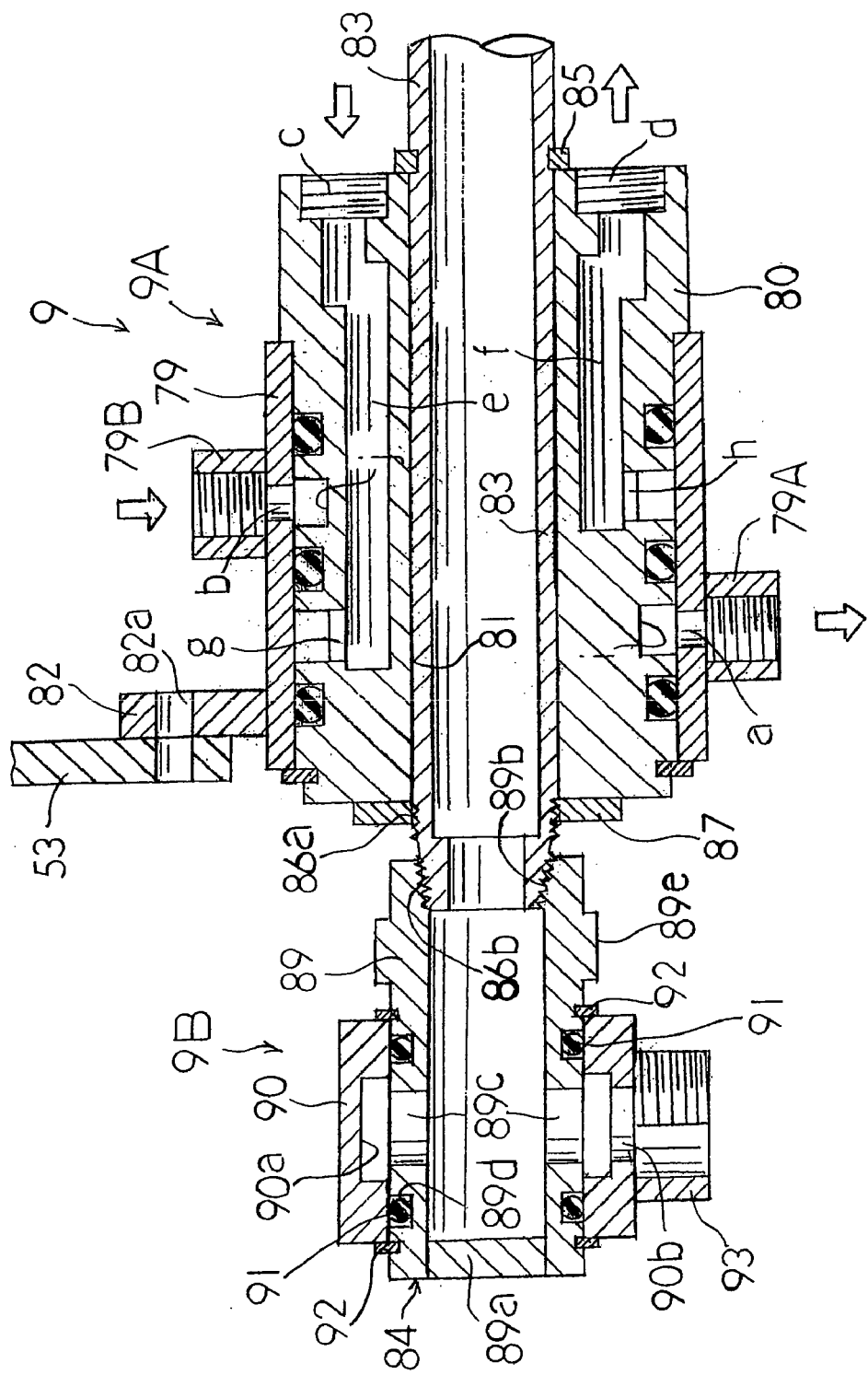
FIG. 17 is a partially sectional partial side view illustrating the construction of the rotary coupling device.

Rotary Coupling Device 9 (See FIG. 17)

The rotary coupling device 9 consists of a combination of a hydraulic rotary coupling part 9A, and a back-filling material rotary coupling part 9B which is disposed through the central part of this hydraulic rotary coupling part 9A.

(Hydraulic Rotary Coupling Part 9A)

The hydraulic rotary coupling part 9A consists of a combination of a cylindrical fixed body 79, and a cylindrical rotating body 80 which is inserted into the fixed body 79 so that this rotating body 80 is free to rotate. A circular hole 81 which has a relatively large diameter is formed so that this hole passes through the axial center of the rotating body 80. An "in" port a and an "out" port b are formed in the fixed body 79; the "in" port a is connected to the "in" side piping 76a of the piping 76 via a connecting pipe 79A, and the "out" port b is connected to the "out" side piping 76b of the piping 76 via a connecting pipe 79B. The rotating body 80 is engaged inside the fixed body 79 so that the rotating body 80 is free to rotate while maintaining a liquid seal, and two connecting ports c and d are formed in the end surfaces of the rotating body 80. Hydraulic passages e and f that communicate with these two connecting ports c and d ("in" connecting port c and "out" connecting port d) are formed inside the rotating body 80, and these passages respectively communicate with oil grooves i and j that are recessed in the circumferential direction in the circumferential surface of the rotating body 80 via communicating holes g and h. The oil groove i communicates with the "in" port a, and the oil groove "j" communicates with the "out" port b.

Furthermore, the fixed body 79 is attached to the housing body 53 and thus to the forming frame 1 via an attachment plate 82. 82a is a bolt hole.

Moreover, the "in" side 77a of the external piping 77 is connected to the "in" connecting port c of the hydraulic rotary coupling part 9A, and the "out" side 77b of the external piping 77 is connected to the "out" connecting port d of the hydraulic rotary coupling part 9A. Furthermore, the external piping 77 is connected to a hydraulic driving source G.

As a result of the interposition of this hydraulic rotary coupling part 9A, the operating fluid is exchanged between the piping 76 on the side of the hydraulic motor 54, which performs a rotating operation, and the external piping 77, which does not perform any rotating operation.

Furthermore, the driving force of the hydraulic motor 54 is transmitted to the first shaft part 64 by the gear mechanism 51 and hydraulic motor 54, and this driving force is transmitted to the second and third shaft parts 65 and 66 via the gear mechanism 51. The second shaft part 65 and third shaft part 66 rotate in mutually opposite directions.

(Back-Filling Material Rotary Coupling Part 9B)

The back-filling material rotary coupling part 9B comprises the following main parts: namely, an injection coupling pipe 83 which is passed through the round hole 81 in the hydraulic rotary coupling part 9A, and a rotary coupling 84 which is mounted on the front end portion of this injection coupling pipe 83.

To describe this in greater detail, the injection coupling pipe 83 has a circular pipe shape with a relatively short fixed length; the external diameter of this pipe 83 is set so that this pipe 83 can be passed through the circular hole 81 in the hydraulic rotary coupling part 9A, and a specified protruding length is maintained in the front and rear parts when the pipe 83 is passed through a specified position. The internal diameter of this injection coupling pipe 83 is set at a sufficiently large value so that there is no obstruction of the flow of the filling material through the pipe 83; furthermore, a stopper 85 is fastened by after-attachment near the front end, and the extent to which the pipe 83 passes through [the hole 81] is regulated by this stopper 85. Two screws 86a and 86b are formed on the external circumference of the rear end portion of the injection coupling pipe 83; the front screw 86a faces the back surface position of the rotating body 80 of the hydraulic rotary coupling part 9A when the injection coupling pipe 83 is passed through the round hole 81, and the injection coupling pipe 83 is fastened by tightening a fastening nut 87 that is screwed onto this screw 86.

Furthermore, the rear screw 86b is formed with a taper that decreases the diameter toward the tip end.

The rotary coupling 84 comprises a short pipe 89, and an annular body 90 that is fit over this short pipe 89 such that the annular body 90 is free to rotate. One end (the rear end) of the short pipe 89 is closed off by a closing cover 89a, while the other end (the front end) is open. A screw 98b which expands in diameter toward the end portion is formed with a tapered shape in the internal circumference of the short pipe 89, and this screw 98b is screw-engaged with the tapered screw 86b of the injection coupling pipe 83. A plurality of discharge ports 89c are formed at a specified spacing on the circumference of the same circle in the vicinity of the central portion of the short pipe 89, and O-ring grooves 89d are recessed in the outside of the short pipe 89 parallel to the discharge ports 89c. O-rings 91a are mounted in these parts. 89e indicates a spanner engagement part.

The annular body 90 faces the discharge ports 89c of the short pipe 89, and is mounted with a liquid-tight seal so that this annular body 90 is free to rotate about the short pipe 89. 91b indicates a fastening fitting. A wide groove 90a is continuously formed in the internal circumferential surface of the internal circumferential surface of the annular body 90 facing the discharge ports 89c; furthermore, a discharge port 90b which communicates with this groove 90a is formed at one location in the annular body 90. A discharge pipe 93 which communicates with this discharge port 90b is installed on the outside of the annular body 90.

(Attachment and Removal of Rotary Coupling Device 9)

Attachment

The installation of the rotary coupling device 9 is accomplished as follows: first, the hydraulic rotary coupling part 9A is attached to the housing body 53. Next, in the back-filling material rotary coupling part 9B, the injection coupling pipe 83 is passed through the round hole 81 of the hydraulic rotary coupling part 9A and stopped at the position of contact with the stopper 85. The fastening nut 87 is then inserted from the rear part of the injection coupling pipe 83, after which the fastening nut 87 is turned and tightened down on the screw 86a of the injection coupling pipe 83 so that the injection coupling pipe 83 is fastened in place. Then, the screw 89b of the short pipe 89 of the rotary coupling 84 is screw-engaged with the tapered screw 86b of the injection coupling pipe 83 so that mounting is completed.

Removal

Removal is accomplished by a procedure that is the opposite of the abovementioned attachment procedure. Specifically, in the case of the back-filling material rotary coupling part 9B, the rotary coupling 84 is turned in the reverse direction and removed from the injection coupling pipe 83; then, the fastening nut 87 is turned in the reverse direction and removed, after which the injection coupling pipe 83 is removed from the hydraulic rotary coupling part 9A.

Alternatively, in the case of the overall assembly, a procedure may be used in which the hydraulic rotary coupling part 9A is removed from the housing body 53, after which the back-filling material rotary coupling part 9B is disassembled.

In cases where the lining apparatus is stopped and the filling work is halted during the pipe manufacturing process, only the back-filling material rotary coupling part 9B is removed from the rotary coupling device 9.

(Other Rotary Coupling Device 9C)

Figure 18:
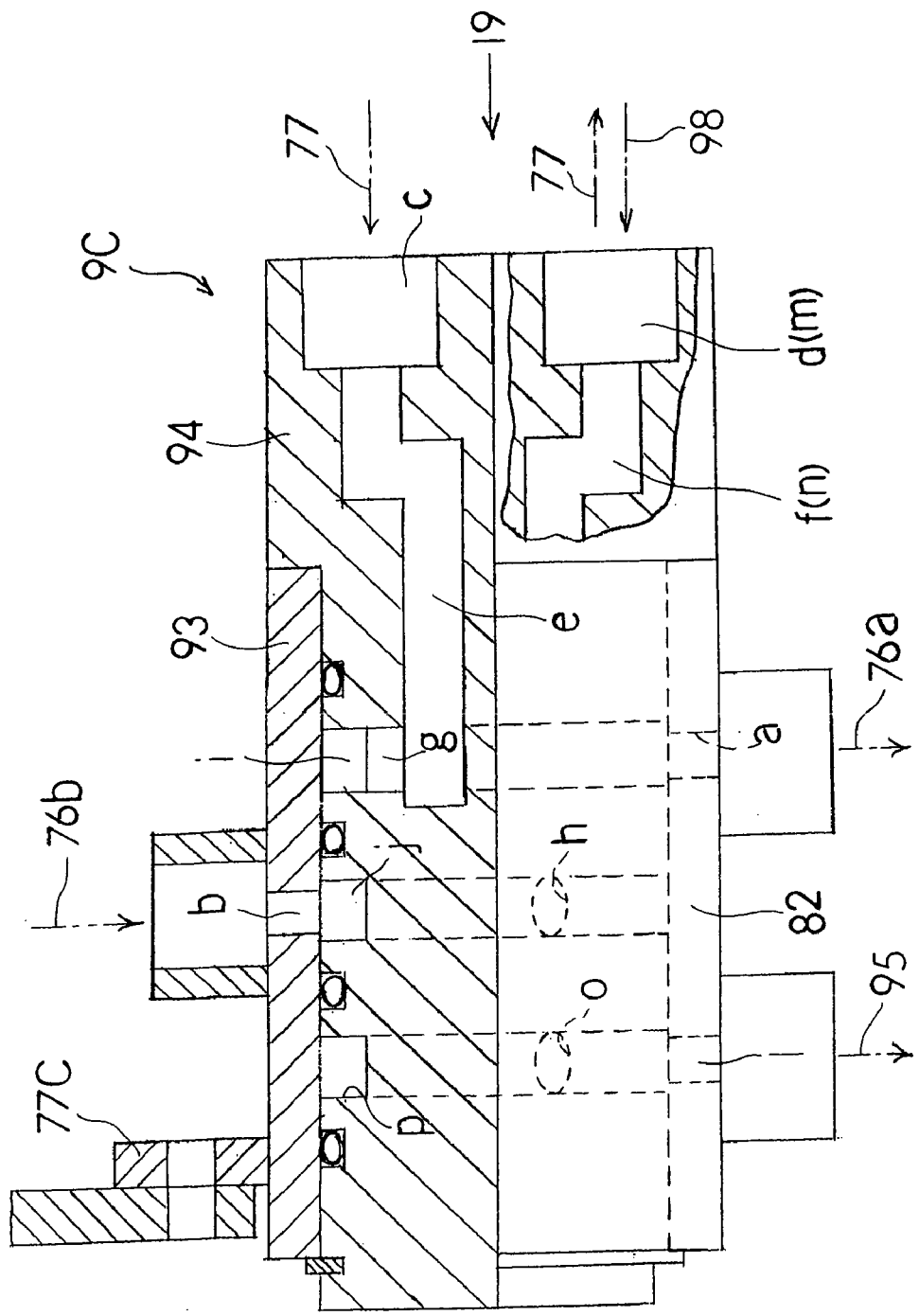
FIG. 18 is a partially sectional partial side view which illustrates the construction of another rotary coupling device.
Figure 19:
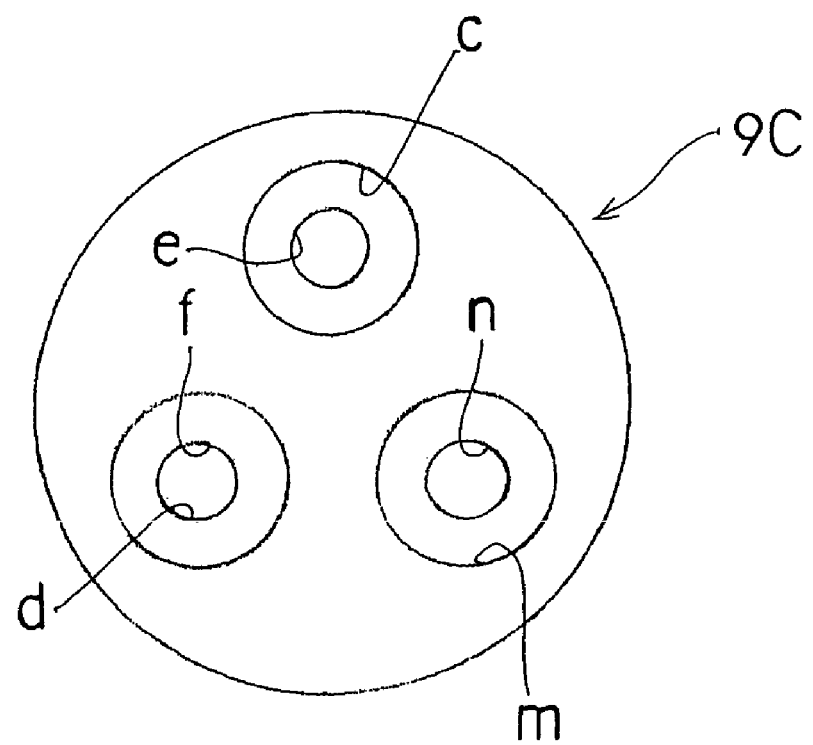
FIG. 19 is a view in the direction of the arrow 19 shown in FIG. 18.

FIGS. 18 and 19 show another rotary coupling device 9C.

This rotary coupling [device] 9C consists of an assembly of a cylindrical fixed body 93 and a rotating body 94 that is inserted into this fixed body 93; this device 9C is in common use for both hydraulic pressure and filling with the back-filling material.

For hydraulic pressure use, an "in" port a and "out" port b are formed in the fixed body 93; the "in" port a is connected to the "in" side piping 76a of the piping 76, and the "out" port b is connected to the "out" side piping 76b of the piping 76. The rotating body 94 is engaged inside the fixed body 93 so that this rotating body 94 is free to rotate while maintaining a liquid-tight seal, and two connecting ports c and d are formed in the end surfaces of the rotating body 94. Hydraulic passages e and f that communicate with these two connecting ports c and d ("in" connecting port c and "out" connecting port d) are formed inside the rotating body 94, and these passages respectively communicate with oil grooves i and j that are recessed in the circumferential direction in the circumferential surface of the rotating body 94 via communicating holes g and h. The oil groove i communicates with the "in" port a, and the oil groove "j" communicates with the "out" port b.

Furthermore, the "in" side 77a of the external piping 77 is connected to the "in" connecting port c of the rotary coupling [device] 9C, and the "out" side 77b of the external piping 77 is connected to the "out" connecting port d of the rotary coupling [device] 9C.

For back-filling material use, a port 1 is formed in the fixed body 93, and a connecting port m is formed in the end surface of the of the rotating body 94; furthermore, a liquid passage n that communicates with the connecting port m is formed inside the rotating body 94, and this communicates with a recessed groove p that is recessed in the circumferential direction in the circumferential surface of the rotating body 94 via a communicating hole o.

Furthermore, an injection tube 95 is connected to the port 1 of the rotary coupling part 9C, and a back-filling material supply pipe 98 is connected to the connecting port m. The fluid-form or liquid-form back-filling material that is fed in via the back-filling material supply pipe 98 passes through the liquid passage n from the connecting port m, and is conducted into the recessed groove p via the communicating hole o, after which this back-filling material flows out into the injection tube 95 from the port 1.

A fastening material supply device K which feeds the back-filling material into this back-filling material supply pipe 95 is disposed at the other end of the back-filling material supply pipe 95.

The rotary coupling devices 9 and 9C of both of the abovementioned embodiments are installed in common with the rotary coupling of the hydraulic motor 54; however, these rotary coupling devices may also be installed as separate parts. In such a case, the mechanism of the rotary coupling is simplified.

Joining Mechanism Part 7

The description will now return to the joining mechanism part 7.

(Joining Roller Part 50)

Figure 16:
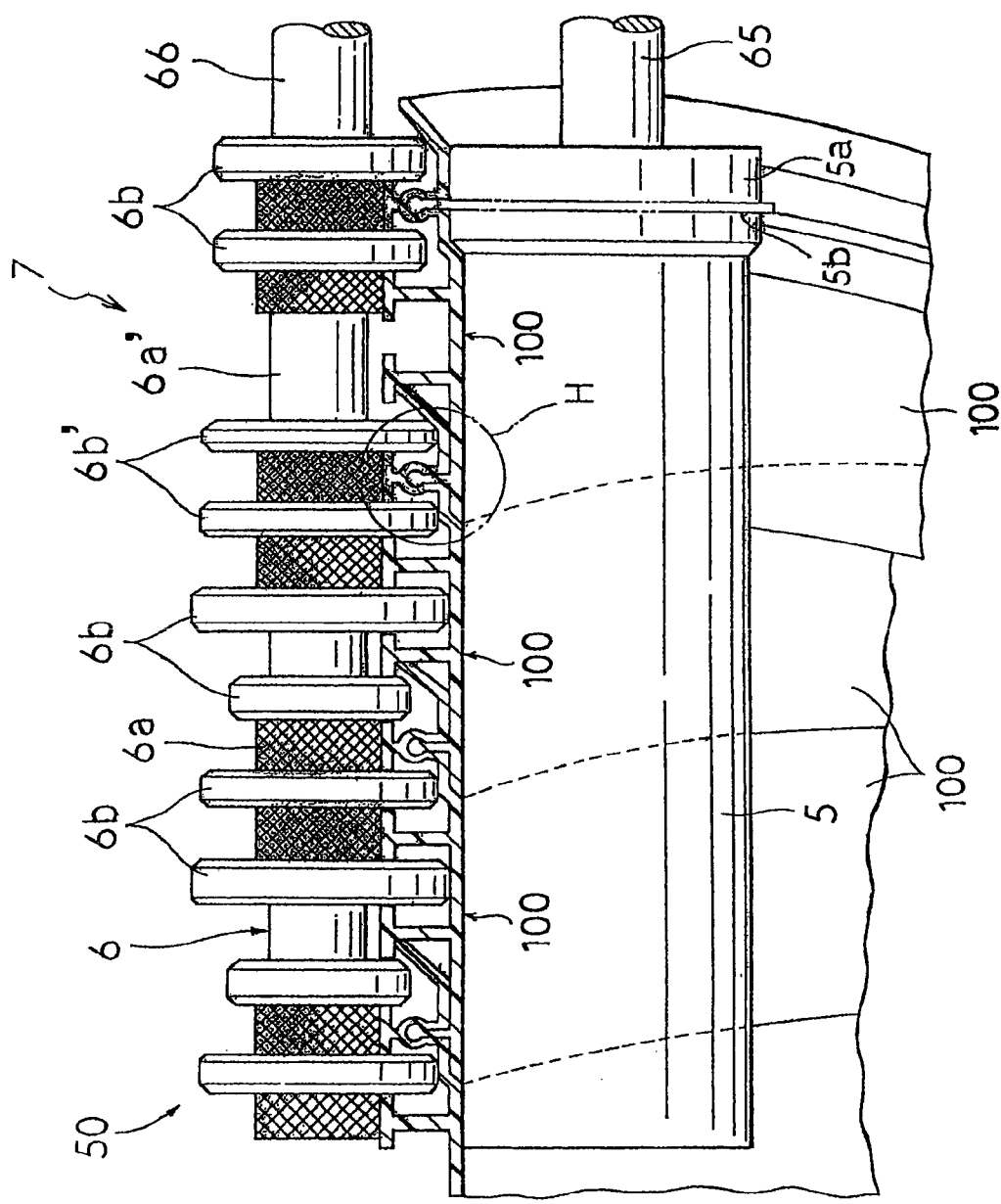
FIG. 16 is a structural diagram of the joining rollers of the joining mechanism part.

In the joining roller part 50 of the joining mechanism part 7, as is shown in FIG. 16, an inner face roller 5 and an outer face roller 6 are installed side by side in the axial direction of the pipe; furthermore, these rollers 5, 6 are disposed with a specified gap maintained therebetween so that the strip-like member 500 is clamped between the two rollers 5 and 6.

Furthermore, as was described above, the inner face roller 5 is directly attached to the second shaft part 65, and the outer face roller 6 is directly attached to the third shaft part 66.

FIG. 16 shows the detailed structure of the joining roller part 50.

FIG. 16 shows an enlarged view of the inner face and outer face rollers 5 and 6 of the joining roller part 50, and shows the correspondence between these rollers 5 and 6 and the strip-like member 500. In the present embodiment, as is shown in this figure, these rollers 5 and 6 are disposed across a plurality of spans (three spans in the present embodiment) of the strip-like member 500. Furthermore, H indicates the area of initial joining of the spans of the strip-like member 500 to each other.

The inner face roller 5 has a cylindrical shape. This roller 5 adheres tightly to the inside surface of the strip-like member 500, and includes the joining area H. This roller 5 supports the strip-like member 500 that is pressed from the outside by the outer face roller 6. Furthermore, an expanded-diameter part 5a is formed on the front end portion of the inner face roller 5, and a hook 5b which engages with a groove 510 in the inside surface of the strip-like member 500 is caused to protrude from this expanded-diameter part 5a. However, this part may be appropriately omitted.

In the outer face roller 6, a plurality of annular hook parts 6b are formed on the cylindrical main body 6a at a specified spacing, and these annular hook parts 6b are inserted into the grooves 504 between the protruding ribs 502 of the strip-like member 500. Furthermore, the external circumference of the cylindrical main body 6a is pressed against the outside surfaces of the protruding ribs 502. Roulette working is applied to the outside surface of the cylindrical main body 6a, so that slipping between the cylindrical main body 6a and the strip-like member 500 is prevented. Furthermore, one part 6a' [of the cylindrical main body 6a] is formed with a small diameter, so that this part is removed from the [corresponding] protruding rib 502.

In regard to the annular hook parts 6b, the circumferential side parts of two paired annular hook parts 6b' corresponding to the joining area H contact the strip-like member 500. In the case of the other annular hook parts 6b, there is no particular need for these annular hook parts to contact [the strip-like member 500]; the essential point here is that the annular hook parts 6b are inserted into the grooves 504 between the protruding ribs 502.

The attachment of this joining mechanism part 7 to the lining pipe R is accomplished as follows: the upper part 53A of the housing body 53 is opened, and the annular hook parts 6b of the outer face roller 6 are aligned with the pitch of the protruding ribs 502 of the strip-like member 500. Furthermore, the annular hook parts 6b' are positioned in the closing area H, after which the upper part 53A is closed with the lower part 53B so that the joining device 57 is closed, and the nut 62 is tightened down.

Figure 20:
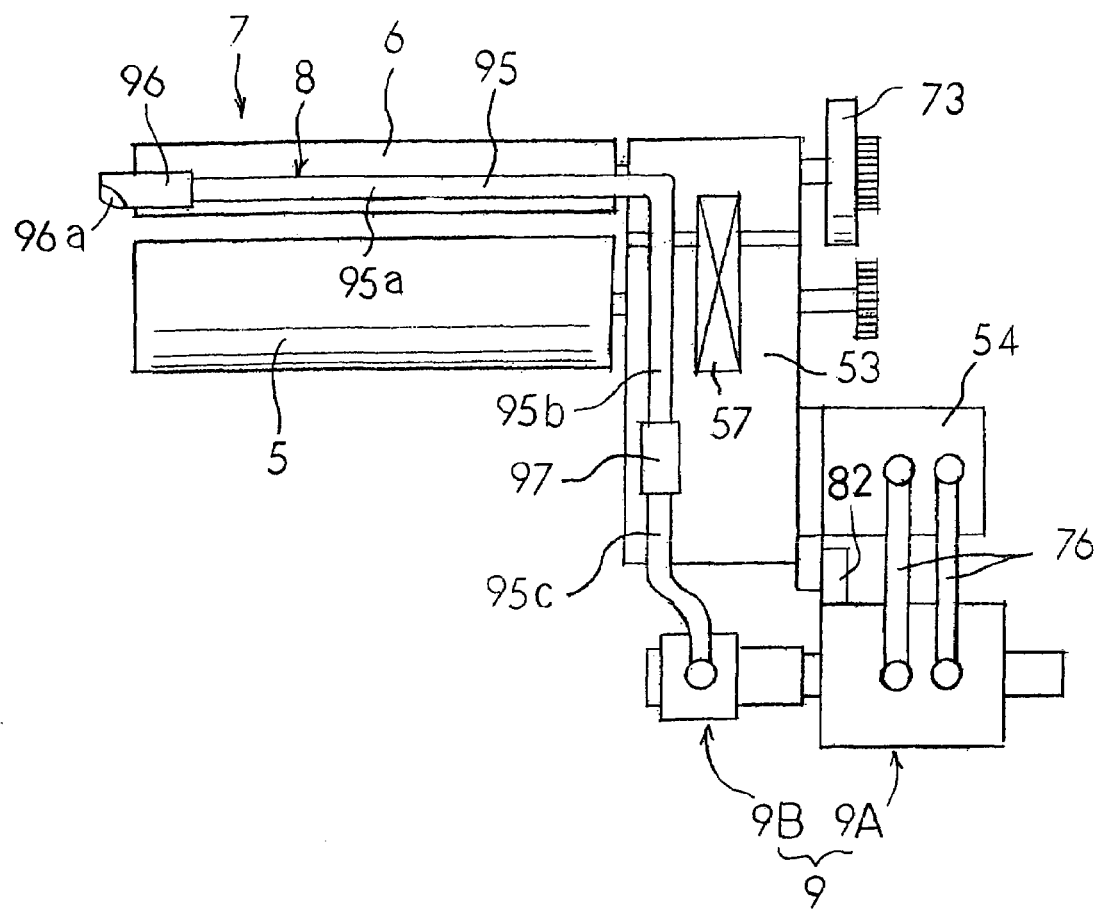
FIG. 20 is a side view which illustrates the construction of the back-filling material injection mechanism part.

Back-Filling Material Injection Mechanism Part 8 (See FIG. 20)

The main body of the back-filling material injection mechanism part 8 consists of a single back-filling material injection tube 95. An injection part 96 is disposed on the tip end of this injection tube 95, and the base end of this injection tube 95 is connected to the abovementioned rotary coupling part 9, especially the back-filling material rotary coupling part 9B. Furthermore, the back-filling material injection mechanism part 8 is disposed adjacent to the joining mechanism part 7, and after this joining mechanism part 7 in the direction of rotation.

(Back-Filling Material Injection Tube 95)

The injection tube 95 comprises a bent tube that possesses rigidity. This injection tube 95 is fastened and clamped by a supporting fitting 97 that is fastened to the side surface of the housing body 53 of the joining mechanism part 7, so that a specified position is maintained. Specifically, the injection tube 95 comprises a horizontal part 95a which is oriented parallel to the outer face roller 6 of the joining roller part 50, a vertical part 95b which runs along the side surface of the housing body 53, and an attachment part 95c which runs toward the rotary coupling part 9B from the vertical part 95, with respective bent parts being interposed between these parts of the injection tube 95. Moreover, the portion of the injection tube 95 that precedes the supporting fitting 97 must possess rigidity; the portion that is located further toward the rotary coupling part 9B than the supporting fitting 97 may be flexible.

This injection tube 95 is disposed beside the joining roller part 50 of the joining mechanism part 7, and is disposed after the joining roller part 50 with respect to the direction of advance.

(Injection Part 96)

The injection part 96 is formed in the tip end portion of the horizontal part 95a of the injection tube 95, in an area that is located further inward than the tip end of the outer face roller 6 of the joining roller part 50. A single injection port is formed which faces toward the center of the pipe with respect to the direction of the pipe diameter, and which faces rearward with respect to the direction of advance of the joining mechanism part 7.

This injection part 96 may be made removable.

Furthermore, a configuration may be employed in which a plurality of injection ports are formed in the injection part 96 at specified intervals. In this case, the injection part 96 has a length that is equal to the width of at least one [span of the] strip-like member 500. Furthermore, the spacing of the injection ports is caused to coincide with the spacing between the flanges 502.

Furthermore, a single injection port 96a is used for a cement type back-filling material, while a plurality of injection ports are used for a synthetic resin type back-filling material.

Moreover, the base end of the injection tube 95 is connected to the discharge pipe 93 of the back-filling material rotary coupling part 9B of the abovementioned rotary coupling device 9, and a back-filling material supply pipe 98 is connected to the rear end of the injection coupling pipe 83. In concrete terms, a so-called hose that possesses flexibility is used as the back-filling material supply pipe 98. The fluid-form or liquid-form back-filling material FL that is fed in via the back-filling material supply pipe 98 passes through the pipe passage of the injection coupling pipe 83 of the back-filling material rotary coupling part 9B, and is conducted into the groove 90a of the annular body 90 via the short pipe 89 and discharge ports 89a of the rotary coupling 84; this back-filling material FL then flows out into the discharge pipe 93 from the discharge port 96b. From the discharge pipe 93, the back-filling material FL is discharged from the injection part 96 via the injection tube 95 of the back-filling material injection mechanism part 8.

A back-filling material supply device K which feeds the back-filling material into the back-filling material supply pipe 98 is disposed at the other end of this back-filling material supply pipe 98.

Figure 21:
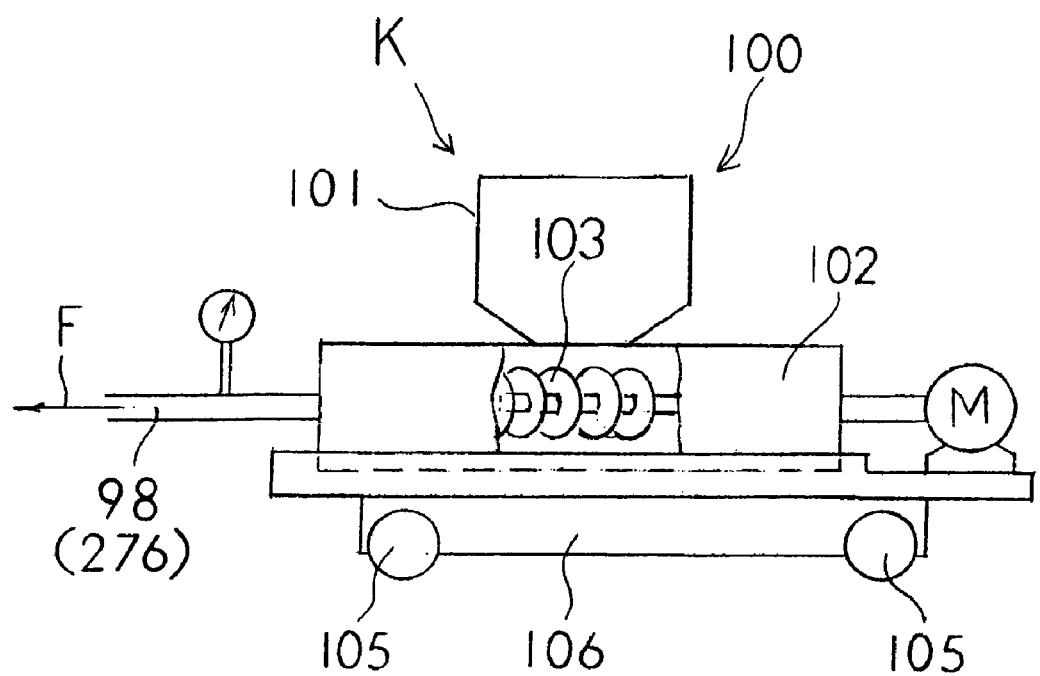
FIG. 21 is a diagram of one example of the back-filling material supply device.
Figure 22:
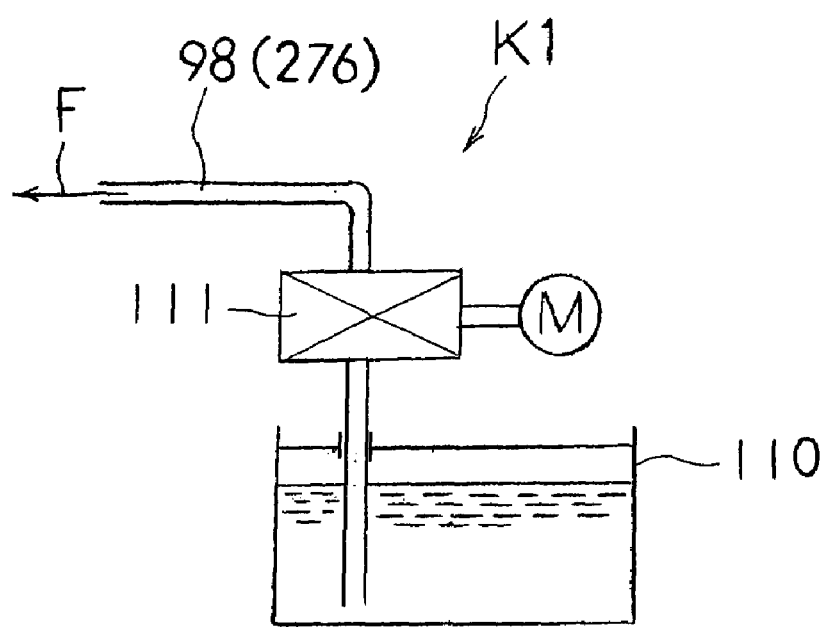
FIG. 22 is a diagram of another example of the back-filling material supply device.

Back-Filling Material Supply Device K, K1 (See FIGS. 21 and 22)

In the present embodiment, the back-filling material supply device K has the function of supplying a fluid-form or liquid-form back-filling material F at a specified pressure to the injection tube 95 of the back-filling material injection mechanism part via the rotary coupling device 9 and back-filling material rotary coupling part 9B; this device K has at least a pumping function.

The back-filling material supply device K shown in FIG. 21 is used for a cement type back-filling material; here, a pressure-feeding device 100 feeds out a cement paste or cement mortar that is supplied via a hopper 101 to the supply pipe 98 by means of a cement pump 102 that is driven by an electric motor M. The cement pump 102 obtains a feed-out pressure by the feeding action of a helical vane 103. Furthermore, the cement pump 102 is not limited to this configuration; some other configuration (for example, a plunger type pump or the like) could also be freely employed. The pressure-feeding device 100 is carried on a car 106 that can move by means of wheels 105, and advances together with the advancing motion of the pipe manufacturing apparatus S. A traction system is generally employed for this car 106; however, a self-propelled car may also be used.

Furthermore, FIG. 22 shows another aspect of the back-filling material supply device K1; this is an example involving the use of a liquid-form synthetic resin type back-filling material. Here, a liquid-form back-filling material stored in a container 110 is drawn upward by an electric pump 111, and is fed into the rotary coupling part 9 at a specified pressure. This container 110 is also appropriately mounted on a car (not shown in the figures), so that the container can move.

Furthermore, considering the hardening time of the back-filling material, the distance from these back-filling material supply devices K and K1 to the back-filling material injection mechanism part 8 is set on the short side.

Back-Filling Material

The back-filling material used in the present embodiment may be a cement type or synthetic resin type back-filling material; however, the back-filling material used is not limited to these types (for example, fine sand may also be used). In the case of a cement type and synthetic resin type back-filling material, the back-filling material shows fluidity during the filling process, and then sets to show a specified strength. Preferably, this back-filling material possesses foaming properties.

More specifically, a cement type back-filling material consists chiefly of a cement material and waste (hereafter referred to as a cement milk or paste); other appropriate mixing materials, especially foaming agents which exhibit foaming properties or gas generating agents (e. g., powdered aluminum or the like) are added, and the viscosity is adjusted so that the material has an appropriate self-maintaining force. Alternatively, a mortar in which fine sand has been added to the cement paste material may be used. In this case as well, similar mixing materials are appropriately added.

So-called foaming synthetic resins are used as synthetic resin type back-filling materials.

Such foaming synthetic resin back-filling materials possess tackiness in an uncured state, and are liquid in form. Furthermore, after curing, such materials exhibit a specified strength. In the case of such foaming synthetic resin back-filling materials, the duration and extent of foaming are appropriately adjusted by means of reaction accelerating or inhibiting agents, foaming agents and foam regulating agents. Ordinarily, such materials are adjusted so that the time of initiation of the reaction is delayed. Furthermore, the viscosity and tacky adhesion are adjusted by means of a thickening agent so that the back-filling material is adjusted to a viscosity that prevents the material from dropping to the bottom of the lining pipe R, and is adjusted to a degree of tacky adhesion that causes the material to adhere to the groove surfaces of the lining pipe R. On-site foaming plastics such as foaming polyurethanes, foaming urea resins, foaming phenol resins and the like can be appropriately used as such foaming synthetic resins.

Lining Method

The abovementioned lining apparatus S is used and operated in the lining of the interiors of tubular culverts as described below.

FIGS. 23 through 26 show an outline of one aspect of the lining work. In the case of this lining work, an example is shown in which the work is performed on a sewage line tubular culvert P which has a circular cross section as a tubular culvert that is installed underground. In the figures, Q1 indicates a manhole on the upstream side, and Q2 indicates a manhole on the downstream side.

Figure 23:
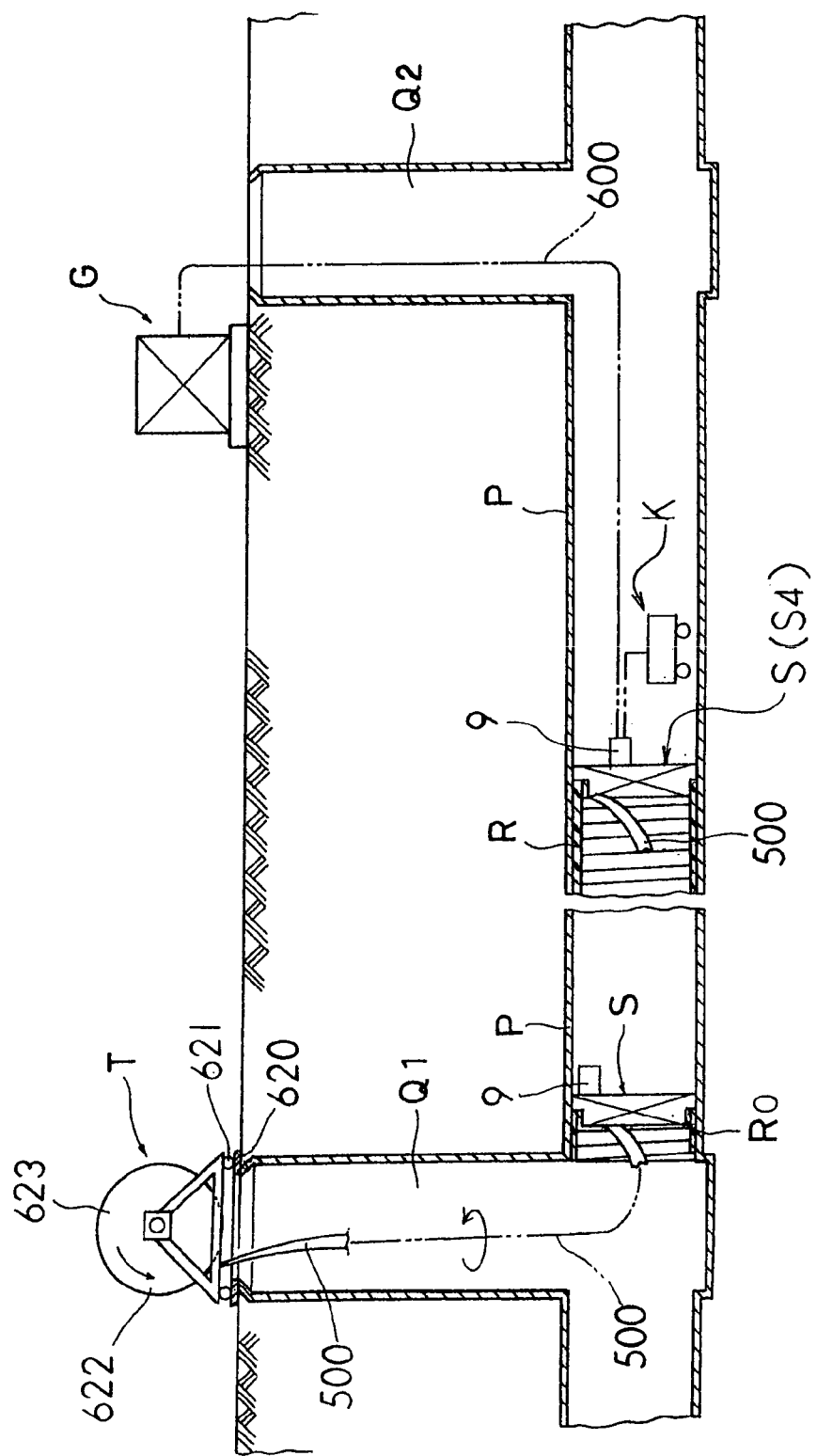
FIG. 23 is a schematic diagram which illustrates the overall layout of one aspect of the lining application work.

As is shown in FIG. 23, a pay-out apparatus T equipped with a winding stand around which a strip-like member 500 is wound is disposed in the above-ground area on the side of the upstream manhole Q1, and a hydraulic driving source G is installed on the side of the downstream manhole Q2. The work is performed from the upstream side toward the downstream side.

Furthermore, the back-filling material supply device K (K1) is disposed in front of the lining apparatus S near the lining apparatus S as described above.

Conveyance of Lining Apparatus S into Interior of Tubular Culvert P

The lining apparatus S is conveyed into the tubular culvert P that is the object of refurbishing via the manhole Q1. The forming frame 1 of this lining apparatus S can be assembled, so that the conveyance of the apparatus into the manhole Q1 is facilitated. Specifically, the opening parts of the manholes Q are small; however, conveyance can easily be accomplished by removing the bolts and nuts from the back plates 17 of one inside link body 10B, or by removing the adjustment bolt 31 of one circumferential length adjustment mechanism 2. Following the conveyance of the apparatus into [the manhole], the forming frame 1 is formed into an annular body by again attaching the abovementioned bolts and nuts or adjustment bolt 31 in the manholes Q. Furthermore, the joining mechanism part 7 is arranged so that this part can be attached to the abovementioned forming frame 1, and on-site attachment of this part 7 is also easy. At the same time, the back-filling material injection mechanism part 8 and rotary coupling device 9 are also mounted.

In regard to the hydraulic system which is used as the operating pressure fluid system, hydraulic piping 600 is connected via the hydraulic rotary coupling part 9A of the rotary coupling device 9, and this hydraulic piping 600 is connected to the hydraulic driving source G in the above-ground area.

In regard to the back-filling material system, the end of the injection tube 95 of the back-filling material injection mechanism part 8 is connected to the back-filling material rotary coupling part 9B. There is no supply of the back-filling material F from the back-filling material supply device K.

Adjustment of Circumferential Length of Forming Frame 1

The circumferential length of the forming frame 1 in the lining apparatus S is adjusted. Specifically, the adjustment bolt 31 of the circumferential length adjustment mechanism 2 of the forming frame 1 is turned, so that the spacing y is adjusted. Ordinarily, the adjustment bolt 31 is positioned in the neutral position. As a result, the circumferential length of the lining pipe R that is formed is regulated. Furthermore, the inside and outside spacing maintaining bodies 41 and 42 of the spacing maintaining mechanism 3 are placed in a state in which these spacing maintaining bodies are separated from each other to the maximum extent possible.

Moreover, the circumferential length of the forming frame 1, more specifically, the length of the outer envelope of the guide rollers 4, is caused to coincide with the circumferential length of the internal diameter of the tubular culvert P.

When the adjustment of the circumferential length adjustment mechanism 2 is completed, the bolts 43 in the spacing maintaining mechanism 3 are turned so that the inner and outer spacing maintaining bodies 41 and 42 are drawn toward each other and caused to contact the tapered surfaces 40a of the tapered plates 40.

Lining Work

The lining work is performed according to the following procedure:

(1) The strip-like member 500 is pulled into the manhole Q1. Inside the manhole Q1, the assembled lining apparatus S is driven, so that the strip-like member 500 is wound several times (about three times) around the forming frame 1 with the driving of the joining mechanism part 7, thus forming a lining pipe (referred to as the "starting lining pipe") Ro. The circumferential length of the inside surface of this starting lining pipe Ro is equal to the circumferential length of the lining apparatus S. Furthermore, this starting lining pipe Ro maintains a circular shape in a natural state (without the application of any constraining force) by virtue of the elasticity of the strip-like member 500.

(2) Inside the manhole Q, in the lining apparatus S with which the starting lining pipe Ro is assembled in the abovementioned state, the attachment part of the forming frame 1 to which the joining mechanism part 7 has been attached is placed in an inward-folded state via the links, and the joining mechanism part 7 is pulled inward in the radial direction together with the starting lining pipe Ro. In this case, the outer end of the feed roller 73 of the joining mechanism part 7 is placed on the circumference of the starting lining pipe Ro in a natural state, or is caused to protrude slightly outward from this circumference.

In this way, a lining pipe (referred to as the "initial-stage lining pipe) Ri which is used as pre-stage that is inserted into the tubular culvert P is formed.

The use of a shape-maintaining tool is useful in the drawing-in operation of this attachment part.

Figure 24:
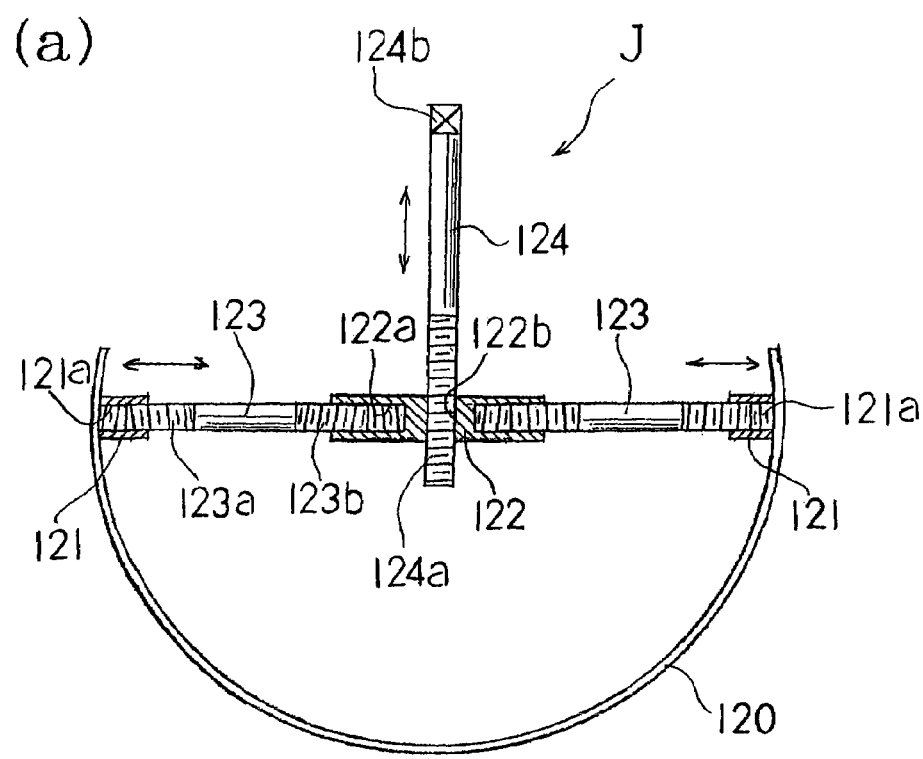
FIG. 24 is a diagram of one example of a shape-maintaining tool.
Figure 24:
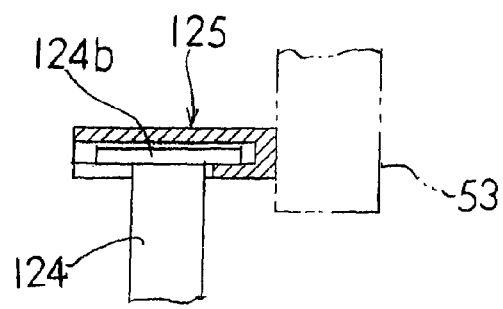

FIG. 24 shows one example of this shape-maintaining tool J.

This shape-maintaining tool J comprises a circular-arc plate (pressing plate) 120 which substantially exceeds an angle of 180°, end part screw hole members 121 which are fastened to the insides of both end parts of the circular-arc plate 120, two fastening screw rods 123 which are interposed between these screw hole members 121 with a central screw hole member 122 being further interposed between these fastening screw rods 123, and a pull-in screw rod 124 which is screw-engaged with the screw hole of the abovementioned central screw hole member 122.

To describe this in greater detail, the circular-arc plate 120 comprises a steel plate that has a circular-arc shape; this plate 120 possesses a slight elasticity, and the outer side surface thereof contacts the internal circumferential surface of the forming frame 1. Screw holes 121a are formed in the end part screw hole members 121, and these screw holes 121a receive screws 123a that are formed on one end of each of the fastening screw rods 123. Screw holes 122a which accommodate screws 123b formed on the other ends of the fastening screw rods 123 are formed in the central screw hole member 122, and a screw hole 122b with which the screw 124a of the pull-in screw rod 124 is screw-engaged is formed in the center of the central screw hole member 122. The screws 123a and 123b of the fastening screw rods 123 are threaded in opposite directions. The other end of the pull-in screw rod 124 forms an attachment part 124b which is attached to the forming frame 1 or the joining mechanism part 7.

As is shown by one aspect in FIG. 24(b), the attachment of the pull-in screw rod 124 and joining mechanism part 7 is accomplished as follows: the attachment part 124b of the pull-in screw rod 124 has the form of a disk, and is engaged with a counter-force receiving member 125 that is caused to protrude from the back surface of the housing body 53 of the joining mechanism part 7 so that this attachment part 124b is free to rotate.

In regard to the use of this shape-maintaining tool J, the shape-maintaining tool J is disposed in a specified state inside the forming frame 1; then, the fastening screw rods 123 are first turned so that the diameter of the circular-arc plate 120 is expanded and this circular-arc plate 120 is fastened in place by being pressed against the internal circumference of the forming frame 1. Furthermore, the pull-in screw rod 124 which is engaged with the joining mechanism part 7 by means of the attachment part 124b is turned so that the joining mechanism part 7 is pulled inward in the radial direction, and the link part of the attachment part of the forming frame 1 is placed in an inward-folded state.

Furthermore, as long as the shape-maintaining tool J has a comparable function, this tool J is not limited to the abovementioned aspect.

(3) The lining apparatus S in this state is pulled into the interior of the tubular culvert P, and is temporarily fastened in place in an appropriate position in the tubular culvert P (ordinarily the inlet end portion of the tubular culvert).

During this pulling-in process, the entire lining apparatus S (including the initial lining pipe Ri) is in a state that can be accommodated within the internal diameter of the tubular culvert P; accordingly, there is no particular difficulty in this pulling-in operation.

Afterward, the shape-maintaining tool J is removed.

Next, in regard to the back-filling material injection mechanism part 8, a connection with the back-filling material supply device K is made via the back-filling material rotary coupling part 9B, so that this back-filling material injection mechanism part 8 is ready for the supply of the back-filling material.

(4) The lining apparatus S is driven so that a lining pipe R is manufactured.

Specifically, the feed roller 73 of the feed mechanism 52 contacts the tubular wall of the tubular culvert P, and receives the reaction force from this tubular wall, so that the lining apparatus S is rotationally driven. Furthermore, the inner and outer face rollers 5 and 6 of the joining mechanism part 7 are driven, so that the newly supplied strip-like member 500 is joined with the initial lining pipe Ri (as a result of the joint structure) in the joining area H of the strip-like member 500 by the clamping force of the inner face roller 5 and outer face roller 6. The forming frame 1 moves along the inside surface of the formed lining pipe R as a result of the rotation of the guide rollers 4. As a result, the strip-like member 500 is spirally wound such that the lining pipe R is manufactured.

Then, the formed lining pipe R is left in place, the entire lining apparatus S revolves in the circumferential direction of the pipe, and this lining apparatus advances in the axial direction of the pipe while a new strip-like member 500 is added.

In this process, the force that is applied to the circumferential length adjustment mechanism 2 as the forming frame 1 rotates is received by the spacing-maintaining mechanism 3, so that no excessive stress is generated in the circumferential length adjustment mechanism 2.

(4a) In this process, the lining pipe R is folded inward to form a concave curved surface in the area of the joining mechanism part 7 of the lining apparatus S, and this surface recovers to a circular shape, i.e., a convex curved surface, as the joining mechanism part 7 passes. Furthermore, the lining pipe R that is left in the rear recovers to a circular shape as a result of the elasticity of this lining pipe R.

Figure 25:
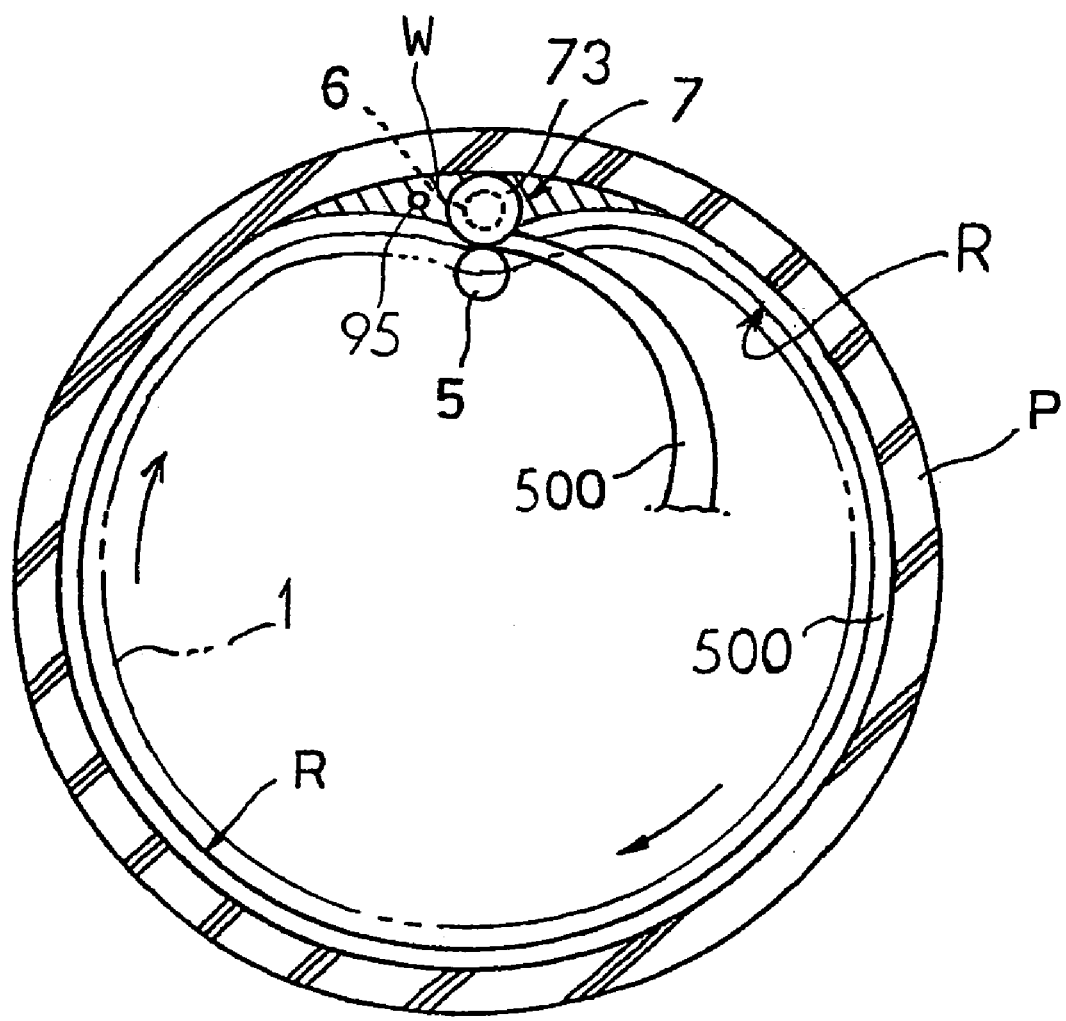
FIG. 25 is diagram showing an outline of the lining application work (tubular culvert with a circular cross section)
Figure 26:
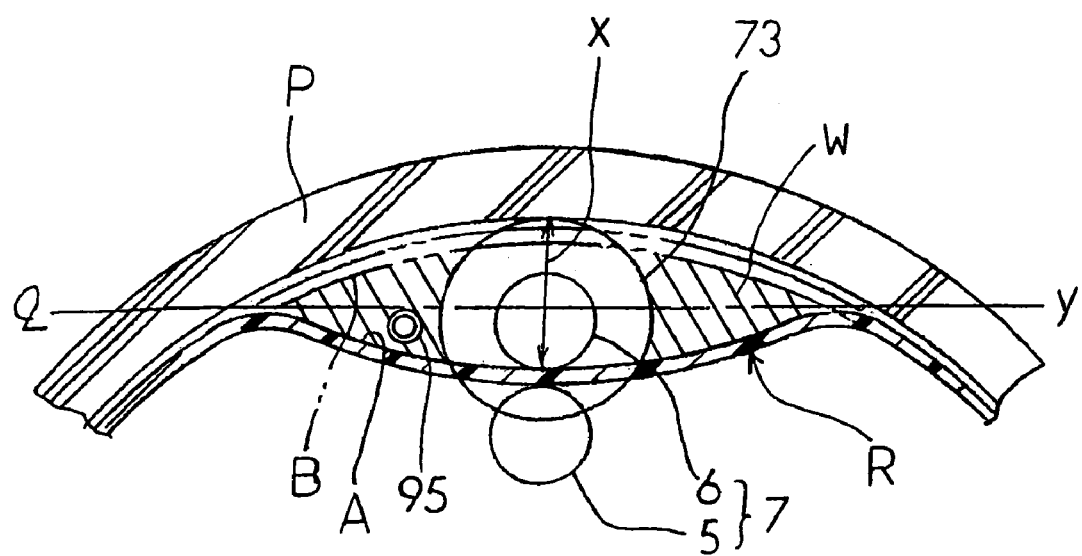
FIG. 26 is a diagram which shows the conditions of the lining pipe around the joining mechanism part.

Specifically, as is shown in FIGS. 25 and 26, in the area of the lining pipe R that is gripped by the joining mechanism part 7, the pressing force that is oriented toward the center is received via the feed roller 73 and joining mechanism part 7, so that a concave curved surface (A) is formed. The concave curved surface results in a recessed part W forming at the junction of the strip-like member, the tubular body, and an area where the strip-like member edge parts are mutually engaged. However, as the lining pipe R recedes from the joining mechanism part 7 in the circumferential direction and direction of depth (axial direction), a convex curved surface (B) is gradually formed as a result of the elasticity of the lining pipe R. In this case, the convex curved surface (B) adheres tightly to the wall surface of the tubular culvert P, or approaches this wall surface as closely as possible. In a desirable aspect, a symmetrical shape is adopted in which a line y that passes through the half-way point of the distance from the inside contact point of the outer face roller 6 to the inside wall surface of the tubular culvert P (contact point of the feed roller 73) is taken as the axis of symmetry.

(4b) At the same time, in this process, the back-filling material supply device K is driven, so that the pressure-feeding device 100 is actuated, thus causing the back-filling material, i.e., cement material, that is fed from the hopper 101 to be fed out via the supply pipe 98; a specified amount of this cement material is injected via the rotary coupling device 9 from the injection part 96 of the injection tube 95 of the back-filling material injection mechanism part 8.

The fluid-form back-filling material is discharged into the space of the concave curved surface (A) of the lining pipe R located to the inside of the outer face roller 6 of the joining mechanism part 7. Then, as the joining mechanism part 7 advances, this concave curved surface (A) gradually changes into the abovementioned convex curved surface (B) and adheres to the wall surface [of the tubular culvert P]; as a result, the back-filling material is widely spread, and enters the groove parts 504 of the strip-like member 500.

Moreover, in the case of a back-filling material which consists of a foaming synthetic resin, the back-filling material supply device K1 is driven, and the liquid-form back-filling material in the container 110 is drawn upward by the pump 111; then, a specified amount of the foaming synthetic resin back-filling material is injected from the injection part 96 of the injection tube 95 of the back-filling material injection mechanism part 8 at a specified pressure via the supply pipe 98 and rotary coupling device 9.

The back-filling material is injected into the groove parts 504 of the strip-like member 500; as a result of the tacky adhesion of this back-filling material, the material adheres to the surface of the lining pipe R, i.e., to the insides of the groove part 504 of the strip-like member 500. This back-filling material accordingly foams and sets without falling downward.

(4c) Furthermore, in this process, the strip-like member 500 is successively supplied from the pay-out apparatus T disposed in the above-ground area. As is indicated by one example of construction shown in FIG. 23, this pay-out apparatus T is constructed as follows: a rotating stand 622 is disposed via rollers 621 on a circular tack 620 installed around the opening part of the manhole Q1 so that this rotating stand 622 is free to rotate, and a winding drum 623 on which the strip-like member 500 is wound in a manner that allows the strip-like member 500 to be freely paid out is supported on this rotating stand 622 so that this winding drum is free to rotate.

(5) The injected foaming back-filling material fills the space between the tubular culvert P and the manufactured lining pipe R. As a result of the foaming and setting of this back-filling material, a specified strength is manifested, and the lining pipe R and tubular culvert P are formed into an integral unit via the back-filling material.

Specifically, in the case of a cement type back-filling material, this material is formed into a finely textured material inside the groove parts 504 as a result of the expanding action of the foaming agent; furthermore, the reinforced strength of the lining pipe R is increased by the setting of this back-filling material. Moreover, since the back-filling material in the groove parts 504 is bonded to the inside wall surface of the tubular culvert P, the tubular culvert P and lining pipe R are formed into an integral unit.

Furthermore, in cases where the back-filling material is a foaming synthetic resin bonding material as well, this back-filling material adheres strongly to tubular culverts P made of concrete, and fills the recessed grooves of the synthetic resin lining pipe R, i.e., the groove parts 504 of the strip-like member 500. This back-filling material is constrained inside the spiral groove parts 504, so that all three of the above-mentioned parts, i.e., the lining pipe R, back-filling material and tubular culvert P are formed into an integral unit.

(6) When a lining pipe R has been formed through a specified length of the tubular culvert P (ordinarily the total length from the manhole Q1 to the manhole Q2), the lining apparatus S is removed.

(6a) Prior to the removal of the lining apparatus S, the back-filling material rotary coupling part 9B is removed from the rotary coupling device 9. Specifically, the injection tube 95 is cut off from the back-filling material rotary coupling part 9B, and the screw is loosened by turning the rotary coupling 84 in the reverse direction in the back-filling material rotary coupling part 9B, after which the rotary coupling 84 is removed from the injection coupling pipe 83. Next, the fastening nut 87 is loosened and removed, and the injection coupling pipe 83 is pulled out of the rotary coupling device 9. The back-filling material system is then cleaned as promptly as possible.

Furthermore, in regard to the operating pressure fluid system (hydraulic system) as well, the piping 77 is removed from the rotary coupling device 9.

(6b) Next, the entire lining apparatus S is removed. Since the lining apparatus S has a circumferential length adjustment mechanism 2 that can be disassembled, this removal work can easily be performed.

Furthermore, the lining apparatus S can be split as described above, so that conveyance to the outside via the manhole Q is also easy.

In this way, the lining work of the present embodiment is completed.

In the lining work of the present embodiment, as was described above, a lining pipe R that fills the entire cross section of the tubular culvert P can be formed as the formation of the lining pipe R proceeds, so that there is no cross-sectional loss. Furthermore, a double pipe is obtained as a result of the integration of the tubular culvert P and lining pipe R caused by the setting of the back-filling material with setting properties that is simultaneously injected, so that a lining pipe can be manufactured economically overall. Moreover, the waterproofing is improved by the setting of the back-filling material.

In addition, since the injection of the back-filling material is performed simultaneously with the formation of this lining pipe R, the working efficiency is greatly improved compared to that of conventional methods in which filling work is performed afterward.

Moreover, in the rotary coupling device 9 of the present embodiment, a structure in which the operating pressure fluid system (hydraulic system) and back-filling material system are coaxial is employed; accordingly, the size of the rotary coupling device is reduced, so that the space required for installation is reduced, and since the injection coupling pipe 83 of the back-filling material system passes through the axial center of the hydraulic rotary coupling part 9A, a flow path cross section with a maximum diameter can be maintained, so that a large amount of back-filling material can be supplied.

Furthermore, since the back-filling material rotary coupling part 9B can be removed from the rotary coupling device 9 by a simple operation, the setting back-filling material can be quickly cleaned away when the lining work is completed or during interruptions of the lining work. As a result, smooth lining work operations can be realized.

In the abovementioned lining work, application to a tubular culvert with a round cross section was indicated; however, application to tubular culverts with an oval cross section or horseshoe-shaped cross section can also be accomplished in the same manner.

Figure 27:
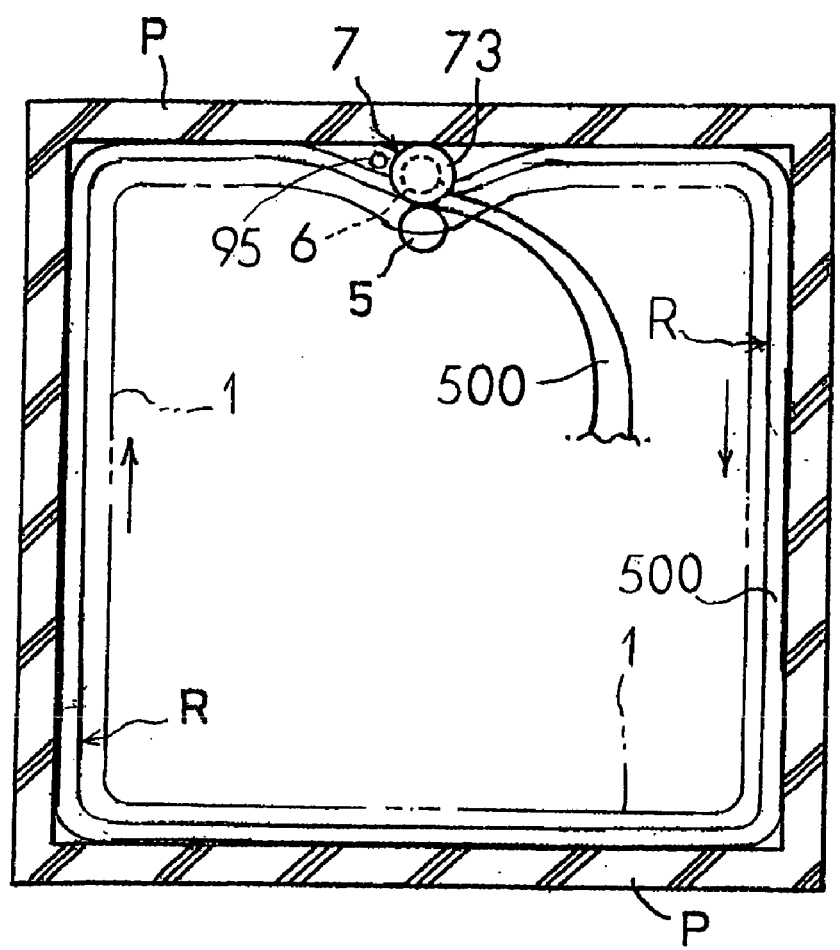
FIG. 27 is a diagram showing another outline of the lining application work (tubular culvert with a rectangular cross section).

This lining work can also be applied to tubular culverts with a rectangular cross section (see FIG. 27).

There is no substantial change in the lining apparatus S [in this case]. There is likewise no substantial change in the shape-maintaining tool J, either, except for the fact that the portion of the circular-arc plate 430 that contacts the forming frame 1 is altered to conform to the lower half of the rectangular tubular culvert.

In performing the lining work, the strip-like member 500 is wound around the forming frame 1, and the shape-maintaining tool is mounted so that an initial lining pipe Ri with a specified shape is obtained prior to the insertion of the apparatus into the tubular culvert. Afterward, this initial lining pipe Ri is pulled into the tubular culvert, and the work is performed as described above.

When the joining mechanism part 7 reaches a corner part, the links of the attachment part of the forming frame 1 conform to the variation in the shape of the corner part.

This embodiment includes the following aspects:

(1) The strip-like member is not limited to the examples shown in the figures. In short, any strip-like member which possesses elasticity, and in which both side edge parts engage in the form of joints, may be used.

(2) The joining mechanism part 7 is not limited to hydraulic driving; an air pressure motor may also be used.

(Merits of the Present Embodiment)

In the lining work performed using the lining apparatus of the present embodiment, a lining pipe that fills the cross section of the tubular culvert can be formed as the formation of the lining pipe proceeds, without any need for a special diameter-expanding operation, by using a forming frame that has ordinary flexibility, so that there is no cross-sectional loss. Furthermore, a double pipe that results from the integration of the tubular culvert and lining pipe caused by the setting of the back-filling material with setting properties that is simultaneously injected is obtained, so that a lining pipe can be manufactured economically overall. Moreover, waterproofing is also improved by the setting of the back-filling material.

In addition, since the injection of the back-filling material is performed simultaneously with the formation of this lining pipe, the working efficiency is greatly improved compared to that of conventional methods in which filling work is performed afterward.

Moreover, in the rotary coupling device of the present invention, the operating pressure fluid system (hydraulic system) and back-filling material system are coaxially disposed; accordingly, the size of the rotary coupling device is reduced, so that the space required for installation is reduced, and attachment is facilitated. Furthermore, since the injection coupling pipe of the back-filling material system passes through the axial center of the operating pressure fluid (hydraulic) rotary coupling part, a flow path cross section with a maximum diameter can be maintained, so that a large amount of back-filling material can be supplied.

Furthermore, since the back-filling material rotary coupling part can be removed from the rotary coupling device by a simple operation, the setting back-filling material can be quickly cleaned away when the lining work is completed or during interruptions of the lining work. This contributes to an improvement in the working efficiency.

Second Embodiment

FIGS. 28 through 44 illustrate another embodiment of the tubular culvert interior lining apparatus of the present invention. In this embodiment, a pipe manufacturing method configuration with a so-called internal-circumference regulating system is used.

Specifically, FIGS. 28 and 29 show the overall construction of this lining apparatus S1, and FIGS. 30 through 40 show the constructions of the respective parts of the apparatus. FIGS. 42 through 44 show another aspect.

Furthermore, in this embodiment, the strip-like member that is used is that same as that used in the first embodiment.

Lining Apparatus S1

The construction of the lining apparatus S1 of the present embodiment will be described with reference to FIGS. 28 through 40.

As is shown in FIGS. 28 and 29, this lining apparatus S1 comprises the following main parts: specifically, a forming frame 201 which has an annular shape, a plurality of guide rollers 202 which are disposed at a specified pitch on the external circumference of this forming frame 201, a joining mechanism part 205 which is attached via the forming frame 201, and which comprises an inner face roller 203 and an outer face roller 204, a driving feed roller 206 which is disposed so that this roller moves in linkage with the abovementioned Joining mechanism part 205, a plurality of driven feed rollers 207 which are attached to the front surface of the forming frame 201 on the circumference of the same circle, a back-filling material injection mechanism part 208 which is disposed adjacent to the joining mechanism part 205, and an external-circumference regulating frame body 209 which is disposed so that it surrounds the forming frame 201, and which moves in linkage with this forming frame.

The driving and driven feed rollers 206 and 207 form a series and constitute the feed mechanism part.

Furthermore, a portion of the back-filling material injection mechanism part 208 is built into the external-circumference regulating frame body 209.

The detailed structures of the respective parts will be described below.

Forming Frame 201 (see FIGS. 28 Through 30)

The forming frame 201 has an annular shape, and maintains a specified rigidity as a result of having a specified width and thickness. A portion of the annular shape is recessed to form an attachment part for the joining mechanism part 205. This forming frame 201 consists of an appropriate number of split bodies (segments); however, this forming frame may also be formed as an integral unit.

In each split body, a frame body is constructed from side plates 210 (a front side plate 210A and a rear side plate 210B) which form the front and rear surfaces, and flanges 211 on both end parts. These frame bodies have a specified rigidity, and rigidity-reinforcing members are appropriately added so that the rigidity is increased. Furthermore, the flanges 211 contact each other, and [the forming frame] is assembled by means of bolts and nuts (not shown in the figures), with the bolts being passed through bolt through-holes 212 formed in the flanges 211.

Bearing recesses 213 are recessed in the outside edges of the side plates 210 at an appropriate spacing, and these bearing recesses 213 accommodate the shaft parts of the guide rollers 202.

The central portion of the attachment part is recessed in a V shape, and the front side plate 210A in the direction of rotation of this part is disposed further to the rear than the front side plates 210A of the other split bodies, so that a narrow width is formed. The width of this retraction is set at a width that is sufficient to accommodate the strip-like member 500. The front side plate 210C of the V-shaped part is used for the attachment of the joining mechanism part 205. 215 indicates bolt through-holes in this part.

Guide Rollers 202 (See FIGS. 28 Through 30)

The guide rollers 202 are disposed on the external circumference of the forming frame 201 at a specified spacing and with specified angles.

The roller main bodies 217 of the guide rollers 202 consist of a hard resin material or a metal material, and are installed via bearings so that these roller main bodies 217 are free to rotate about roller shafts 218, with these guide roller main bodies 217 contacting the inside surface of the strip-like member 500.

Joining Mechanism Part 205 (See FIGS. 31 and 32)

The main body of the joining mechanism part 205 is a joining roller part 220 which is removably mounted on the forming frame 201, and in which an inner face roller 203 and an outer face roller 204 are combined as a set. Furthermore, this joining mechanism part 205 accommodates a gear mechanism 221 which effects the synchronized rotation of these rollers 203 and 204, and further comprises a housing body 223 which holds a driving feed roller 206 on this gear mechanism 221, and a hydraulic motor 224 which is attached to the housing body 223, and which is used as a rotational driving source for the rollers 203 and 204. This joining mechanism part 205 is disposed in a position corresponding to the joint part of the spirally wound strip-like member 500, i.e., to the position where the strip-like member 500 is initially joined.

The construction of the joining mechanism part 205 conforms to that of the joining mechanism part 7 in the preceding first embodiment; accordingly, a detailed description is omitted, and only an outline description will be given below.

(Housing Body 223)

The housing body 223 is divided into an upper part 223A and a lower part 223B; the upper part 223A is arranged so that this upper part 223A can be opened about a pin shaft 226, and this upper part 223A is closed against the lower part 223B by means of a closing device 230.

In the figures, 231 indicates a rib, 232 indicates a connecting rod which is pivot-mounted on the rib 231, 233 indicates a receiving shelf that accommodates the connecting rod 232, 234 indicates a coil spring, and 235 indicates a nut. These parts constitute the closing device 230.

(Gear Mechanism 221)

The gear mechanism 221 has three shaft parts 237, 238 and 239 which are mounted between the front and rear walls of the housing body 223 in that order so that these shaft parts are free to rotate, and gears 240, 241 and 242 are fastened to the respective shaft parts 237, 238 and 239. Furthermore, an inner face roller 203 is connected to the second shaft part 238, and an outer face roller 204 is connected to the third shaft part 239. The second shaft part 238 rotates in the reverse direction, and the third shaft part 239 rotates in the forward direction, with respect to the rotation of the first shaft part 237; accordingly, the inner face roller 203 and outer face roller 204 rotate in opposite directions from each other.

Furthermore, a spacer roller 244 used to maintain the spacing is attached to the third shaft part 239.

(Driving Feed Roller 206)

The driving feed roller 206 constitutes the main body of the feed mechanism part. This driving feed mechanism part comprises a driving sprocket 245 which is fastened to the second shaft part 238 outside the housing body 223, a driving feed roller 206 which has a sprocket that is mounted on the third shaft part 239 so that this sprocket is free to rotate, and a chain 247.

The driving sprocket 245 has gear teeth 245a on its external circumference, and is fastened to the second shaft part 238 via a key or spline engagement, so that this driving sprocket 245 rotates as a unit with the shaft part 238.

The driving feed roller 206 comprises a small-diameter sprocket part 249 and a large-diameter feed roller part 250, and is mounted on the third shaft part 239 via a bearing 251 so that this driving feed roller 206 is free to rotate. The sprocket part 249 has gear teeth 249a on its external circumference.

The chain 247 is mounted on the driving sprocket 245 and sprocket part 249 of the driving feed roller 206, and transmits the driving force of the driving sprocket 245 to the driving feed roller 206.

(Hydraulic Motor 224)

The hydraulic motor 224 is attached to the front surface of the housing body 223, with the driving shaft 224a of this hydraulic motor 224 connected to the first shaft part 237.

"In" side piping 253a which feeds oil into the hydraulic motor 224, and "out" side piping 253b which discharges this oil from the hydraulic motor 224, are connected to the hydraulic motor 224. Furthermore, these sets of piping 253 are connected to a rotary coupling 255 (see FIGS. 28, 12 and 13) via an attachment plate 254 which is attached to the housing body 223 or forming frame 1 in an appropriate position, and external piping 600 which communicates with an external pressure source is connected to this rotary coupling 255. The rotary coupling 255 has the same construction as the rotary coupling device 9C in the previous embodiment, and may be replaced by the rotary coupling device 9.

(Rotary Coupling 255) (See FIGS. 35 and 36)

This rotary coupling 255 consists of a combination of a cylindrical fixed body 255A and a rotating body 255B which is inserted into this fixed body 255A; this rotary coupling 255 is used in common with the rotary coupling part 272 of the back-filling material injection mechanism part 208. Here, the hydraulic system will be described.

In FIGS. 35 and 36, an "in" port a and an "out" port b are formed in the fixed body 255A; the "in" port a is connected to the "in" side piping 253a of the piping 253, and the "out" port b is connected to the "out" side piping 253b of the piping 253. The rotating body 255B is engaged inside the fixed body 255A so that the rotating body 255B is free to rotate while maintaining a liquid seal, and two connecting ports c and d are formed in the end surfaces of the rotating body 255B. Hydraulic passages e and f that communicate with these two connecting ports c and d ("in" connecting port c and "out" connecting port d) are formed inside the rotating body 255A, and these passages respectively communicate with oil grooves i and j that are recessed in the circumferential direction in the circumferential surface of the rotating body 255B via communicating holes g and h. The oil groove i communicates with the "in" port a, and the oil groove "j" communicates with the "out" port b. 257 indicates an O-ring, and 258 indicates a ring that is used to prevent any slipping out.

Furthermore, the "in" side piping 256a of the external piping 256 is connected to the "in" connecting port c of the rotary coupling 255, and the "out" side piping 256b of the external piping 256 is connected to the "out" connecting port d of the rotary coupling 255. Moreover, the external piping 256 is connected to a hydraulic driving source G.

As a result of the interposition of this rotary coupling 255, the operating fluid is exchanged between the piping 253 on the side of the hydraulic motor 224, which performs a rotating operation, and the external piping 256, which does not perform any rotating operation.

The driving force of the hydraulic motor 224 is transmitted to the first shaft part 237 by the abovementioned gear mechanism 221 and hydraulic motor 224, and this driving force is transmitted to the second and third shaft parts 238 and 239 via the gear mechanism 221. The second shaft part 238 and third shaft part 239 rotate in mutually opposite directions (Joining Roller Part 220) (See FIG. 32)

In the joining roller part 220, an inner face roller 203 and an outer face roller 204 are installed side by side in the axial direction of the pipe; furthermore, these rollers are disposed with a specified gap maintained between the rollers so that the strip-like member 500 is clamped between the two rollers 203 and 204.

Furthermore, as was described above, the inner face roller 203 is directly attached to the second shaft part 238, and the outer face roller 204 is directly attached to the third shaft part 239.

The construction of this joining roller part 220 is exactly the same as that of the joining roller part 50 in the first embodiment.

In FIG. 32, 260 indicates a cylindrical main body, and 261 indicates an annular hook part.

Driven Feed Rollers 207 (See FIGS. 33 and 34)

The driven feed rollers 207 form a part of the feed mechanism part, and constitute the driven feed mechanism part together with a counter-force member 263 which is fastened to the front surface of the forming frame 201, push-out devices 265, one end of each of which is fastened to the abovementioned counter-force member 263 and the other end of each of which is fastened to the retaining frame 264 of the [corresponding] driven feed roller 207, and a guide member 266 for these push-out devices 265.

A plurality (four in the present embodiment) of these driven feed rollers 207 are installed; each of these rollers is inclined in accordance with the spiral pitch at which the strip-like member 500 is wound.

The push-out devices 265 are so-called air pressure type cylinder devices. Each of these devices comprises a cylinder part 265a and a piston rod part 265b; the cylinder part 265a is enclosed and held by a guide member 266 fastened to the forming frame 201 so that this cylinder part is free to slide.

Braking devices 267 are also added to this driven feed mechanism part.

The operating devices, i.e., the push-out devices 265 and braking devices 267, are connected to an external air pressure driving source H via a rotary coupling (not shown in the figures) and an air pressure pipe 610.

As a result of the operation of the push-out devices 265, the driven feed rollers 207 are pressed against the wall surface of the tubular culvert, so that the center of the tubular culvert interior lining apparatus S1 is held inside the tubular culvert. Furthermore, when the braking devices 267 are actuated, the tubular culvert interior lining apparatus S1 is fixed in an immobile state inside the tubular culvert.

Moreover, the operating devices (push-out devices 265 and braking devices 267) may also use hydraulic driving or an electrical driving system.

Back-Filling Material Injection Mechanism Part 208 (See FIGS. 35 and 36)

The main body of the back-filling material injection mechanism part 208 consists of a single back-filling material injection tube 270; this comprises an injection part 271 at the tip end, and a rotary coupling part 272 at the base end. This back-filling material injection tube 270 is disposed adjacent to the joining mechanism part 205, and communicates with the rotary coupling 255 of this joining mechanism part 205.

This construction conforms to that of the back-filling material injection mechanism part 8 of the previous first embodiment; accordingly, a detailed description is omitted.

(Back-Filling Material Injection Tube 270)

In FIG. 35, 270a indicates the horizontal part of the injection tube 270, 270b indicates the vertical part, and 270c indicates the attachment part. 274 indicates a supporting fitting. 275 indicates a manual opening-and-closing valve which is disposed at an intermediate point in the attachment part 270c of the injection tube 270.

(Injection Part 271)

271a indicates a plurality of injection holes.

(Rotary Coupling Part 272)

The rotary coupling part 272 is used in common with the rotary coupling 255 of the hydraulic motor 224.

In FIG. 36, a port 1 is formed in the fixed body 255A, and a connecting port m, liquid passage n, communicating hole and recessed groove p are formed in the rotating body 255B. Furthermore, the injection tube 270 is connected to the port 1 of this rotary coupling part 272, and a back-filling material supply pipe 276 is connected to the connecting port m.

In the example shown in the figures, the aspect of the rotary coupling device 9C used in the first embodiment is employed as a type which is used in common by the hydraulic system and back-filling material system; however, the aspect of the rotary coupling device 9 (9A, 9B) is not excluded. Furthermore, the hydraulic system and back-filling material system may also be separate from each other. The disposition of a back-filling material supply device K or K1 that feeds the back-filling material into this back-filling material supply pipe 276 at the other end of this back-filling material supply pipe 276 is the same as in the previous first embodiment. The back-filling material is also the same; accordingly, a description is omitted.

External-Circumference Regulating Frame Body 209 (See FIGS. 42 Through 45)

The external-circumference regulating frame body 209 has a substantially annular shape, and is disposed coaxially with the forming frame 201 on the outside of the forming frame 201 with a specified gap being left between the two parts. Furthermore, this external-circumference regulating frame body 209 moves in linkage with the forming frame 201 via a specified connecting mechanism.

The main body of the external-circumference regulating frame body 209 is constructed from an annular frame body

280, and constraining rollers 282 which are attached (so that these rollers are free to rotate) to roller shafts 281 that are pivot-supported on the frame body 280 at specified intervals in the circumferential direction of the frame body 280.

(Frame Body 280)

The frame body 280 is constructed as an annular body of a fixed width that possesses rigidity from annular plates 283 (front part 283a and rear part 283b) that are disposed parallel to each other, and connecting plates 284 that rigidly connect the front and rear annular plates 283a and 283b to each other. The width of frame body 280, i.e., the spacing of the front and rear annular plates 283a and 283b, is set at a dimension that is smaller than the width of the forming frame 201. Roller shafts 281 are pivot-supported between the front and rear annular plates 283a and 283b, and constraining rollers 282 are mounted around these roller shafts 281 so that these constraining rollers 282 are free to rotate.

The frame body 280 is formed as multiple split bodies (two split bodies 280A and 280B in the present embodiment). The connecting plates 284 on the end portions of the respective split bodies 280A and 280B are caused to face each other, and can be freely attached or removed by means of bolts and nuts 285 that are interposed between these parts. Furthermore, an action that reduces the diameter of the frame body 280 is obtained by the tightening of these bolts and nuts 285.

A recessed part 280a that accommodates the outer face roller 204 of the joining mechanism part 207 is formed in one frame body 280A, so that the width is narrowed in this area; however, it goes without saying that the rigidity is sufficiently maintained.

Furthermore, in this frame body 280A, holes or cut-out recesses (cut-out recesses in the example shown in the figures) 280b in which the injection tube 270 of the back-filling material injection mechanism part 208 is mounted are formed in the front and rear annular plates 283a and 283b in an area located after the recessed part 280a in the direction of rotation. Specifically, the injection tube 270 is mounted in these holes 280b, so that the injection part 271 on the tip end protrudes from the rear annular plate 283b.

(Constraining Rollers 282)

A plurality of constraining rollers 282 (208 in the present embodiment) are disposed at specified intervals along the frame body 280; the individual constraining rollers 282 are mounted around shaft parts 281 which are pivot-supported by means of bearings between the front and rear annular plates 283a and 283b so that these constraining rollers 282 are free to rotate. The inside portions of the rollers 282 protrude from the inside edge of the frame body 280. Furthermore, annular hook parts are disposed at a specified spacing in the axial direction on the circumferential surface of one or a plurality of rollers.

To describe this in greater detail, in the constraining rollers 282, one annular hook part 282b or a plurality of annular hook parts 282b (at least two hook parts 282b) at a specified spacing are disposed on the circumferential surface of the cylindrical roller main body 282a. The spacing of these mutually separated annular hook parts 282b coincides with one or a plurality of spacings of the grooves 504 of the strip-like member 500, and the annular hook parts 282b are inserted into these grooves 504. Furthermore, the external circumference of cylindrical main body 282a is pressed against the outside surfaces of the protruding ribs of the strip-like member 500. In the example shown in the figures, the roller main bodies 282a and annular hook parts 282b consist of parts that are separate from each other, and rotate independently, so that the annular hook parts 282b do not affect the rotation of the roller main bodies 282a (in the same direction as the outer face roller 204) even in cases where the annular hook parts 282b contact the wall surface of the tubular culvert P. Of course, the roller main bodies 282a and annular hook parts 282b may also be formed as integral units.

Furthermore, in the example shown in the figures, there are eight rollers 282; however, there are no restrictions on the number of rollers 282 used. It is desirable that an even larger number of rollers 282 be disposed.

(Connecting Mechanism/Connecting Rod 287)

The external-circumference regulating frame body 209 is linked with the forming frame 201 via a connecting mechanism whose main body is a connecting rod 287.

Specifically, in the connecting rod 287, two rod bodies 287a and 287b that possesses rigidity are arranged so that these rod bodies 287a and 287b are freely bendable via a pin 287c. A screw part 287d is formed on the end portion of one rod body 287a, and this part is inserted into a cut groove 288 in the frame body 280 of the external-circumference regulating frame body 209 and fastened in place by being clamped against the frame body 280 by two nuts 289. Furthermore, the base portion of one rod body 287b is fastened in a removable manner to an attachment rib 290 that is attached to the front surface of the forming frame 201. This connecting mechanism is disposed in a plurality of locations (four locations in the present embodiment) that are appropriate spaced along the circumferential direction of the forming frame 201 and external-circumference regulating frame body 209; however, the attachment locations are not limited to the locations shown.

This connecting mechanism is shown as one example. It is sufficient if this mechanism is a structure that connects the forming frame 201 and external-circumference regulating frame body 209; the ability to effect attachment and removal is an essential condition.

By constraining the external circumference of the strip-like member 500 that is wound around the forming frame 1, such an external-circumference regulating frame body 209 prevents an increase in the diameter of the strip-like member 500.

Lining Work in Interior of Tubular Culvert P

The method used to line the interior of an underground tubular culvert by means of the lining apparatus S1 of the present embodiment will be described.

FIG. 41 shows an outline of the lining work. In addition [to the parts shown] in FIG. 23, H is an air pressure driving source. [Hydraulic pressure] is conducted to the hydraulic motor 224 of the joining mechanism part 5 from the hydraulic driving source G via the hydraulic piping 600 and rotary coupling 255. [Air pressure] is conducted to the push-out devices 265 of the driven feed roller 207 from the air pressure driving source H via air piping 610.

One aspect (first example) of the lining method will be described below in the order of the processes that are performed.

(1) The lining apparatus S1 is conveyed into the manhole Q1. This apparatus S1 is connected to the hydraulic driving source G and air pressure driving source H.

In this case, the push-out devices 265 are actuated so that the driven feed rollers 7 are retracted in the driving feed mechanism part B.

(2) Inside the manhole Q1 of the tubular culvert P, the joining mechanism part 205 of the apparatus S1 is driven, so that a strip-like member 500 that is pulled in from the aboveground area is wound several times (approximately three times) around the forming frame 1, thus manufacturing a lining pipe (referred to as the "starting lining pipe") Ro.

(3) In this state, the external-circumference regulating frame body 209 is mounted.

Specifically, in order to fit the split external-circumference regulating frame body 209 over the starting lining pipe Ro, the annular hook parts 282b of the constraining rollers 282 are caused to engage with the grooves 504 of the strip-like member 500. Furthermore, the bolts and nuts 285 are mounted in the connecting plates 284 on the end portions, and the nuts are tightened down so that the main bodies 282a of the constraining rollers 284 are pressed against the surface of the starting lining pipe Ro. As a result, the starting lining pipe Ro is constrained by the constraining rollers 282, so that expansion of this starting lining pipe Ro is prevented.

(4) The starting lining pipe Ro is pulled into the interior of the tubular culvert P.

At the same time, the driving feed roller 206 of the driving feed mechanism part and the driven feed rollers 207 of the driven feed mechanism part are adjusted so that these rollers contact the wall surface of the tubular culvert P. As a result, the lining apparatus S1 is held in the center of the tubular culvert P.

(5) The joining mechanism part 205 and the driving feed mechanism part are driven, so that a lining pipe is manufactured.

As a result of the driving of the driving feed mechanism part, the feed roller 206 of the driving feed mechanism part contacts the wall surface of the tubular culvert P, and as a result of the rotation of this feed roller 206, the feed roller 206 receives a reaction [force] from the wall surface, and applies a rotational force to the lining apparatus S1, so that the lining apparatus S1 is caused to rotate. The feed rollers 207 of the driven feed mechanism part cause smooth rotation of the lining apparatus S1.

As a result, the strip-like member 500 is spirally wound, so that a lining pipe R is manufactured by a revolving pipe manufacturing process.

Furthermore, the diameter of this lining pipe R is equal to the diameter φ of the starting lining pipe Ro.

In this process, the external-circumference regulating frame body 209 moves in linkage with the forming frame 201, and thus moves along the external circumference of the lining pipe R with the rotation of the forming frame 201. The external-circumference regulating frame body 209 constrains the external circumference of the lining pipe R, and thus prevents an expansion of the diameter.

(5a) At the same time, furthermore, the back-filling material supply device K is driven in this process, so that a specified amount of the back-filling material is injected from the injection part 271 of the injection tube 270 of the back-filling material injection mechanism part 208. The injection part 271 is positioned after the external-circumference regulating frame body 209, so that the injected back-filling material F does not contact this frame body 209.

(5b) In this process, furthermore, the strip-like member 500 is successively supplied from the pay-out apparatus T that is disposed in the above-ground area.

(6) By means of the abovementioned processes, a lining pipe R with a fixed length (ordinarily about 1 m) is manufactured (revolving pipe manufacture).

Afterward, the braking devices 265 of the guide mechanism part are actuated so that a braking action is applied to the driven rollers 207, thus fixing the lining apparatus S1 in place. Meanwhile, the pipe end portion of the starting lining pipe Ro is fastened in place and gripped.

In this state, the joining mechanism part 205 is further driven.

As a result of the driving of the joining roller part 220 of the joining mechanism part 205, the strip-like member 500 is fed into the already-formed lining pipe R in an amount exceeding the amount of revolving pipe manufacture, so that the engaging force in the joint parts is overcome, and the diameter of the lining pipe R is expanded by a corresponding amount to φ. At this time, furthermore, the driving roller 206 is placed in an idling state.

In this operation, since an external-circumference regulating frame body 209 is mounted around the forming frame 201, expansion of the diameter of the lining pipe R is prevented in this area.

FIG. 28 shows this state. Specifically, in the vicinity of the joining mechanism part 205, the expansion of the strip-like member 500 is restricted by the inner face and outer face rollers 203 and 204; in other areas, however, the strip-like member 500 immediately expands as a result of slipping in the joint parts, so that the diameter expands until this diameter is constrained by the wall surface of the tubular culvert P.

(7) In the area of expanded diameter of the lining pipe R, the back-filling material expands as a result of the foaming action of this material, after which setting of the back-filling material begins.

As a result of the setting of the back-filling material, a specified strength is manifested, and the lining pipe R and tubular culvert P are integrated via the back-filling material.

(8) The processes of the abovementioned (5), (6) and (7) are repeated, so that the interior of the tubular culvert P is lined.

Specifically, the joining mechanism part 205 and driving feed mechanism part 206 are driven, so that the small-diameter (φ) lining pipe R of a fixed length is manufactured, and the back-filling material is injected; then, a braking action is applied to the driving and driven feed mechanism parts, and the joining mechanism part 205 is driven so that a diameter expansion operation is performed, after which bonding is performed by the foaming of the back-filling material.

In this operation, since an external-circumference regulating frame body 209 is mounted around the forming frame 201, expansion of the diameter of the lining pipe R is prevented in this area.

(9) As a result of the above operations, a lining pipe R of diameter φ is applied to the entire length of the tubular culvert P, and the tubular culvert P and lining pipe R are formed into an integral unit by the back-filling material. Furthermore, in regard to attached pipes, holes are formed in the lining pipe R in an after-process, so that communication with these attached pipes is established.

Another aspect (second example) of the lining method will be described.

In this aspect, the method is characterized in that diameter expansion is performed as the revolving pipe manufacture of the lining pipe R proceeds.

The processes of (1) through (4) conform to the aspect described above.

In the process of (5), the rotation of the joining mechanism part 5 is set so that this rotation is greater than the rotation of the driving feed roller 206 of the driving feed mechanism part. In order to obtain this state, means such as (i) half-operating the braking devices 267 of the driven feed mechanism part B so that a braking action is weakly applied, thus slowing the rotation of the lining apparatus S1 itself, or (ii) lowering the rotation of the driving feed roller 206 by adjusting the transmission ratio in the joining mechanism part 5.

In this working aspect, expansion of the diameter is performed as the revolving pipe manufacture of the lining pipe R proceeds, and this lead to the abovementioned process (7).

Furthermore, in this working aspect, there is no process (6) such as that performed in the first example, so that a lining pipe R in which the diameter is continuously expanded is obtained.

(Merits of the Present Embodiment)

In the present embodiment, a lining pipe R that fills the entire diameter of the tubular culvert P is formed by the diameter-expanding operation of the apparatus S1, so that there is no cross-sectional loss; accordingly, a lining pipe can be manufactured economically overall.

Furthermore, the back-filling material fills the groove parts 504 of the strip-like member 500 that constitutes the lining pipe R, and this back-filling material adheres to the inside wall surface of the tubular culvert P, so that a specified strength is manifested when this back-filling material sets; moreover, the lining pipe R and tubular culvert P are formed into an integral unit via this back-filling material, thus forming a double pipe so that a sufficient strength is manifested.

In this process, the diameter-expanding operation begins from the area to the rear of the external-circumference regulating frame body 209 as a result of the action of this external-circumference regulating frame body 209, so that a uniform diameter-expanding operation is achieved.

(Other Working Aspect) (See FIGS. 42 Through 44)

Another working aspect belonging to the present embodiment is shown in FIGS. 42 through 44.

In the case of the lining apparatus S2 of this working aspect, a flexible forming frame 201A is used; furthermore, a different aspect of the feed mechanism part 207A is attached in linkage with this forming frame 201A, and an external-circumference regulating frame body 209A which similarly possesses flexibility is added.

Forming Frame 201A

The forming frame 201A possesses flexibility; the construction of this forming frame 201A conforms to that of the forming frame 1 in the first embodiment, and this forming frame 201A has the function of preventing inward folding. This forming frame 201A is equipped with a circumferential length adjustment mechanism, and is also equipped with guide rollers and a joining mechanism part.

Feed Mechanism Part 207A

In the feed mechanism part 207A, a rod body 300 which maintains rigidity and which has an adjustable length is linked to the forming frame 201A, and attached via connecting plates 301, in the diameter direction that crosses the forming frame 201A in the front part of the forming frame 201A. The rod body 300 comprises cylinder tubes 302 which have hollow parts on both sides, a piston tube 303 which is inserted into the hollow parts of the cylinder tubes 302, and spring bodies 304 which are interposed between the cylinder tubes 302 and the piston tube 303. A large spring constant is selected for the spring bodies 304, so that a driving action by a large force in the outward radial direction is obtained.

Furthermore, feed rollers 306 which contact the wall surface of the tubular culvert P are mounted on the connecting plates 301 so that these feed rollers 306 are free to rotate. The feed rollers 306 are rotationally driven by hydraulic motors 307 via gear mechanisms (transmission mechanisms).

As result of the rotational movement of the feed rollers 306, the lining apparatus S2 is caused to perform a rotational operation, and a braking action is applied by stopping these rollers 306.

Furthermore, this feed mechanism part 207A is preferably disposed so that this feed mechanism part 207A avoids the joining mechanism part of the forming frame.

Another aspect of the rod body 300 is shown in FIG. 43.

The rod body 300A of this aspect comprises a small-diameter cylinder tube 310 and a large-diameter cylinder tube 311 on both sides, a piston tube 312 which is inserted into these cylinder tubes 310 and 311 so that this piston tube 312 is free to slide, a handle member 313 which is screw-engaged with a screw part 312a on the piston tube 312, and a rubber body 314 which drives the piston tube 312 accommodated inside the cylinder tube 311 in the axial direction of the tube. The handle member 313 has an annular shape, and a screw is cut into the inside circumferential surface of this handle member 313; this screw part 313a is screw-engaged with the screw part 312a of the piston tube 312. The piston tube 312 is caused to advance and retract by the turning of the handle member 313, so that the length of the rod body 300A is adjusted.

Still another aspect of the feed mechanism part 207A is shown in FIG. 44.

Specifically, the rod body 320 comprises female screw rods 321 that have hollow parts on both sides, and a central male screw rod 322. The female screw rods 321 are fastened to connecting plates 301, and the male screw rod 322 has mutually opposite screw threads cut on both sides; furthermore, the screw parts of this male screw rod 322 are screw-engaged with the screw parts of the female screw rods 321. The female screw rods 321 on both sides are separated from each other or caused to approach each other by turning the male screw rod 322, so that the length is adjusted.

External-Circumference Regulating Frame Body 209A

The external-circumference regulating frame body 209A is endowed with flexibility by means of link bodies.

In the present embodiment, the forming frame 201A on which the strip-like member 500 is wound maintains a circular shape by receiving the elastic force of the strip-like member 500.

In the present embodiment, the diameter of the lining pipe R is expanded; furthermore, the external-circumference regulating frame body 9A exhibits a specified action in this diameter expansion operation.

The following design alteration is allowed in the present embodiment.

(1) In regard to the external-circumference regulating frame body 9, the frame body 280 is not limited to a split into two parts; a split into three or more parts is also possible.

(Merits of the Present Embodiment)

In the present embodiment, a lining pipe R that fills the diameter of the tubular culvert P is formed by means of a diameter expansion operation; accordingly, there is no cross-sectional loss, so that a lining pipe can be manufactured economically overall.

In this diameter expansion operation, a smooth diameter expanding action is obtained by means of the external-circumference regulating frame body 209, so that the work of adjusting the feed-in speed and load of the strip-like member 500 can be lightened.

Furthermore, the back-filling material fills the groove parts 504 of the strip-like member 500 that constitutes the lining pipe R, and adheres to the inside wall surface of the tubular culvert P, so that a specified strength is exhibited when the back-filling material sets. The lining pipe R and tubular culvert P are formed into an integral unit via this back-filling material, so that sufficient strength is exhibited in the form of a double pipe.

Furthermore, in this process of obtaining a double pipe, the expansion of the diameter of the lining pipe R that is wound around the forming frame 201 can be prevented, so that smooth back-filling material injection work is possible.

Third Embodiment

FIGS. 45 through 48 illustrate still another embodiment of the present invention; in this embodiment, a pipe manufacturing configuration using a so-called external-circumference regulating system is adopted.

Specifically, FIGS. 45 and 46 show an overall outline of this lining apparatus S3, and FIGS. 47 through 48 show the constructions of the respective parts.

Furthermore, in this aspect, the strip-like member that is used is the same as that used in the respective embodiments described above.

Lining Apparatus S3

The construction of the lining apparatus S3 will be described with reference to FIGS. 45 through 48.

As is shown in FIGS. 45 and 46, this lining apparatus S3 comprises the following main parts: specifically, a forming frame 401 which has an annular shape, a plurality of guide rollers 402 which are disposed at a specified pitch facing the inner circumference of the forming frame 401, a joining mechanism part 405 which is attached via the forming frame 401, and which comprises an inner face roller 403 and an outer face roller 404, a driving feed mechanism part 406 comprising a plurality of driving wheels 406a and driven wheels 406b that are attached to the front surface of the forming frame 401, a plurality of driven feed mechanism parts 407 that are attached to the rear surface of the forming frame 401 on the circumference of the same circle, and a back-filling material injection mechanism part 408 that is disposed adjacent to the joining mechanism part 405.

In the figures, A indicates the direction of advance of the apparatus S2, and B indicates the direction of rotation of the apparatus S2.

The detailed structures of the respective parts will be described below.

Forming Frame 401 (See FIGS. 47 and 48)

Like the abovementioned forming frame 301, the forming frame 401 has an annular shape, and maintains rigidity by means of a specified width and thickness. The front end part of this annular shape constitutes an attachment part for the joining mechanism part 405. The forming frame 401 obtains a large rigidity by means of side plates 410 that form the front and rear surfaces (front side plates 410A and rear side plates 410B), and rigidity-reinforcing members 411 that connect the side plates 410 to each other. The forming frame 401 can be freely constructed from an appropriate number of split bodies (segments).

Guide Rollers 402

The guide rollers 402 straddle the front and rear side plates 410A and 410B of the forming frame 401, and are attached by means of shaft parts 414 so that these guide rollers 402 are free to rotate. Furthermore, these guide rollers 402 are disposed at a specified spacing and specified angles. The widths of the roller main bodies of the guide rollers 402 fill the internal width of the forming frame 401 to the maximum extent possible.

The construction of the guide rollers 402 conforms to the constructions used in the abovementioned first and second embodiments; in this embodiment, however, the guide rollers 402 contact the outside surface of the strip-like member 500, and regulate the external diameter of the lining pipe R that is formed.

Joining Mechanism Part 405

The joining mechanism part 405 is attached via the forming frame 401, and comprises mainly an inner face roller 403 and an outer face roller 404; this joining mechanism part 405 is equipped with a hydraulic motor 420 that drives the inner face roller 403, and a gear box 421 which accommodates a gear mechanism that transmits the rotation of the hydraulic motor 420 to the outer face roller 404.

As in the previous embodiments, the hydraulic motor 420 is connected to external hydraulic piping 600 via a rotary coupling 422.

The construction of the joining mechanism part 405 conforms to the constructions of the joining mechanism parts 7 and 207 in the abovementioned first and second embodiments; accordingly, a detailed description of this construction is omitted.

(Inner Face Roller 403 and Outer Face Roller 404)

The inner face roller 403 and outer face roller 404 are lined up side by side in the axial direction of the pipe, and form a set; furthermore, the two rollers 403 and 404 are disposed with a specified gap left between the rollers, so that the strip-like member 500 is clamped by these rollers. In the present embodiment, two such sets of rollers are disposed in positions that are separated from each other in the circumferential direction.

The inner face roller 403 and outer face roller 404 [of each set] may adopt two configurations, i.e., a configuration in which the rollers are attached so that the rollers straddle the front side plates 410A and rear side plates 410B of the forming frame 401, or a configuration in which the rollers are attached to the front side plates 410A in the form of cantilevers.

The outer face rollers 404 are disposed on the circumferential of the same circle as the guide rollers 402, and are attached so that these outer face rollers 404 are disposed between the guide roller 402.

Driving Feed Mechanism Part 406

The driving feed mechanism part 406 comprises driving wheels 406a and driven wheels 406b; [these wheels 406a and 406b] are alternately attached to the front surface of the forming frame 401 at specified intervals.

The driving wheels 406a and driven wheels 406b are respectively supported via arms 430 that are attached to the front side plates 410A of the forming frame 401 so that these arms 430 are free to slide. Furthermore, the respective arms 430 are driven by coil springs 431 so that the respective driving wheels 406a and driven wheels 406b are pressed against the wall surface Pa of the tubular culvert P.

The driving wheels 406a are equipped with hydraulic motors 432, and are driven from the outside via hydraulic piping. Accordingly, a rotary coupling is installed for the feed mechanism part 406; however, this rotary coupling may be used in common with the rotary coupling of the joining mechanism part 405, or may be a separate part.

Driven Feed Mechanism Parts 407

In the driven feed mechanism parts 407, a plurality of roller bodies 435 are supported on the rear side plates 410B of the forming frame 401 at specified intervals in the control circuit direction so that these roller bodies 435 are free to rotate. These roller bodies 435 are caused to contact the wall surface Pa of the tubular culvert P.

As a design consideration, the roller bodies 435 may have a position adjustment mechanism or driving mechanism [that adjusts the positions of the roller bodies 435] in the diameter direction.

Back-Filling Material Injection Mechanism Part 408

The main part of the back-filling material injection mechanism part 408 is a single injection tube 440. An injection part 441 is disposed on the tip end of this injection tube 440, and [this injection tube 440] is connected to a back-filling material supply device 450 via a mixing gun 442 and rotary coupling 443 disposed on the base end of the injection tube 440. The injection tube 440 is fastened in place and held by being passed through retaining holes 445 formed in the side plates 410 of the forming frame 401. In the present embodiment, the back-filling material injection mechanism part 408 is disposed adjacent to the joining mechanism part 405. However, the present embodiment is not limited to such a position; the attachment position may be freely selected.

(Back-Filling Material Supply Device 450)

The back-filling material supply device 450 is a two-liquid type device. The "liquid A" system is connected to the rotary coupling 443 via a "liquid A" tank 451, a pump 452 and a supply pipe 453, and the "liquid B" system is connected to the rotary coupling 443 via a "liquid B" tank, a pump 455 and a supply pipe 456.

This device 450 is mounted on a movable car 458 by means of wheels 457, and advances with the advance of the pipe manufacturing apparatus S2.

The back-filling material injection mechanism part 408 and back-filling material supply device 450 respectively conform to the constructions of the back-filling material injection mechanism parts 8 and 208 and back-filling material supply devices K and K1 in the abovementioned first and second embodiments, and are interchangeable with these parts.

In regard to the back-filling material used in the present embodiment, liquid A consists of 3 to 15 parts by weight of bentonite, 0.1 to 1.0 parts by weight of a foaming agent, 0.5 to 2.5 parts by weight of a retarding agent, and 80 to 300 parts by weight of water, per 100 parts by weight of cement, and a cement composition is used in which 1 to 30 parts by weight of liquid B consisting of an aqueous solution of sodium silicate is added to 100 parts by weight of this liquid A. Furthermore, it is desirable that the abovementioned composition contain 10 to 50% air bubbles by volume, that the cement, foaming agent, retarding agent and sodium silicate be mixed following the mixing of the bentonite and water, that the molar ratio of the aqueous solution of sodium silicate ($SiO_2/Na_2O$) be set at 3 to 4, that the viscosity of the composition be adjusted to a value of 1,000 to 10,000 cps, and that the time for which this viscosity is maintained be set at 1 hour or less from the time of mixing.

Lining Work

The lining method that is performed using this lining apparatus S3 conforms to the abovementioned second embodiment, and is accompanied by a diameter expanding action.

An outline of the lining work will be described with reference to FIG. 41. The hydraulic piping 600 is connected to the hydraulic motor 420 of the joining mechanism part 405 and the hydraulic motors 432 of the driving wheels 406a of the driving feed mechanism part 406. In cases where the driving wheels 406a of the driving feed mechanism part 406 are driven by air pressure, these wheels 406a are connected to the air piping 610.

In this lining work, a continuous diameter expansion operation is performed as the lining apparatus S3 advances, and injection of the back-filling material is performed at the same time.

To describe this in greater detail, as a result of the driving of the joining mechanism part 405 of the apparatus S3, the strip-like member 500 is subjected to the clamping action of the inner face roller 403 and outer face roller 404, so that this strip-like member 500 is joined; furthermore, the strip-like member 500 is subjected to the external-circumference regulation of the guide rollers 402 attached along the internal circumference of the forming frame 401, so that the strip-like member 500 is folded inward in a spiral configuration. At the same time, as a result of the driving of the driving feed mechanism part 406, the driving wheels 406a that contact the wall surface of the tubular culvert receive a reaction [force] from this wall surface as a result of the rotation of the driving wheels 406a, so that the driving wheels 406a apply a feeding force to the apparatus S3, thus causing the apparatus S3 to rotate. The driven wheels 406b and driven feed mechanism parts 407 cause smooth rotation of the apparatus S3.

As a result, the strip-like member 500 is spirally wound by the apparatus S3, so that a lining pipe R is successively formed with regulation of the external circumference.

The lining pipe R whose diameter was previously expanded is fastened in place in the tubular culvert P, and the lining pipe R that is formed by the apparatus S3 is initially constrained by the forming frame 401 and then by the guide roller 402, so that this lining pipe R has a small diameter. As the apparatus S3 advances, the lining pipe R is released from the constraint of the forming frame 1 and guide rollers 402, so that the diameter of the lining pipe R gradually expands.

Specifically, the strip-like member 500 is fed in by a specified feeding force and at a specified feeding rate as a result of the rotation of the inner and outer face rollers 403 and 404 of the joining mechanism part 405. However, the rotational speed of the apparatus S3 is maintained at a constant speed by the driving wheels 406a that contact the wall surface of the tubular culvert P, and this speed is slower than the feed-in speed of the strip-like member 500. As a result, a shear force is generated between [the spans of] the strip-like member 500 of the lining pipe R, so that shifting (slipping) occurs in the joint parts, thus causing a diameter-expanding action.

In the case of this diameter expansion, a stabilized state of diameter expansion is obtained at a constant rotational advancing speed of the apparatus S3 by controlling the feed-in speed of the strip-like member 500 determined by the joining mechanism part 405. The angle of diameter expansion is detected using an appropriate detector in order to ascertain the conditions of diameter expansion, and the feed-in speed is controlled on the basis of this detected value.

Since the rotation of the apparatus S3 is accomplished by means of a plurality of driving wheels 406a using hydraulic driving, a stabilized rotational force is obtained; furthermore, since these [driving wheels 406a] are driven against the tubular wall of the tubular culvert P together with the driven wheels 406b, the lining pipe also conforms to irregularities or non-circular shapes of the tubular wall, so that a stabilized pipe manufacturing action is obtained.

Meanwhile, during this period, the back-filling material is injected from the back-filling material injection tube 440. Specifically, liquid A and liquid B supplied from the back-filling material supply device 450 are discharged onto the surface of the lining pipe R at an intermediate point in the diameter expansion process from the injection part 441 after passing through the rotary coupling 443 and mixing gun 442. This back-filling material enters the recessed grooves 504 of the strip-like member 500 that constitutes the lining pipe R, and swells with the passage of time, after which this back-filling material hardens.

As was described above, stabilized conditions of diameter expansion are obtained in the lining pipe R; accordingly, the discharge position of the back-filling material is also determined as a fixed position, so that positional adjustment is easy. There is no damage to the injection tube 440.

Furthermore, in the present embodiment, the aspects of the previous embodiments with regard to the back-filling material may also be freely adopted.

(Merits of the Present Embodiment)

(1) Stabilized conditions of diameter expansion can be obtained by controlling the feed-in speed of the strip-like member 500 at a constant rotational advancing speed of the lining apparatus S3.

(2) In regard to the injection operation of the back-filling material, since the lining pipe R adopts a stable state of diameter expansion, the discharge of the back-filling material is appropriately determined, so that favorable injection work can be accomplished.

(3) Since external-circumference regulation is adopted in the lining apparatus S3, there is no need for a special regulating frame body as in the abovementioned second embodiment.

Fourth Embodiment

FIG. 49 shows the overall construction of still another embodiment (fourth embodiment) of the present invention. In this embodiment, FIGS. 2 through 16, 23 through 27, and 50 and 51 are also used for purposes of description.

In this fourth embodiment, the back-filling material injection action and structure are omitted from the lining method and apparatus of the abovementioned first embodiment.

Specifically, the lining apparatus S4 of this fourth embodiment does not have the back-filling material injection mechanism (8) or back-filling material supply device (K, K1) that were included in the lining apparatus S of the first embodiment.

In this fourth embodiment, members that are equivalent to members in the first embodiment are labeled with the same symbols, and since the functions of these members are exactly the same as in the first embodiment, a description is omitted.

Lining Apparatus S4 (See FIG. 49 and FIGS. 2 Through 16)

This lining apparatus S4 comprises a forming frame 1 (including a circumferential length adjustment mechanism 2 and a spacing-maintaining mechanism 3), guide rollers 4, and a joining mechanism part 7 that comprises an inner face roller 5 and outer face roller 6. Specifically, this apparatus S4 is an apparatus in which the back-filling material injection mechanism 8 and back-filling material supply device K or K1 are omitted from the construction of the lining apparatus S of the first embodiment. Furthermore, in regard to the rotary coupling, the hydraulic system of the rotary coupling device 9C is used, or a universally known mechanism is used.

Lining Work (See FIGS. 23 Through 27)

The lining method performed using this lining apparatus S4 conforms to the abovementioned first embodiment; however, there is no injection of a back-filling material.

An outline of this lining work will be described with reference to FIG. 23. No back-filling material supply device K is provided at the work site (FIG. 23).

When the present lining apparatus S4 is conveyed into the tubular culvert P, the hydraulic piping 600 is connected to the driving system of this apparatus S4.

The lining work conforms to the procedure of the first embodiment, and is performed using the following procedure.

(1) through (3): These processes conform to the processes of (1) through (3) described above.

(4): This process conforms to the process of (4) described above.

(4a): This process conforms to the process of (4a) described above.

(4b): This process conforms to the process of (4c) described above.

(5): This process conforms to the processes of (6) and (6b) described above.

To summarize, before the work is begun, the strip-like member 500 is wound around the forming frame 1, after which the attachment part of the joining mechanism part 7 is folded inward by means of the links of this joining mechanism part 7, so that the overall apparatus is caused to correspond to the cross section of the tubular culvert P. Then, the apparatus is placed inside the tubular culvert P.

The lining apparatus S4 is driven, so that the joint parts that are in contact with each other are caused to engage with each other by the clamping action of the outer face roller 6 and inner face roller 5 of the joining mechanism part 7 in the joining area of the strip-like member 500. As a result of the outer face roller 6 engaging with the recessed groove 504 formed in the outside surface of the strip-like member 500, the joining mechanism part 7 advances in the axial direction of the pipe at a specified pitch together with the newly supplied strip-like member 500, so that the joining mechanism part always positioned in the joining area. As a result, this lining apparatus S4 revolves as a whole, and the strip-like member 500 is continuously joined so that a pipe is manufactured.

In this case, the link bodies of the forming frame 1 that is attached to the joining mechanism part 7 receive a pressing force that is oriented toward the center via the contact roller 73 that contacts the tubular wall, so that the link bodies are folded inward. In the lining pipe R that is wound around the forming frame 1, only the link parts of the attachment part of the joining mechanism part 7 are separated from the tubular wall, and the excess portion spreads outward and maintains a state of tight adhesion to the tubular wall as a result of the elasticity of the strip-like member 500.

As the formation of the lining pipe R proceeds, the lining pipe R located to the rear of the joining mechanism part 7 gradually recovers from a concave cross section to a convex cross section, so that this lining pipe R adheres tightly to the tubular wall around the entire circumference of this lining pipe R.

Thus, in this lining work, a lining pipe R that fills the entire cross section of the tubular culvert P can be formed as the formation of the lining pipe R proceeds; accordingly, there is no cross-sectional loss, so that economical work can be achieved.

In the present embodiment, the following design alterations are made in addition to the indications given in the first embodiment.

(1) In the joining mechanism part 7, an electric motor may be used besides hydraulic driving or an air pressure motor. In cases where an air pressure motor is employed, there is no change in the use of the abovementioned rotary coupling; however, in cases where an electric motor is employed, a rotating brush is used instead of a rotary coupling.

Alternatively, a manually operated mechanism is not excluded, and the rollers 5 and 6 can be driven by a handle operation via the gear mechanism 31.

(Merits of the Present Embodiment)

In the present embodiment, as a result of the use of a forming frame 1 that possesses ordinary flexibility, a lining pipe R that fills the cross section of the tubular culvert P can be formed by means of an easy operation without any need for a special diameter expansion operation. Accordingly, there is no cross-sectional loss, and economical work can be achieved.

Fifth Embodiment

This embodiment is characterized in that the injection of a back-filling material is omitted in the lining work of the third embodiment.

This fifth embodiment will be described with reference to FIGS. 45 through 48.

Specifically, the lining apparatus S5 of this fifth embodiment does not have the back-filling material injection mechanism (408) or back-filling material supply device (450, K, K1) that were provided in the lining apparatus S3 of the third embodiment.

In this fifth embodiment, members that are the same as in the third embodiment are labeled with the same symbols, and a description of these members is omitted.

Lining Apparatus S5

Specifically, this lining apparatus S5 comprises a forming frame 401, guide rollers 402 joining mechanism part 405 which comprises an inner face roller 403 and outer face roller 404, a driving feed mechanism part 407 which comprises driving wheels 406a and driven wheels 406b, and driven feed mechanism parts 407.

Lining Work

The lining method that is performed using this lining apparatus S5 conforms to the abovementioned third embodiment, and is accompanied by a diameter expanding action.

An outline of the lining work will be described with reference to FIG. 41. The hydraulic piping 600 is connected to the hydraulic motor 420 of the joining mechanism part 405 and the hydraulic motors 432 of the driving wheels 406a of the driving feed mechanism part 406. In cases where the driving wheels 406a of the driving feed mechanism part 406 are driven by air pressure, these wheels 406a are connected to the air piping 610.

In this lining work, a continuous diameter expansion operation is performed as the lining apparatus S5 advances.

To describe this in greater detail, as a result of the driving of the joining mechanism part 405 of this apparatus S5, the strip-like member 500 is subjected to the clamping action of the inner face roller 403 and outer face roller 404 so that this strip-like member 500 is joined; furthermore, the strip-like member 500 is subjected to the external-circumference regulation of the guide rollers 402 attached along the internal circumference of the forming frame 401, so that the strip-like member 500 is folded inward in a spiral configuration. At the same time, as a result of the driving of the driving feed mechanism part 406, the driving wheels 406a that contact the tubular wall of the tubular culvert P receive a reaction [force] from this tubular wall as a result of the rotation of these driving wheels 406a, so that the driving wheels 406a apply a feeding force to the apparatus S5, thus causing the apparatus S5 to rotate. The driven wheels 406b and driven feed mechanism parts 407 cause smooth rotation of the apparatus S5.

As a result, the strip-like member 500 is spirally wound by the apparatus S5, so that a lining pipe R is successively formed with regulation of the external circumference.

The lining pipe R whose diameter was previously expanded is fixed in place in the tubular culvert P, and the lining pipe R that is formed by the apparatus S5 is initially constrained by the forming frame 401 and then by the guide roller 402, so that this lining pipe R has a small diameter. As the apparatus S5 advances, the lining pipe R is released from the constraint of the forming frame 1 and guide rollers 402, so that the diameter of the lining pipe R gradually expands.

Specifically, the strip-like member 500 is fed in by a specified feeding force and at a specified feeding rate as a result of the rotation of the inner and outer face rollers 403 and 404 of the joining mechanism part 405. However, the rotational speed of the apparatus S5 is maintained at a constant speed by the driving wheels 406a that contact the wall surface of the tubular culvert P, and this speed is slower than the feed-in speed of the strip-like member 500. As a result, a shear force is generated between [the spans of] the strip-like member 500 of the lining pipe R, so that shifting (slipping) occurs in the joint parts, thus causing a diameter-expanding action.

In the case of this diameter expansion, a stabilized state of diameter expansion is obtained at a constant rotational advancing speed of the apparatus S5 by controlling the feed-in speed of the strip-like member 500 determined by the joining mechanism part 405. The angle of diameter expansion is detected using an appropriate detector in order to ascertain the conditions of diameter expansion, and the feed-in speed is controlled on the basis of this detected value.

Since the rotation of the apparatus S5 is accomplished by means of a plurality of driving wheels 406a using hydraulic driving, a stabilized rotational force is obtained; furthermore, since these [driving wheels 406a] are driven against the tubular wall of the tubular culvert P together with the driven wheels 406b, the lining pipe also conforms to irregularities or non-circular shapes of the tubular wall, so that a stabilized pipe manufacturing action is obtained.

(Merits of the Present Embodiment)

(1) Stabilized conditions of diameter expansion can be obtained by controlling the feed-in speed of the strip-like member 500 at a constant rotational advancing speed of the lining apparatus S5.

(2) Since external-circumference regulation is adopted in the lining apparatus S5, there is no need for a special regulating frame body as in the abovementioned second embodiment.

INDUSTRIAL APPLICABILITY

Thus, in the present invention, the back-filling material is injected in the formation process of the lining pipe; accordingly, injection work can be performed without hindrance in cases where the length of the lining pipe is increased.

Furthermore, as a result of the provision of means for forming a recessed part or expanding the diameter in the lining pipe formation process, a lining pipe that fills the cross section of the tubular culvert can be formed; moreover, as a result of the injection of a back-filling material that has setting properties, the tubular culvert and lining pipe are formed into an integral unit, so that great strength is obtained.

The invention claimed is:

1. A tubular culvert interior lining method, said method comprising steps of:
   (1) forming an initial part of a tubular body by spirally winding a continuously supplied elongated strip-like member having first and second edge parts, said strip-like member having joint parts formed on said first and second edge parts, and mutually engaging said joint parts that are in contact with each other;
   (2) leaving said initial part of a tubular body in place in an interior of a tubular culvert;
   (3) continuing formation of said tubular body by means of supplying more of the strip-like member in front of said initial part of a tubular body; and
   (4) injecting back-filling material from an injection tube in synchronization with the formation of said tubular body;
   using an apparatus comprising a closed type forming frame which is devised so that this forming frame is freely bendable by means of a link mechanism comprising a series of connected link bodies, and in which the inward folding of the respective links is restricted; a plurality of guide rollers which are mounted around said forming frame so that these guide rollers are free to rotate, and which contact the inside surface of the tubular body that is formed by spirally winding a strip-like member; a joining mechanism part which is attached to said forming frame, and which consists of an outer face roller and inner face roller that are disposed in the joint area between said already-formed tubular body and newly supplied strip-like member, and that clamp and join the strip-like member, wherein said outer face roller has hook parts that are inserted into the recessed grooves of said strip-like member; a freely rotating contact roller which is disposed in said joining mechanism part, and whose outside surface protrudes to the outermost point and contacts the wall surface of the tubular culvert; and a back-filling material injection tube which is disposed after said joining mechanism part in the direction of advance adjacent to the outer face roller of said joining mechanism part, and which has at least a discharge port for the back-filling material located to the inside of said outer face roller; wherein when the restriction of inward folding of the link bodies of the forming frame to which said joining mechanism part is attached is released, said forming frame is caused to rotate, the link bodies of said joining mechanism part are placed in an inwardly folded state via said contact roller that is caused to contact the wall surface of the tubular culvert, a tubular body is formed by spirally winding the strip-like member around said forming frame.

2. A tubular culvert interior lining method, said method comprising steps of:
   (1) forming an initial part of a tubular body by spirally winding a continuously supplied elongated strip-like member having first and second edge parts, said strip-like member having joint parts formed on said first and second edge parts, and mutually engaging said joint parts that are in contact with each other;
   (2) leaving said initial part of a tubular body in place in an interior of a tubular culvert;
   (3) continuing formation of said tubular body by means of supplying more of the strip-like member in front of said initial part of a tubular body; and
   (4) injecting back-filling material from an injection tube in synchronization with the formation of said tubular body;
   using an apparatus comprising a closed type forming frame which is devised so that this forming frame is freely bendable by means of a link mechanism comprising a series of connected link bodies; a plurality of guide rollers which are mounted so as to be rotatable around said forming frame, and which contact the inside surface of the tubular body that is formed by spirally winding a strip-like member; a joining mechanism part which is attached to said forming frame, and which consists of an outer face roller and inner face roller that are disposed in the joint area between said already-formed tubular body and newly supplied strip-like member, and that clamp and join the strip-like member; a freely rotating contact roller which is disposed in said joining mechanism part, and whose outside surface protrudes to the outermost point and contacts the wall surface of the tubular culvert; and said back-filling material injection tube which is disposed after said joining mechanism part in the direction of advance adjacent to the outer face roller of said joining mechanism part, and which has at least a discharge port for the back-filling material located to the inside of said outer face roller; wherein when said forming frame is caused to rotate, the link bodies of said joining mechanism part are placed in a folded state via said contact roller that is caused to contact the wall surface of the tubular culvert, a tubular body is formed by spirally winding the strip-like member around said forming frame.

3. A tubular culvert interior lining method, said method comprising steps of:
   (1) forming an initial part of a tubular body by spirally winding a continuously supplied elongated strip-like member having first and second edge parts, said strip-like member having joint parts formed on said first and second edge parts, and mutually engaging said joint parts that are in contact with each other;
   (2) leaving said initial part of a tubular body in place in an interior of a tubular culvert;
   (3) continuing formation of said tubular body by means of supplying more of the strip-like member in front of said initial part of a tubular body; and
   (4) injecting a back-filling material simultaneously into the space between the outside surface of the tubular body and the inside surface of the tubular culvert using an apparatus comprising an annular forming frame; a lining apparatus in which at least a clamping mechanism part that has an outer face roller and an inner face roller that clamps and joins said strip-like member from the inside and outside, and a plurality of guide rollers that are free to rotate and that contact the inside surface or outside surface of the strip-like member, installed on said forming frame; and a feed mechanism part which is attached so that this feed mechanism part moves in linkage with said forming frame, and which applies a feeding force to said forming frame by contacting the wall surfaces of the tubular culvert; said strip-like member formed into a tubular body with a diameter that is smaller than the inner diameter of the tubular culvert by the annular regulation of said forming frame, wherein a lining is continuously formed while expanding the diameter of said tubular body and causing this tubular body to approach the inside surface of the tubular culvert by causing spans of said strip-like member to slide relative to each other during the formation process of this tubular body, and wherein said injection of back-filling material occurs during said expansion of the diameter, from a back-filling material injection tube that is attached to said lining apparatus.

4. The lining method according to claim 3, wherein:
a forming frame with internal-circumference regulation is used;
the apparatus used is equipped with an external-circumference regulating frame body which is disposed on the outside of said forming frame with a specified gap left between this external-circumference regulating frame body and the forming frame, and which is arranged so that this external-circumference regulating frame body moves in linkage with said forming frame, and is caused to surround the external circumference of the tubular body that is wound around the forming frame; and
the expansion of the diameter of the tubular body is regulated by said external circumference regulating frame body.

5. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other, wherein said initial part of a tubular body is folded radially inward, forming recessed parts at said joint parts of said strip-like member or in other arbitrary edge parts of said tubular body;
(2) leaving said initial part of a tubular body in place in an interior of a tubular culvert;
(3) continuing formation of said tubular body by means of supplying more of the strip-like member in front of said initial part of a tubular body;
(4) injecting a back-filling material from a region between the already-formed tubular body and the continuation of the tubular body into said recessed parts; and
(5) returning said recessed parts radially outward to their original shape;
using an apparatus comprising a forming frame with an internal-circumference regulating system that allows expanding and contracting displacement in the radial direction, wherein said apparatus further comprises at least one clamping mechanism part which has an inner face roller and an outer face roller that clamp said strip-like member from the inside and outside, and a freely rotating contact roller that contacts the wall surface of the tubular culvert, disposed on said forming frame, wherein the portion of said forming frame on which said contact roller is installed is recessed radially inward and the location of said installed tubular body that corresponds to the contact roller is folded radially inward.

6. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other;
(2) leaving said initial part of a tubular body in place in an interior of a tubular culvert; and
(3) continuing formation of said tubular body by means of supplying more of the strip-like member in front of said initial part of a tubular body;
using an apparatus comprising a forming frame with an internal-circumference regulating system that allows expanding and contracting displacement in the radial direction is used; at least a clamping mechanism part which has an inner face roller and an outer face roller that clamp said strip-like member from the inside and outside, and a freely rotating contact roller that contacts the wall surface of the tubular culvert, are disposed on said forming frame; the portions of said forming frame on which the contact roller is installed are recessed radially inward; and a tubular body is formed by spirally winding a strip-like member around said forming frame.

7. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other;
(2) leaving said initial part of a tubular body in place in an interior of a tubular culvert; and
(3) continuing formation of said tubular body by means of supplying more of the strip-like member in front of said initial part of a tubular body;
using an apparatus comprising a closed type forming frame which is devised so that this forming frame is freely bendable by means of a link mechanism comprising a series of connected link bodies; a plurality of guide rollers which are mounted around said forming frame so that these guide rollers are free to rotate, and which contact the inside surface of the tubular body that is formed by spirally winding a strip-like member; a joining mechanism part which is attached to said forming frame, and which consists of an outer face roller and inner face roller that are disposed in the joint area between said already-formed tubular body and newly supplied strip-like member, and that clamp and join the strip-like member; and a freely rotating contact roller which is disposed in said joining mechanism part, and whose outside surface protrudes to the outermost point and contacts the wall surface of the tubular culvert; wherein this method is further characterized in that said forming frame is caused to rotate, the link bodies of said joining mechanism part are placed in a folded state via said contact roller that is caused to contact the wall surface of the tubular culvert, and a tubular body is formed by spirally winding the strip-like member around said forming frame.

8. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other;
(2) leaving said initial part of a tubular body in place in an interior of a tubular culvert; and
(3) continuing formation of said tubular body by means of supplying more of the strip-like member in front of said initial part of a tubular body;
using an apparatus comprising a closed type forming frame which is devised so that this forming frame is freely bendable by means of a link mechanism comprising a series of connected link bodies, and in which the inward folding of the respective links is restricted; a plurality of guide rollers which are mounted around said forming frame so that these guide rollers are free to rotate, and which contact the inside surface of the tubular body that is formed by spirally winding a strip-like member; a joining mechanism part which is attached to said forming frame, and which consists of an outer face roller and inner face roller that are disposed in the joint area between said already-formed tubular body and newly supplied strip-like member, and that clamp and join the strip-like member, wherein said outer face roller has hook parts that are inserted into the recessed grooves of said strip-like member; and a freely rotating contact roller which is disposed in said joining mechanism part, and whose outside surface protrudes to the outermost point and contacts the wall surface of the tubular culvert; wherein this method is further characterized in that the restriction of inward folding of the link bodies of the forming frame to which said joining mechanism part is attached is released, said forming frame is caused to rotate, the link bodies of said joining mechanism part are placed in an inwardly folded state via said contact roller that is caused to contact the wall surface of the tubular culvert, and a tubular body is formed by spirally winding the strip-like member around said forming frame.

9. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other;
(2) leaving said initial part of a tubular body in place in an interior of a tubular culvert; and
(3) continuing formation of said tubular body by means of supplying more of the strip-like member in front of said initial part of a tubular body;
using an apparatus comprising an annular forming frame; a lining apparatus in which at least a clamping mechanism part that has an outer face roller and an inner face roller that clamp and join said strip-like member from the inside and outside, and a plurality of guide rollers that are free to rotate and that contact the inside surface or outside surface of the strip-like member, are installed on said forming frame, and a feed mechanism part is provided which is attached so that this feed mechanism part moves in linkage with said forming frame, and which applies a feeding force to said forming frame by contacting the wall surfaces of the tubular culvert; wherein said strip-like member is formed into a tubular body with a diameter that is smaller than the internal diameter of the tubular culvert by the annular regulation of said forming frame; further wherein said lining is continuously formed while expanding the diameter of said tubular body and causing this tubular body to approach the inside surface of the tubular culvert by causing spans of said strip-like member to slide relative to each other during the formation process of this tubular body; and wherein the feed-in speed of the strip-like member is controlled on the basis of the angle of the expansion in the diameter of the tubular body, while said lining apparatus is caused to propel itself at a constant rotating and advancing speed.

10. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other;
(2) leaving said initial part of a tubular body in place in an interior of a tubular culvert;
(3) continuing formation of said tubular body by means of continuously supplying more of the strip-like member in front of said initial part of a tubular body; and
(4) injecting a back-filling material from a region between the already-formed tubular body and the continuation of the tubular body into a space between an exterior surface of a continuously forming tubular body and an interior surface of said tubular culvert, wherein said back-filling material is injected simultaneously as forming said tubular body.

11. A tubular culvert interior lining method, said method comprising steps of:
(1) forming an initial part of a tubular body by spirally winding a continuously supplied elongated strip-like member having first and second edge parts, said strip-like member having joint parts formed on said first and second edge parts, and mutually engaging said joint parts that are in contact with each other, wherein said initial part of a tubular body is folded radially inward, forming a recessed part at a junction of said strip-like member, said tubular body, and an area where said strip-like member edge parts are mutually engaged;
(2) leaving said initial part of a tubular body in place in an interior of a tubular culvert;
(3) continuing formation of said tubular body by means of continuously supplying more of the strip-like member in front of said initial part of a tubular body;
(4) injecting a back-filling material from a region between the already-formed tubular body and the continuation of the tubular body into said recessed part, wherein said back-filling material is injected simultaneously as forming said tubular body; and
(5) returning said recessed part radially outward to its original shape.

12. The tubular culvert interior lining method according to claim 11, wherein said strip-like member possesses elasticity, and said recessed parts immediately recover their shape following deformation by virtue of the elastic force of the tubular body.

13. The tubular culvert interior lining method according to claim 11, wherein said recessed parts are returned to their original shape following deformation by means of a recovery device disposed inside said tubular body.

14. A tubular culvert interior lining apparatus in which a tubular body, which is formed by spirally winding a continuously supplied elongated strip-like member that has joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, this apparatus comprising:

a closed type forming frame which is devised so that this forming frame is freely bendable by means of a link mechanism comprising a series of connected link bodies;

a plurality of guide rollers which are mounted around said forming frame so that these guide rollers are free to rotate, and which contact the inside surface of the tubular body that is formed by spirally winding a strip-like member;

a joining mechanism part which is attached to said forming frame, and which consists of an outer face roller and inner face roller that are disposed in the joint area between said already-formed tubular body and newly supplied strip-like member, and that clamp and join the strip-like member;

a freely rotating contact roller which is disposed in said joining mechanism part, and whose outside surface protrudes to the outermost point and contacts the wall surface of the tubular culvert; and a back-filling material injection tube which is disposed after said joining mechanism part in the direction of advance adjacent to the outer face roller of said joining mechanism part, and which has at least a discharge port for the back-filling material located to the inside of said outer face roller.

15. The tubular culvert interior lining apparatus according to claim 14, wherein the contact roller is a feed roller which is disposed so that this roller moves in linkage with the joining mechanism part, with the outer surface of this roller protruding to the outermost point, so that this roller applies a feeding driving force in the direction in which the strip-like member is spirally wound.

16. The tubular culvert interior lining apparatus according to claim 14, wherein the contact roller is a spacer roller.

17. The tubular culvert interior lining apparatus according to claim 14, wherein, the outer face roller and/or inner face roller of the joining mechanism part are rotationally driven by receiving a driving force from an operating motor that is driven by the pressure of an operating-pressure fluid, an injection coupling tube which communicates with the back-filling material injection tube is disposed in the axial center of an operating fluid rotary coupling in the operating-pressure fluid path that leads to said joining mechanism part so that this injection coupling tube can be freely inserted and removed, and a back-filling material rotary coupling is interposed between said back-filling material injection tube and said injection coupling tube.

18. The tubular culvert interior lining apparatus of claim 14, further comprising a rotary coupling device, wherein the outer face roller and/or inner face roller of the joining mechanism part are rotationally driven by receiving a driving force from an operating motor that is driven by the pressure of an operating-pressure fluid, an injection coupling tube which communicates with the back-filling material injection tube is disposed in the axial center of an operating fluid rotary coupling in the operating-pressure fluid path that leads to said joining mechanism part so that this injection coupling tube can be freely inserted and removed, and a back-filling material rotary coupling is interposed between said back-filling material injection tube and said injection coupling tube.

19. A tubular culvert interior lining apparatus in which a tubular body, which is formed by spirally winding a continuously supplied elongated strip-like member that has recessed grooves formed in the longitudinal direction of the outside surface thereof and joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, this apparatus comprising:

a closed type forming frame which is devised so that this forming frame is freely bendable by means of a link mechanism comprising a series of connected link bodies, and in which the inward folding of the respective links is restricted;

a plurality of guide rollers which are mounted around said forming frame so that these guide rollers are free to rotate, and which contact the inside surface of the tubular body that is formed by spirally winding a strip-like member;

a joining mechanism part which is attached to said forming frame, and which consists of an outer face roller and inner face roller that are disposed in the joint area between said already-formed tubular body and newly supplied strip-like member, and that clamp and join the strip-like member, wherein said outer face roller has hook parts that are inserted into the recessed grooves of said strip-like member;

a freely rotating contact roller which is disposed in said joining mechanism part, and whose outside surface protrudes to the outermost point and contacts the wall surface of the tubular culvert; and a back-filling material injection tube which is disposed after said joining mechanism part in the direction of advance adjacent to the outer face roller of said joining mechanism part, and which has at least a discharge port for the back-filling material located to the inside of said outer face roller; and wherein the restriction of inward folding of the link bodies of the forming frame to which said joining mechanism part is attached is releasable.

20. The tubular culvert interior lining apparatus according to claim 19, wherein the contact roller is a feed roller which is disposed so that this roller moves in linkage with the joining mechanism part, with the outer surface of this roller protruding to the outermost point, so that this roller applies a feeding driving force in the direction in which the strip-like member is spirally wound.

21. The tubular culvert interior lining apparatus according to claim 19, wherein the contact roller is a spacer roller.

22. The tubular culvert interior lining apparatus according to claim 19, wherein the outer face roller and/or inner face roller of the joining mechanism part are rotationally driven by receiving a driving force from an operating motor that is driven by the pressure of an operating-pressure fluid, an injection coupling tube which communicates with the back-filling material injection tube is disposed in the axial center of an operating fluid rotary coupling in the operating-pressure fluid path that leads to said joining mechanism part so that this injection coupling tube can be freely inserted and removed, and a back-filling material rotary coupling is interposed between said back-filling material injection tube and said injection coupling tube.

23. The tubular culvert interior lining apparatus of claim 19, further comprising a rotary coupling device, wherein the outer face roller and/or inner face roller of the joining mechanism part are rotationally driven by receiving a driving force from an operating motor that is driven by the pressure of an operating-pressure fluid, an injection coupling tube which communicates with the back-filling material injection tube is disposed in the axial center of an operating fluid rotary coupling in the operating-pressure fluid path that leads to said joining mechanism part so that this injection coupling tube can be freely inserted and removed, and a back-filling material rotary coupling is interposed between said back-filling material injection tube and said injection coupling tube.

24. A tubular culvert interior lining apparatus in which a tubular body, which is formed by spirally winding a continuously supplied elongated strip-like member that has joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, this apparatus comprising:

an annular forming frame which comprises:

a clamping mechanism part that has an outer face roller and an inner face roller that clamp and join said strip-like member from the inside and outside;

a plurality of guide rollers that are free to rotate and that contact the inside surface or outside surface of the strip-like member, said clamping mechanism part and said guiding rollers being provided on said forming frame; and a feed mechanism part which is attached so that this feed mechanism part moves in linkage with said forming frame, and which applies a feeding force to said forming frame by contacting the wall surfaces of the tubular culvert; and a back-filling material injection tube is installed via said forming frame.

25. A tubular culvert interior lining apparatus in which a tubular body, which is formed by spirally winding a continuously supplied elongated strip-like member that has recessed grooves formed in the longitudinal direction of the outside surface thereof and joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, this apparatus comprising at least:

a forming frame which has a specified width and which maintains an annular shape;

a plurality of guide rollers which are mounted around said forming frame so that these guide rollers are free to rotate, and which contact the inside surface of the tubular body that is formed by spirally winding a strip-like member;

a joining mechanism part which is attached to said forming frame, and which consists of an outer face roller and inner face roller that are disposed in the joint area between said already-formed tubular body and newly supplied strip-like member, wherein said outer face roller has hook parts that are inserted into the recessed grooves of said strip-like member;

a feed mechanism part which is attached so that this feed mechanism part moves in linkage with said forming frame, this feed mechanism part having freely rotating rollers that contact the wall surfaces of the tubular culvert, and this feed mechanism part maintaining said forming frame in the center of the tubular culvert by causing said rollers to contact the wall surfaces of the tubular culvert;

an external-circumference regulating frame body which is disposed on the outside of said forming frame with a specified gap left between this external-circumference regulating frame body and the forming frame, and which is arranged so that this external-circumference regulating frame body moves in linkage with said forming frame, and is caused to surround the external circumference of the tubular body that is wound around said forming frame; and a back-filling material injection tube which is attached via said forming frame.

26. A tubular culvert interior lining apparatus used in a method in which a tubular body, which is formed by spirally winding a continuously supplied elongated strip-like member that possesses elasticity and that has joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, this apparatus comprising:

a closed type forming frame which is devised so that this forming frame is freely bendable by means of a link mechanism comprising a series of connected link bodies;

a plurality of guide rollers which are mounted around said forming frame so that these guide rollers are free to rotate, and which contact the inside surface of the tubular body that is formed by spirally winding a strip-like member;

a joining mechanism part which is attached to said forming frame, and which consists of an outer face roller and inner face roller that are disposed in the joint area between said already-formed tubular body and newly supplied strip-like member, and that clamp and join the strip-like member;

a freely rotating contact roller which is disposed in said joining mechanism part, and whose outside surface protrudes to the outermost point and contacts the wall surface of the tubular culvert; and a back-filling material injection tube which is attached via said forming frame.

27. A tubular culvert interior lining apparatus in which a tubular body, which is formed by spirally winding a continuously supplied elongated strip-like member possessing elasticity that has recessed grooves formed in the direction of length in its outside surface and joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, the apparatus comprising:

a closed type forming frame which is devised so that this forming frame is freely bendable by means of a link mechanism comprising a series of connected link bodies, and in which the inward folding of the respective links is restricted;

a plurality of guide rollers which are mounted around said forming frame so that these guide rollers are free to rotate, and which contact the inside surface of the tubular body that is formed by spirally winding a strip-like member;

a joining mechanism part which is attached to said forming frame, and which consists of an outer face roller and inner face roller that are disposed in the joint area between said already-formed tubular body and newly supplied strip-like member, and that clamp and join the strip-like member, wherein said outer face roller has hook parts that are inserted into the recessed grooves of said strip-like member;

a freely rotating contact roller which is disposed in said joining mechanism part, and whose outside surface protrudes to the outermost point and contacts the wall surface of the tubular culvert;

a back-filling material injection tube which is attached via said forming frame; and, wherein the restriction of inward folding of the link bodies of the forming frame to which said joining mechanism part is attached is releasable.

28. A tubular culvert interior lining apparatus in which a tubular body, which is formed by spirally winding a continuously supplied elongated strip-like member that has joint parts formed on both side edge parts, and engaging the joint parts that are in contact with each other, is left in place in the interior of the tubular culvert, and said tubular body is continued by means of adding more of the strip-like member that is newly supplied in front of said tubular body that has already been formed, wherein, an annular forming frame is used, at least a clamping mechanism part that has an outer face roller and an inner face roller that clamp and join said strip-like member from the inside and outside, and a plurality of guide rollers that are free to rotate and that contact the inside surface or outside surface of the strip-like member, are installed on said forming frame, a feed mechanism part is provided which is attached so that this feed mechanism part moves in linkage with said forming frame, and which applies a feeding force to said forming frame by contacting the wall surfaces of the tubular culvert, means are provided to control the feed-in speed of said strip-like member in order to obtain a specified diameter expansion angle of the tubular body, this control being accomplished by using the driving of said feed mechanism part to cause rotation of the lining apparatus at a constant speed that is slower than the feed-in speed of said strip-like member that is determined by said clamping mechanism part, and a back-filling material injection tube which is attached via said forming frame.

* * * * *

UNITED STATES PATENT AND TRADEMARK OFFICE
CERTIFICATE OF CORRECTION

PATENT NO. : 7,186,060 B2  Page 1 of 1
APPLICATION NO. : 10/169081
DATED : March 6, 2007
INVENTOR(S) : Akimoto et al.

It is certified that error appears in the above-identified patent and that said Letters Patent is hereby corrected as shown below:

In column 22, line 30, change "9" to --95--

Signed and Sealed this

Thirtieth Day of October, 2007

JON W. DUDAS
*Director of the United States Patent and Trademark Office*